(12) United States Patent
Heo et al.

(10) Patent No.: US 12,553,572 B2
(45) Date of Patent: Feb. 17, 2026

(54) LIQUEFIED GAS STORAGE TANK AND SHIP COMPRISING SAME

(71) Applicant: HYUNDAI HEAVY INDUSTRIES CO., LTD., Ulsan (KR)

(72) Inventors: Won Seok Heo, Ulsan (KR); Byung Ki Choi, Ulsan (KR); Hoon Kyu Oh, Ulsan (KR); Cheon Jin Park, Ulsan (KR); Min Kyu Park, Ulsan (KR); Seong Bo Park, Ulsan (KR); Yong Tai Kim, Ulsan (KR); Dong Woo Kim, Ulsan (KR); Jae Hyeok Ahn, Ulsan (KR); Young Moo Son, Ulsan (KR); Myung Sup Lee, Ulsan (KR); Seong Il Lee, Ulsan (KR); Sung Kyu Hong, Ulsan (KR); Jung Kyu Park, Ulsan (KR); Ik Hwy Son, Ulsan (KR); Geum Hyeon Baek, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 574 days.

(21) Appl. No.: 17/928,891

(22) PCT Filed: Jul. 23, 2021

(86) PCT No.: PCT/KR2021/009553
§ 371 (c)(1),
(2) Date: Nov. 30, 2022

(87) PCT Pub. No.: WO2022/025534
PCT Pub. Date: Feb. 3, 2022

(65) Prior Publication Data
US 2023/0228378 A1 Jul. 20, 2023

(30) Foreign Application Priority Data

Jul. 31, 2020 (KR) .................. 10-2020-0096370
Dec. 14, 2020 (KR) .................. 10-2020-0174789
Apr. 9, 2021 (KR) .................. 10-2021-0046751

(51) Int. Cl.
*B63B 25/16* (2006.01)
*F17C 3/02* (2006.01)

(52) U.S. Cl.
CPC .............. *F17C 3/025* (2013.01); *B63B 25/16* (2013.01); *F17C 3/027* (2013.01); *F17C 2203/0358* (2013.01); *F17C 2270/0107* (2013.01)

(58) Field of Classification Search
CPC .. F17C 3/00; F17C 3/025; F17C 3/027; B63B 25/00; B63B 25/08; B63B 25/16
(Continued)

(56) References Cited

U.S. PATENT DOCUMENTS 3,361,285 A  1/1968 Alleaume
4,452,162 A * 6/1984 Harbaugh ............... F17C 3/025
114/74 A (Continued)

FOREIGN PATENT DOCUMENTS

CN  109154641 A  1/2019
DE  2407210 A1  9/1974
(Continued)

OTHER PUBLICATIONS

Office Action for Chinese Patent Application No. 202180039360.0 issued by the Chinese Patent Office on Feb. 14, 2025.
(Continued)

*Primary Examiner* — Lars A Olson
(74) *Attorney, Agent, or Firm* — IP & T GROUP LLP

(57) ABSTRACT

A liquefied gas storage tank of the present disclosure includes: a flat block including a flat primary insulating wall disposed on a flat portion on a first surface or a second surface at different angles forming a storage space for
(Continued)

accommodating liquefied gas, the flat primary insulating wall securing a flat primary barrier made of metal and being disposed on the outside of the flat primary barrier, a flat secondary barrier disposed on the outside of the flat primary insulating wall, and a flat secondary insulating wall disposed on the outside of the flat secondary barrier; and a corner block including a corner primary insulating wall disposed in a corner portion where the first surface and the second surface meet, the corner primary insulating wall securing a corner primary barrier made of metal and being disposed on the outside of the corner primary barrier, a corner secondary barrier disposed on the outside of the corner primary insulating wall, and a corner secondary insulating wall disposed on the outside of the corner secondary barrier, wherein the corner primary insulating wall includes an outer primary plywood secured to the corner secondary barrier, an inner primary plywood to which the corner primary barrier is secured, and a corner primary insulation material disposed between the inner primary plywood and the outer primary plywood.

10 Claims, 32 Drawing Sheets

(58) Field of Classification Search
USPC ........................................................ 114/74 A
See application file for complete search history.

(56) References Cited

U.S. PATENT DOCUMENTS

| 6,378,722 | B1 | 4/2002 | Dhellemmes | |
|---|---|---|---|---|
| 9,862,463 | B2 * | 1/2018 | Boyeau | F17C 3/027 |
| 10,578,248 | B2 * | 3/2020 | Delanoe | F17C 3/027 |
| 2016/0252210 | A1 | 9/2016 | Bougault et al. | |
| 2017/0276295 | A1 | 9/2017 | Herry et al. | |

FOREIGN PATENT DOCUMENTS

| EP | 0573327 B1 | 1/1999 | |
|---|---|---|---|
| FR | 3004509 A1 | 10/2014 | |
| FR | 3073272 B1 | 11/2019 | |
| JP | 2000-079987 A | 3/2000 | |
| JP | 2002-145387 A | 5/2002 | |
| JP | 2006-118609 A | 5/2006 | |
| JP | 2006-300320 A | 11/2006 | |
| JP | 2007-525624 A | 9/2007 | |
| JP | 2010-48421 A | 3/2010 | |
| JP | 4616279 B2 | 10/2010 | |
| JP | 2011-519005 A | 6/2011 | |
| JP | 2016520770 A | 7/2016 | |
| JP | 6585635 B2 | 10/2019 | |
| KR | 10-1997-0005076 B1 | 12/1995 | |
| KR | 20-0345090 Y1 | 3/2004 | |
| KR | 10-0553017 B1 | 2/2006 | |
| KR | 10-0568618 B1 | 4/2006 | |
| KR | 10-0760481 B1 | 9/2007 | |
| KR | 10-2008-0097519 A | 11/2008 | |
| KR | 10-2009-0132514 A | 12/2009 | |
| KR | 10-0997363 B1 | 11/2010 | |
| KR | 10-1019178 B1 | 3/2011 | |
| KR | 10-1055701 B1 | 8/2011 | |
| KR | 10-1108630 B1 | 1/2012 | |
| KR | 10-1215629 B1 | 12/2012 | |
| KR | 10-2013-0143347 A | 12/2013 | |
| KR | 10-1349875 B1 | 1/2014 | |
| KR | 10-1411540 B1 | 6/2014 | |
| KR | 10-1412680 B1 | 6/2014 | |
| KR | 10-2014-0130708 A | 11/2014 | |
| KR | 10-2015-0028555 A | 3/2015 | |
| KR | 10-2015-0142021 A | 12/2015 | |
| KR | 10-2016-0033121 A | 3/2016 | |
| KR | 10-2016-0035261 A | 3/2016 | |
| KR | 10-1672221 B1 | 11/2016 | |
| KR | 10-2016-0141780 A | 12/2016 | |
| KR | 10-2017-0022661 A | 3/2017 | |
| KR | 10-1837281 B1 | 3/2018 | |
| KR | 10-2018-0060576 A | 6/2018 | |
| KR | 10-2018-0077539 A | 7/2018 | |
| KR | 10-1973086 B1 | 11/2018 | |
| KR | 10-1959391 B1 | 3/2019 | |
| KR | 10-2019-0052617 A | 5/2019 | |
| KR | 10-2019-0078547 A | 7/2019 | |
| KR | 10-2015919 B1 | 8/2019 | |
| KR | 10-2047992 B1 | 12/2019 | |
| KR | 10-2020-0012633 A | 2/2020 | |
| KR | 10-2020-0023483 A | 3/2020 | |
| KR | 10-2020-0081546 A | 7/2020 | |
| KR | 10-2020-0091989 A | 8/2020 | |
| KR | 10-2020-0118169 A | 10/2020 | |
| KR | 10-2020-0130055 A | 11/2020 | |
| KR | 10-2188368 B1 | 12/2020 | |
| WO | WO-2014167214 A2 * | 10/2014 | B63B 25/16 |

OTHER PUBLICATIONS

Extended European Search Report for European Patent Application No. 24197640.6 issued by the European Patent Office on Jan. 24, 2025.
Notice of Allowance for the Korean Patent Application No. 10-2021-0013522 issued by the Korean Intellectual Property Office on Dec. 29, 2022.
Notice of Allowance for the Korean Patent Application No. 10-2021-0046777 issued by the Korean Intellectual Property Office on Jan. 12, 2023.
Notice of Allowance for the Korean Patent Application No. 10-2021-0025028 issued by the Korean Intellectual Property Office on Jan. 12, 2023.
Office Action for the Japanese Patent Application No. 2022-573753 issued by the Japanese Patent Office on Oct. 31, 2023.
Extended European Search Report for European Patent Application No. 21851140.0 issued by the European Patent Office on Sep. 26, 2024.
Office Action for Japanese Patent Application No. 2022-573753 issued by the Japanese Patent Office on Oct. 1, 2024.
Notice of Allowance for the Korean Patent Application No. 10-2021-0042932 issued by the Korean Intellectual Property Office on Apr. 13, 2023.
Office Action for Chinese Patent Application No. 202180039360.0 issued by the Chinese Patent Office on Jun. 20, 2025.
Office Action for Chinese Patent Application No. 202180039360.0 issued by the Chinese Patent Office on Oct. 27, 2025.

* cited by examiner

FIG. 4

FIG. 8
Contour Plot
S-Global-Stress components(YY, Max)
PART-1-1 id = 4
Advanced Average (Var. <= 75%)
- 1.200E+01
- 1.119E+01
- 1.037E+01
- 9.555E+00
- 8.739E+00
- 7.923E+00
- 7.107E+00
- 6.291E+00
- 5.476E+00
- 4.660E+00
■ No result
Max = 1.200E+01
PART-1-1 356579
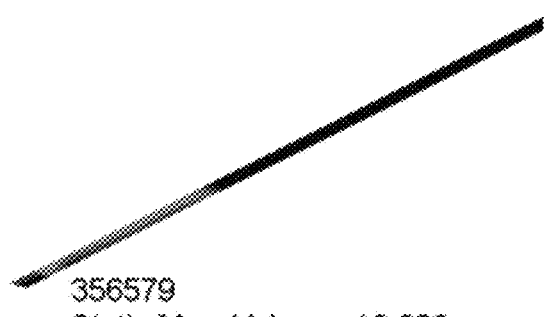
356579
Static Max. Value = 12.003
| Tensile Stress YY-direction [MPa] | Temperature [°C] |
|---|---|
| 12.003 | -64.358 |

FIG. 10
Contour Plot
S-Global-Stress components(YY, Max)
PART-1-1 id = 4
Advanced Average (Var. <= 75%)
- 1.200E+01
- 1.119E+01
- 1.037E+01
- 9.555E+00
- 8.739E+00
- 7.923E+00
- 7.107E+00
- 6.291E+00
- 5.476E+00
- 4.660E+00
■ No result
Max = 1.200E+01
PART-1-1 356579
356579
Static Max. Value = 12.003
| Tensile Stress YY-direction [MPa] | Temperature [°C] |
|---|---|
| 12.003 | −64.358 |

Contour Plot
S-Global-Stress components(YY, Max)
PART-1-1 id = 4
Advanced Average
- 1.310E+01
- 1.222E+01
- 1.135E+01
- 1.047E+01
- 9.594E+00
- 8.717E+00
- 7.840E+00
- 6.964E+00
- 6.087E+00
- 5.210E+00
■ No result
Max = 1.310E+01
PART-1-1 369325

369325
Static Max. Value = 13.101

| Tensile Stress YY-direction [MPa] | Temperature [°C] |
|---|---|
| 13.101 | −74.480 |

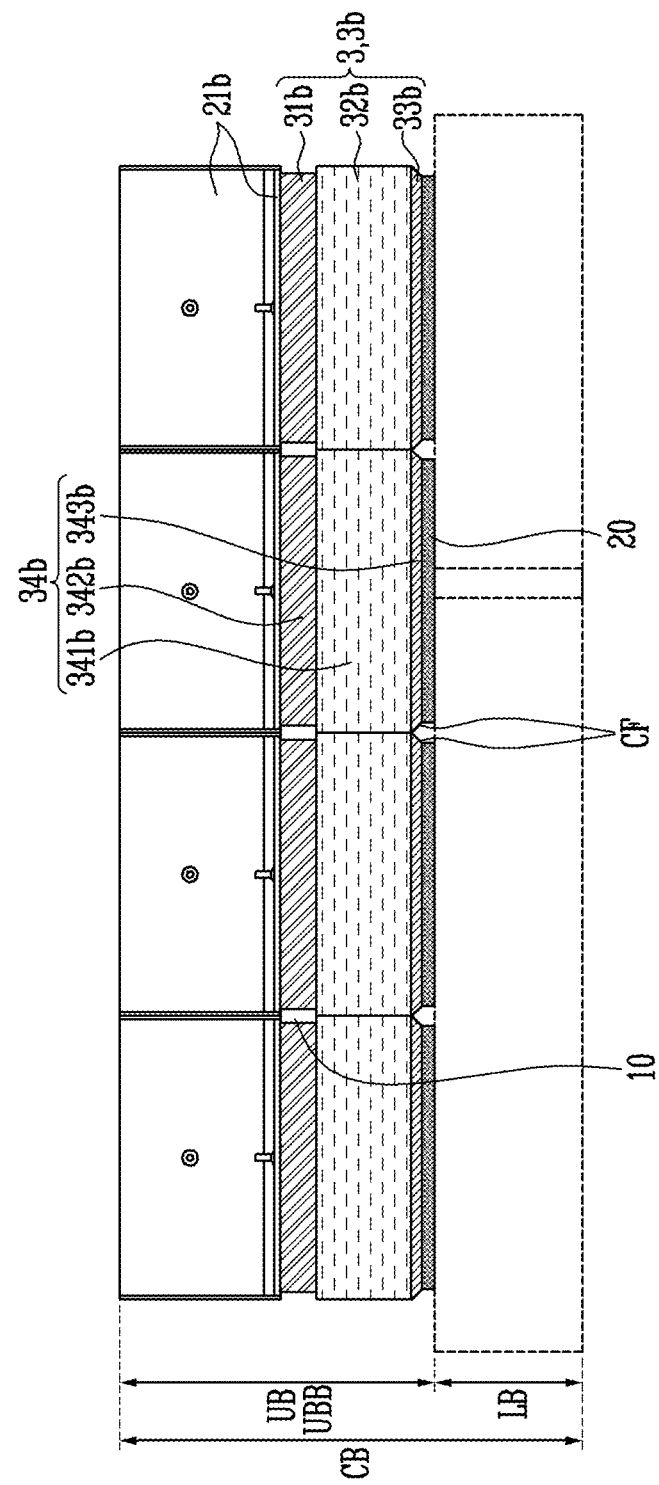

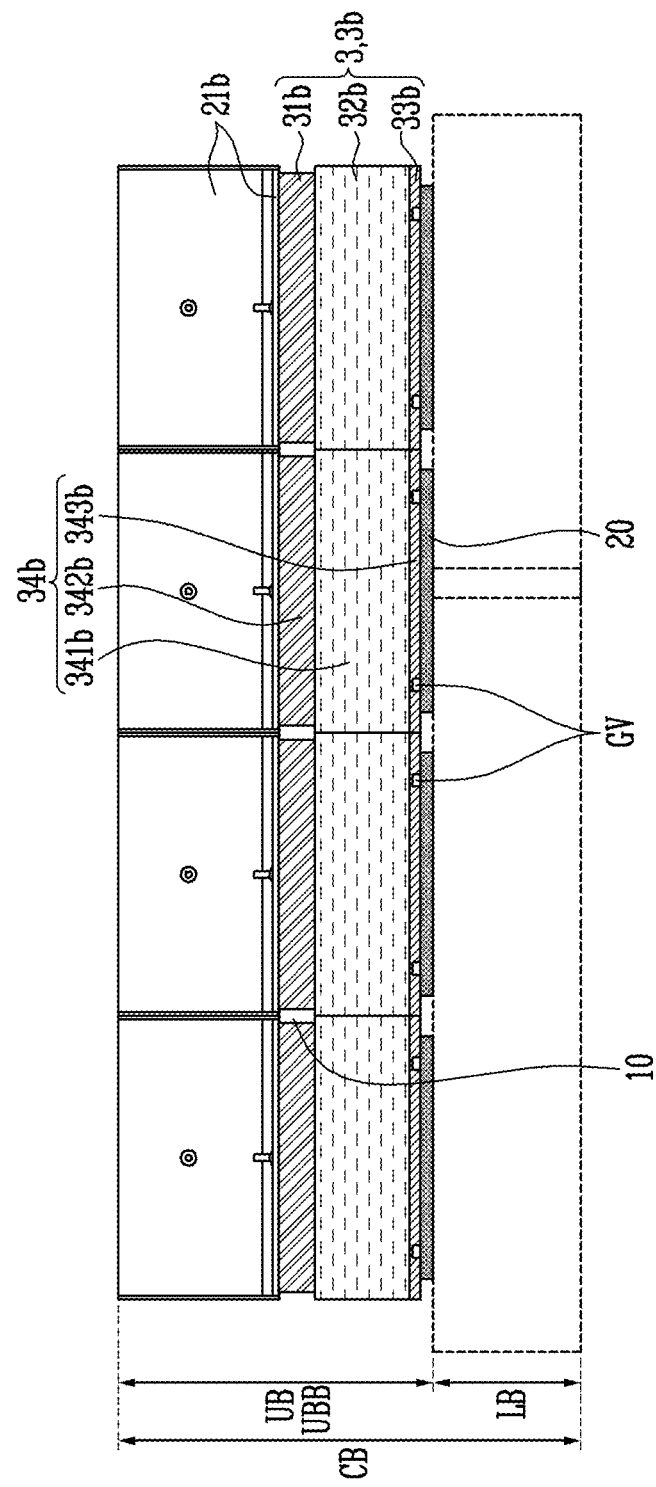

LIQUEFIED GAS STORAGE TANK AND SHIP COMPRISING SAME

This application is a national stage application of PCT/KR2021/009553 filed on Jul. 23, 2021, which claims Korean patent application number 10-2020-0096370 filed on Jul. 31, 2020, Korean patent application number 10-2020-0174789 filed on Dec. 14, 2020 and Korean patent application number 10-2021-0046751 filed on Apr. 9, 2021. The disclosure of each of the foregoing applications is incorporated herein by reference in its entirety.

TECHNICAL FIELD

The present disclosure relates to a liquefied gas storage tank and a ship including the same.

BACKGROUND ART

According to recent technology developments and environmental regulations, liquefied gas such as liquefied natural gas (LNG) and liquefied petroleum gas (LPG) is widely used to replace gasoline or diesel.

In addition, inside ships such as LNG RV (Regasification Vessel), LNG FPSO (Floating, Production, Storage and Offloading), LNG FSRU (Floating Storage and Regasification Unit), etc. for transporting or storing liquefied gas such as LNG at sea, storage tanks (so-called "cargo holds") are installed for storing LNG in the cryogenic liquid state, and in accordance with IMO environmental regulations, using LNG fuel tanks in large-scale container ships and various cargo ships is becoming a reality.

Furthermore, the liquefied gas storage tank may generate boil-off gas (BOG) due to thermal intrusion from the outside, and it is a key technology in the design of a liquefied gas storage tank to lower the boil-off rate (BOR), which is the vaporization rate of the boil-off gas through an insulating design. Additionally, it may be also necessary to secure the mechanical strength of insulating panels as the liquefied gas storage tank is exposed to various loads such as sloshing.

Considering the above, active research has been conducted not only to secure the mechanical strength of the insulating panels at corners forming a right angle or an obtuse angle in the liquefied gas storage tank and improve the insulation performance, but also to reduce stress caused by various loads such as sloshing, deformation of the hull, and temperature changes.

DISCLOSURE OF THE INVENTION

Technical Goals

The present disclosure has been proposed to solve the problems of the related art as described above, and an object of the present disclosure is to provide a liquefied gas storage tank and a ship including the same that are capable of reducing the burden of low temperature, sloshing, and stress of the corner secondary barrier by improving the structure of the corner block.

Technical Solutions

A liquefied gas storage tank according to an aspect of the present disclosure includes: a flat block including a flat primary insulating wall disposed on a flat portion on a first surface or a second surface at different angles forming a storage space for accommodating liquefied gas, the flat primary insulating wall securing a flat primary barrier made of metal and being disposed on the outside of the flat primary barrier, a flat secondary barrier disposed on the outside of the flat primary insulating wall, and a flat secondary insulating wall disposed on the outside of the flat secondary barrier; and a corner block including a corner primary insulating wall disposed in a corner portion where the first surface and the second surface meet, the corner primary insulating wall securing a corner primary barrier made of metal and being disposed on the outside of the corner primary barrier, a corner secondary barrier disposed on the outside of the corner primary insulating wall, and a corner secondary insulating wall disposed on the outside of the corner secondary barrier, wherein the corner primary insulating wall includes an outer primary plywood secured to the corner secondary barrier, an inner primary plywood to which the corner primary barrier is secured, and a corner primary insulation material disposed between the inner primary plywood and the outer primary plywood.

Specifically, the corner primary insulation wall may include: an inner first fixing portion and an inner second fixing portion disposed on the inside of the first and second surfaces, respectively, and including the outer primary plywood, the corner primary insulation material, and the inner primary plywood; and an inner bent portion configured by filling an insulation material between the inner first fixing portion and the inner second fixing portion.

Specifically, the corner primary insulation material may be a high-density polyurethane foam, and the insulation material of the inner bent portion may be a low-density polyurethane foam.

Specifically, the corner primary barrier may secured to the inner primary plywood of the inner first fixing portion and the inner primary plywood of the inner second fixing portion, and provided to be bent on an inner surface of the insulation material of the inner bent portion.

Specifically, the corner secondary insulation wall may be secured to the inside of the first and second surfaces, respectively, and may include an outer first fixing portion and an outer second fixing portion including an inner secondary plywood, a corner secondary insulation material, and an outer secondary plywood sequentially arranged to the outside of the corner secondary barrier, and side surfaces of the first outer fixing portion secured to the first surface and the outer second fixing portion secured to the second surface facing each other may be provided to be inclined in a direction dividing the corner portion.

Specifically, the corner primary insulation wall of the corner block connected to the flat primary insulation wall of the flat block may have the same or similar thickness to that of the corner secondary thermal insulation wall of the corner block connected to the flat secondary thermal insulation wall of the flat block.

A liquefied gas storage tank according to another aspect of the present disclosure includes a corner block disposed at a corner portion where a first surface and a second surface meet at different angles to form a storage space for accommodating liquefied gas, wherein the corner block includes a lower block provided inside the first and second surfaces and formed of a single board, a plurality of upper blocks disposed adjacently on the lower block and bonded to each other, and an upper connection block that is bonded to upper surfaces of the lower blocks disposed adjacent to each other and connects the lower blocks, and wherein the upper block (or the upper connection block) may include a barrier fixing member provided to be bent at a predetermined angle on the inside of the first and second surfaces, securing a corner primary barrier made of metal, and disposed on the outside of the corner primary barrier, an inner primary plywood (or corner first connecting plywood) disposed on the outside of the barrier fixing member, a corner primary insulation material (or corner connecting insulation material) disposed on the outside of the inner primary plywood (or the corner first connection plywood), and an outer primary plywood (or corner second connection plywood) disposed on the outside of the corner primary insulation material (or the corner connecting insulation material) and bonded to the lower block, bond the outer primary plywood (or the corner second connecting plywood) having a plurality of first holes to an outer surface of the corner primary insulation material (or the corner connecting insulation material) having a plurality of second holes, bond the inner primary plywood (or the corner first connecting plywood) having a plurality of third holes to an inner surface of the corner primary insulation material (or the corner connecting insulation material), secure, while the outer primary plywood (or the corner second connection plywood), the corner primary insulation material (or the corner connection insulation material), and the inner primary plywood (or the corner first connection plywood) are bonded, the barrier fixing member to an upper surface of the inner primary plywood (or the corner first connecting plywood), and insert, while the barrier fixing member is secured to the inner primary plywood (or the corner first connecting plywood), a foam plug into each of communication holes formed by the plurality of first and second holes.

Specifically, the barrier fixing member may be bolted to the inner primary plywood (or the corner first connecting plywood).

Specifically, filling of a separate insulation material may be carried out or omitted between the corner primary insulation materials of the upper blocks disposed adjacent to each other.

Specifically, filling of a separate insulation material may be carried out or omitted between the corner primary insulation material of the upper block and the corner connecting insulation material of the upper connecting block disposed adjacent to each other.

Advantageous Effects

A liquefied gas storage tank and a ship including the same of the present disclosure may reduce the burden of low temperature, sloshing, and stress of the corner secondary barrier by improving the structure of the corner block.

In addition, the liquefied gas storage tank and the ship having the same of the present disclosure may form the inner first and second fixing portions for holding the barrier fixing member to which the corner primary barrier is secured in the corner block not only with plywood, but in combination of polyurethane foam insulation, thereby improving insulation compared to the related art including plywood only, and reducing the associated weight and costs.

Further, by configuring the thicknesses of the corner primary insulating wall of the corner block connected to the flat primary insulating wall of the flat block and the corner secondary insulating wall of the corner block connected to the flat secondary insulating wall of the flat block to be the same as or similar to each other, the liquefied gas storage tank and the ship having the same of the present disclosure may reduce the burden of the low temperature and sloshing of the corner secondary barrier as the thickness of the corner primary insulating wall becomes relatively thicker (however, the thickness of the corner secondary insulating wall is sufficient to maintain the mechanical strength at a certain level). Furthermore, it is possible to prevent damages to the secondary corner barriers as well as reduce the low temperature load on the corner secondary barriers to prevent any brittle fracture of the hull.

In addition, by configuring a thickness of the corner primary insulating wall of the corner block to be greater than that of the related art, the liquefied gas storage tank and the ship having the same of the present disclosure may allow the corner secondary barrier to increase a length of the non-adhesive portion to the corner secondary insulating wall, thereby reducing the probability of damages to the corner secondary barrier including the corner connecting barrier due to the increased flexibility of the corner secondary barrier, allowing the corner secondary barrier to easily absorb the hull deformation, and reducing the low temperature stress.

In addition, by spacing apart the inner first fixing portion and the inner second fixing portion provided on the inside of the first surface and the second surface by a predetermined distance at different angles, and providing an inner intermediate fixing portion between the inner first and second fixing portions, the liquefied gas storage tank and the ship having the same of the present disclosure may reduce the bending angle of the corner primary barrier by the inner intermediate fixing portion, thereby reducing the burden of sloshing in the corner primary barrier and increasing the mechanical strength of the corner portion.

In addition, by forming a chamfer in the corner where the outer first fixing portion and the outer second fixing portion that are respectively secured to the first and second surfaces at different angles face each other, and filling the chamfer with a low-density polyurethane foam, the liquefied gas storage tank and the ship having the same of the present disclosure may further increase the thermal insulation performance in the corner portion by the low-density polyurethane foam.

In addition, by forming a step in the corner where the outer first fixing portion and the outer second fixing portion that are respectively secured to the first and second surfaces at different angles face each other, and filling the step with glass wool, the liquefied gas storage tank and the ship having the same of the present disclosure may further prevent damages to the corner secondary barrier due to the increased flexibility of the corner secondary barrier including the corner connecting barrier formed on top of the glass wool.

In addition, by spacing apart the outer first fixing portion and the outer second fixing portion respectively secured to the first surface and the second surface at different angles by a predetermined distance, and providing an outer intermediate fixing portion between the outer first and second fixing portions, the liquefied gas storage tank and the ship having the same of the present disclosure may prevent damages to the corner secondary barrier secured to the outer fixing portion as contraction or expansion stress caused by the temperature of the outer fixing portion is alleviated by respective gaps formed between the first outer fixing portion and the outer intermediate fixing portion and between the outer second fixing portion and the outer intermediate fixing portion compared to the conventional one gap configuration.

In addition, by forming a chamfer at the corner where the outer first fixing portion and the outer second fixing portion respectively secured to the first and second surfaces at different angles face each other, and installing the corner secondary barrier along the surfaces of the outer first and second fixing portions including the chamfered portion, the liquefied gas storage tank and the ship having the same of the present disclosure may allow the corner secondary barrier to protrude and bend outward, increasing the length of the non-adhesive portion to the corner secondary insulating wall. As such, due to the increased flexibility of the corner secondary barrier, not only the probability of damages to the corner secondary barrier including the corner connecting barrier may be further reduced, but also the corner secondary barrier may easily absorb the hull deformation, and the low temperature stress may be further reduced.

In addition, by providing the corner primary insulating wall including the inner primary plywood forming a step with the corner primary insulation material in plurality on the corner secondary insulating wall and configuring the neighboring corner primary insulation materials to be adjacent to each other, the liquefied gas storage tank and the ship having the same of the present disclosure may facilitate the installation handling of the barrier fixing member through the stepped portion between the adjacent inner first plywood, and reduce the consumption of the packing material because the packing material only needs to be applied on the stepped portion.

In addition, according to the liquefied gas storage tank and the ship having the same of the present disclosure, by not providing a reinforcing member such as a stiffener on a rear surface of the barrier fixing member, the weight of the barrier fixing member itself may be reduced, and welding for attaching the reinforcing member may be omitted, thereby reducing the welding time and increasing the precision. Also, the liquefied gas storage tank and the ship having the same of the present disclosure may improve the system stability by uniformly distributing stress generated in the portion bent at a right angle or an obtuse angle such that the frequency of damages occurring in the bent portion may be reduced, and repair may be minimized compared to the conventional wall fixing member with a stiffener.

In addition, according to the liquefied gas storage tank and the ship having the same of the present disclosure, by providing a chamfered or groove shape as a squeeze-out identifier to each of the outer primary plywood and the corner second connecting plywood, which are the lower layers of the upper block and the upper connecting block, respectively, it is possible to reduce the weight of each of the upper block and upper connection block, and to improve the system stability by directly checking the adhesive squeezed out with the naked eye after applying the adhesive on each of the upper block and upper connecting block.

In addition, according to the liquefied gas storage tank and the ship having the same of the present disclosure, by providing a stuffing piece for inserting into a first stepped space formed between the inner primary plywood of the neighboring upper block as well as a second stepped space formed between the inner primary plywood of the upper block and the corner first connecting plywood of the upper connecting block, it is possible to keep constant the gap distance between the neighboring upper blocks and the gap distance between the upper block and the upper connecting block, and to secure the inner bent portion of the upper block and the corner connecting bent portion of the upper connecting block, thereby facilitating handling when working with the upper block.

In addition, according to the liquefied gas storage tank and the ship having the same of the present disclosure, by disposing anti-bonding members on an exposed surface of each of the corner connection bent portion and corner connecting insulation materials, which are non-bonding regions in the upper connection block, or respective exposed surfaces of the corner connecting barrier of the lower block in contact with the corner connecting bent portion, which is the non-bonding region of the upper connecting block, the inner bending portion of the upper block adjacent to the corner connecting insulation materials, which is the non-bonding region of the upper connecting block, and each corner primary insulation material, it is possible to prevent the adhesive from escaping to the exposed surfaces of the corner connecting bent portion and the corner connecting insulation materials, which are non-bonding regions when bonding the upper connecting blocks, or even if the adhesive escapes, it is also possible to prevent bonding between the corner connecting bent portion and the corner connecting barrier or the corner connecting insulation material and the corner primary insulation material of the neighboring upper blocks.

In addition, according to the liquefied gas storage tank and the ship having the same of the present disclosure, by spraying insulation materials inside gaps formed at a portion where the corner block and the flat block are brought into contact due to the tolerance of the tank hull using a spray device after installing the corner block on the corner portion and the flat block on the flat portion, it is possible to easily fill gaps having irregular sizes.

BRIEF DESCRIPTION OF DRAWINGS

FIG. 4 is a diagram illustrating other structural analysis results for the corner portion of the liquefied gas storage tank in accordance with the first embodiment of the present disclosure.

FIG. 8 is a diagram illustrating structural analysis results for the corner portion of the liquefied gas storage tank in accordance with the third embodiment of the present disclosure.

FIG. 10 is a diagram illustrating structural analysis results for the corner portion of the liquefied gas storage tank in accordance with the fourth embodiment of the present disclosure.

FIG. 28 is a partially enlarged front view of the corner portion to which the upper block and the upper connection block of FIG. 27 are applied.

FIG. 30 is a partially enlarged front view of the corner portion to which the upper block and the upper connection block of FIG. 29 are applied.

BEST MODE FOR CARRYING OUT THE INVENTION

Figure 1:
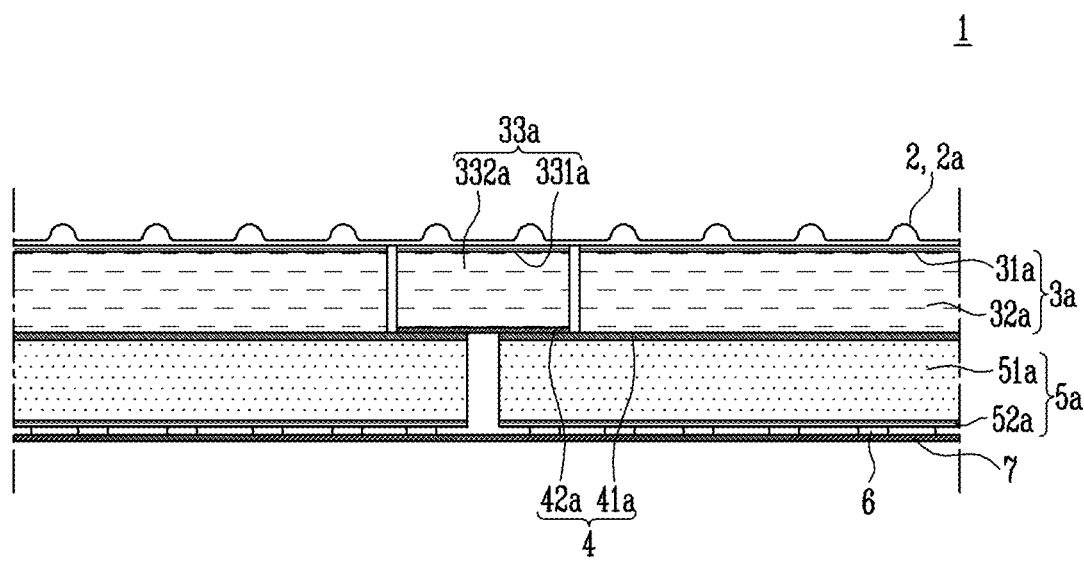
FIG. 1 is a partial cross-sectional view of a flat portion for describing a liquefied gas storage tank in accordance with a first embodiment of the present disclosure.

The objects, specific advantages and novel features of the present disclosure will become more apparent from the following detailed description and preferred embodiments taken in conjunction with the accompanying drawings. In the present specification, when adding reference numerals to the components of each drawing, it should be noted that only the same components are given the same numeral as possible even though they are depicted on different drawings. In addition, in describing the present disclosure, if it is determined that a detailed description of a related known art may unnecessarily obscure the subject matter of the present invention, the detailed description thereof will be omitted.

In addition, the accompanying drawings are only intended for easily understanding the embodiments disclosed herein, and the technical spirit disclosed herein is not limited by the accompanying drawings, and it should be interpreted to include all modifications, equivalents and substitutes included in the spirit and scope of the present disclosure.

Also, the terms including ordinal numbers such as first, second, etc. may be used to describe various elements, but the elements are not limited by these terms. The aforesaid terms are used only for the purpose of distinguishing one element from another. Additionally, it should be noted that among the terms used herein, the term "outer" refers to the outside of a liquefied gas storage tank, and the term "inner" refers to the inside of the liquefied gas storage tank.

Hereinafter, liquefied gas may be used to encompass all gas fuels that are generally stored in a liquid state, such as LNG, LPG, ethylene, ammonia, etc., and gas that is not in a liquid state due to heating or pressurization may also be referred to as a liquefied gas for convenience of discussion. The same may apply to boil-off gas as well. In addition, for convenience, LNG may be used to encompass both natural gas (NG) in a liquid state as well as LNG in a supercritical state, etc., and boil-off gas may be used to refer to not only gaseous boil-off gas, but also liquefied boil-off gas.

Hereinafter, preferred embodiments of the present disclosure will be described in detail with reference to the accompanying drawings.

Figure 2:
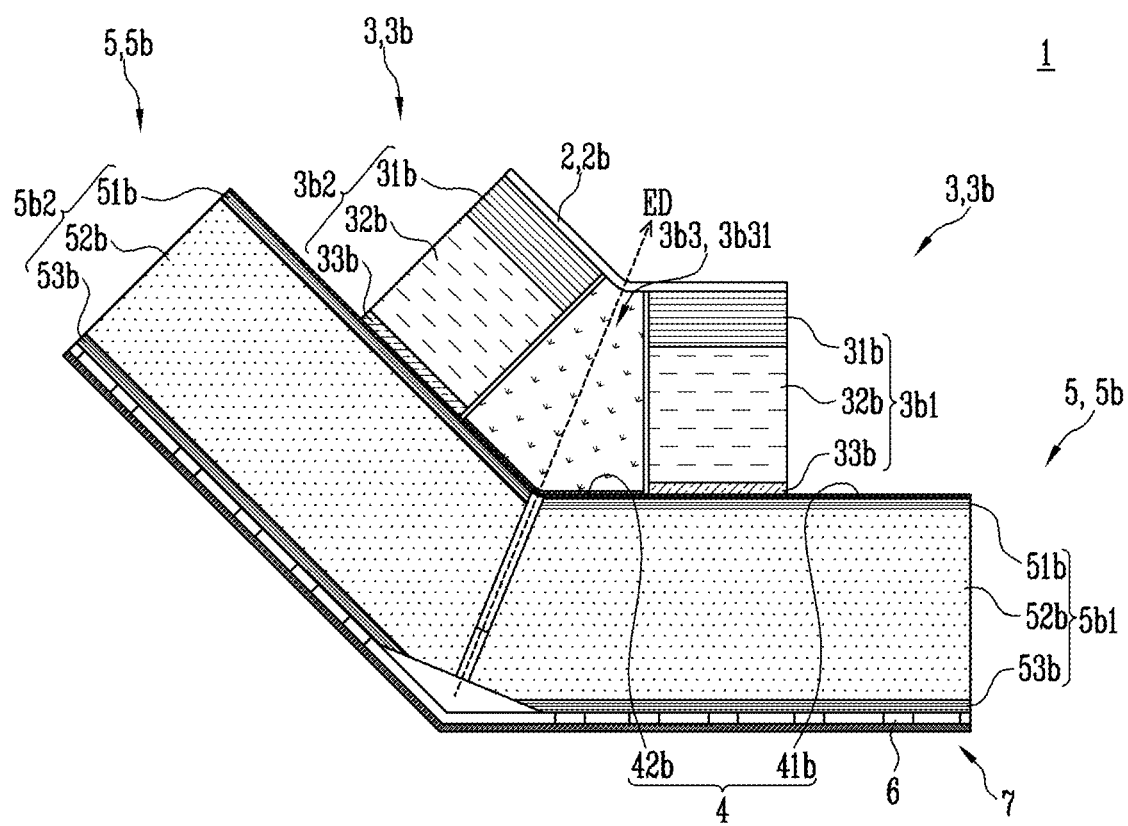
FIG. 2 is a cross-sectional view of a corner portion for describing the liquefied gas storage tank in accordance with the first embodiment of the present disclosure.
Figure 3:
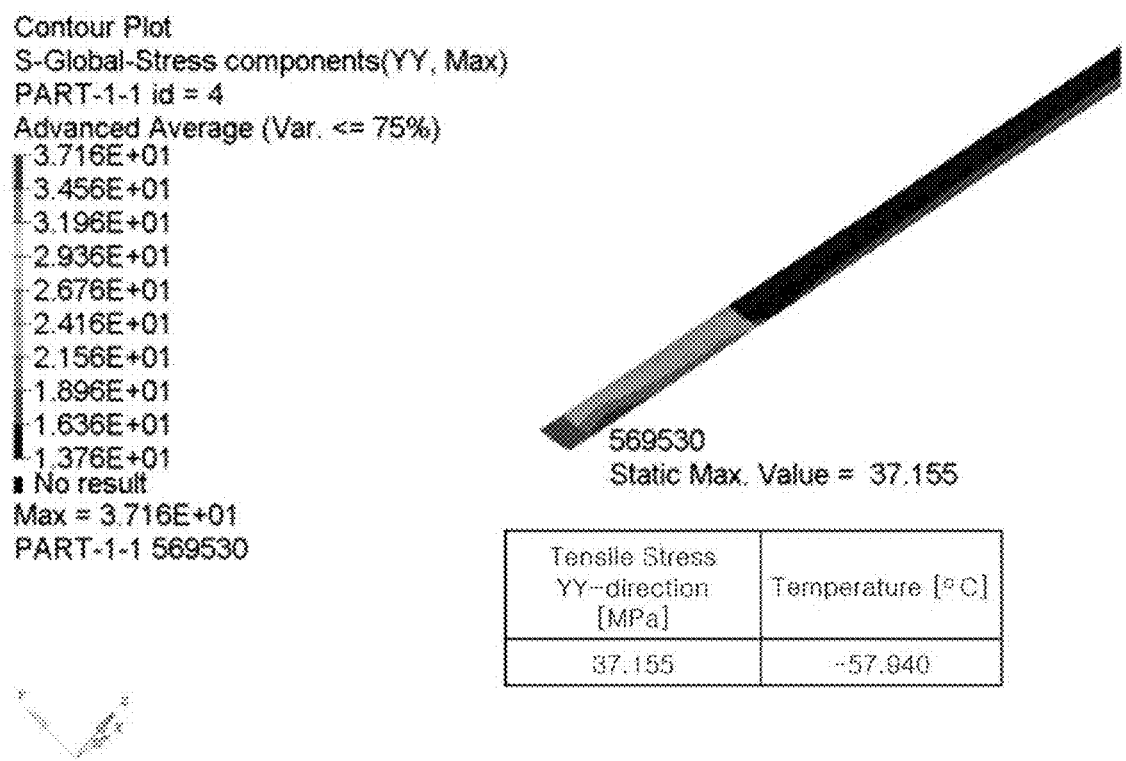
FIG. 3 is a diagram illustrating structural analysis results for the corner portion of the liquefied gas storage tank in accordance with the first embodiment of the present disclosure.

FIG. 1 is a partial cross-sectional view of a flat portion for describing a liquefied gas storage tank according to a first embodiment of the present disclosure, FIG. 2 is a cross-sectional view of a corner portion for describing the liquefied gas storage tank according to the first embodiment of the present disclosure, FIG. 3 is a diagram illustrating structural analysis results for the corner portion of the liquefied gas storage tank according to the first embodiment of the present disclosure, and FIG. 4 is a diagram illustrating other structural analysis results for the corner portion of the liquefied gas storage tank according to the first embodiment of the present disclosure.

Although not shown, a ship provided with a liquefied gas storage tank 1 as described below is a concept that encompasses off-shore structures configured to float at a certain point on the sea and perform specific tasks in addition to commercial ships that transport cargo from an origin to a destination. In addition, it should be noted that the liquefied gas storage tank 1 may include any type of tank for storing liquefied gas.

The liquefied gas storage tank 1 disposed on a ship may store liquefied gas such as LNG, which is a cryogenic material (at a temperature of about −160° C. to −170° C.), and may include a flat structure and a corner structure. For example, lateral walls in the front-rear direction, a floor between the lateral walls, vertical walls, and a ceiling of the liquefied gas storage tank 1 may correspond to a flat structure. Also, for example, a structure in which the lateral walls, the floor, the vertical walls, and the ceiling of the liquefied gas storage tank 1 meet may correspond to a corner structure. Here, the corner structure may include an obtuse-angled corner structure or a right-angled corner structure. When the thickness of a primary insulating wall 3 or a secondary insulating wall 5 changes, a change in the obtuse-angled corner structure or the right-angled corner structure may entail.

The flat structure of the liquefied gas storage tank 1 as shown in FIG. 1 may be made of a combination of a plurality of flat blocks, and the corner structure of the liquefied gas storage tank 1 as shown in FIG. 2 may be made of a combination of a plurality of corner blocks. The plurality of flat blocks may be connected to the plurality of corner blocks in the corner portion of the liquefied gas storage tank 1.

As shown in FIGS. 1 and 2, the liquefied gas storage tank 1 may be configured to include a primary barrier 2 in contact with liquefied gas, the primary insulating wall 3 disposed on the outside of the primary barrier 2, a secondary barrier 4 disposed on the outside of the primary insulating wall 3, and the secondary insulating wall 5 disposed on the outside of the secondary barrier 4. The liquefied gas storage tank 1 may be supported on a hull 7 by a mastic 6 disposed between the secondary insulating wall 5 and the hull 7.

In the above, the primary barrier 2 may include a flat primary barrier 2a of the flat block and a corner primary barrier 2b of the corner block, the primary insulating wall 3 may include a flat primary insulating wall 3a of the flat block and a corner primary insulating wall 3b of the corner block, the secondary barrier 4 may include a flat secondary barrier 41a of the flat block and a corner secondary barrier 41b of the corner block, and a secondary insulation wall 5 may include a flat secondary insulation wall 5a of the flat block and a corner secondary insulation wall 5b of the corner block.

In the above, when arranging a plurality of flat blocks or a plurality of corner blocks adjacent to each other, the secondary barrier 4 of the flat block and the corner block may include the flat secondary barriers 41a disposed adjacent to each other or a flat connecting barrier 42a or corner connecting barriers 42b connecting adjacent corner secondary barriers 41b.

The liquefied gas storage tank 1 may need to optimize the thicknesses of the primary insulating wall 3 and the secondary insulating wall 5 in order to optimize the insulating performance and storage capacity. For example, when a polyurethane foam is used as the major material of the primary insulating wall 3 and secondary insulating wall 5, a total sum of the thickness of the primary insulating wall 3 and the thickness of the secondary insulating wall 5 may be in the range of 250 mm to 500 mm, and in this embodiment, the thickness of the primary insulating wall 3 and the thickness of the secondary insulating wall 5 in the flat block and the corner block may be the same as or similar to each other.

In other words, in the liquefied gas storage tank of the related art, the thickness of the primary insulating wall in the flat block and the corner block is about ⅓ times thinner than the thickness of the secondary insulating wall. In contrast, the present embodiment configures the thickness of the primary insulating wall 3 and the thickness of the secondary insulating wall 5 in the flat block and the corner block to be the same as or similar to each other, the reason for which will be described below.

Firstly, referring to FIG. 1, the flat portion of the liquefied gas storage tank 1 according to the first embodiment of the present disclosure will be described below. The flat portion of the liquefied gas storage tank 1 includes a combination of a plurality of flat blocks, and it should be noted in advance that the configuration of the flat block of the liquefied gas storage tank 1 as described below applies the same not only to the first embodiment but also to the second embodiment to the eighth embodiment.

As shown in FIG. 1, the flat block of the liquefied gas storage tank 1 may be disposed on a flat portion on a first surface or a second surface at different angles forming a storage space for storing liquefied gas, and may include the flat primary insulating wall 3a disposed on the outside of the flat primary barrier 2a and securing the flat primary barrier 2a made of a metal material, the flat secondary barrier 41a disposed on the outside of the flat primary insulating wall 3a, and a flat secondary insulating wall 5a disposed on the outside of the flat secondary barrier 41a.

The flat primary barrier 2a may be disposed on a flat portion on the first surface or the second surface at different angles to form a storage space for storing liquefied gas, which is a cryogenic material, and may be made of a metal material. For example, the metal material may be a stainless steel material, but is not limited thereto. The flat primary barrier 2a may prevent leakage of liquefied gas to the outside in conjunction with the flat secondary barrier 41a.

The flat primary barrier 2a may be fixedly coupled to an upper portion of the flat primary insulating wall 3a by a metal strip (not shown), and may be disposed to be in direct contact with liquefied gas, which is a cryogenic material stored in the liquefied gas storage tank 1.

The flat primary barrier 2a seals the flat primary insulating wall 3a and the corner primary barrier 2b as shown in FIG. 2 when the flat block and the corner block as shown in FIG. 2 are adjacently connected to each other.

The flat primary insulating wall 3a may be designed to withstand an impact from the outside or an impact caused by sloshing of liquefied gas from the inside while blocking heat intrusion from the outside, and may be disposed between the flat primary barrier 2a and the flat secondary barrier 41a.

The flat primary insulating wall 3a may have a structure in which a flat primary plywood 31a and a flat primary insulation material 32a are sequentially stacked toward the outside of the flat primary barrier 2a, and a sum of the thickness of the flat primary plywood 31a and the thickness of the flat primary insulation material 32a may be, for example, in range of 160 mm to 250 mm, but is not limited thereto.

The flat primary plywood 31a may be disposed between the flat primary barrier 2a and the flat primary insulation material 32a.

The flat primary insulation material 32a is to be formed of a material having excellent thermal insulation performance as well as excellent mechanical strength so as to withstand the impact from the outside or sloshing of the liquefied gas from the inside while blocking the intrusion of heat from the outside.

The flat primary insulation material 32a may be formed of polyurethane foam between the flat primary plywood 31a and the flat secondary barrier 4a, and may account for most of the thickness of the flat primary insulating wall 3a.

The flat primary heat insulating wall 3a may be a part of the flat block with the flat secondary barrier 41a and the flat secondary insulating wall 5a, and the flat primary heat insulating wall 3a constituting the flat block may have a width smaller than the width of the flat secondary insulating wall 5a, which is another configuration for the flat block. Consequently, a portion of the flat secondary barrier 41a may be exposed on both sides of the flat primary insulating wall 3a. When a plurality of flat blocks are disposed adjacently, a flat connection insulating wall 33a may be disposed in a space portion between the adjacently disposed flat primary insulating walls 3a, that is, the space portion where the flat secondary barrier 41a is exposed.

The flat connection insulating wall 33a may be disposed between the adjacent flat primary insulating walls 3a when the flat blocks are disposed adjacent to each other. The flat connection insulating wall 33a may be provided as a stack of the flat connection plywood 331a, which is the same as or similar to the flat primary insulation wall 3a, and the flat connection insulation material 332a, and may have the same or similar thickness to the flat primary insulating wall 3a.

The flat connection insulating wall 33a may seal the space portion formed between the neighboring flat secondary insulating walls 5a with the flat connection barrier 42a when arranging a plurality of flat blocks adjacent to each other while also serving to block the intrusion of heat from the outside.

The flat secondary barrier 41a may be disposed between the flat primary insulating wall 3a and the flat secondary insulating wall 5a, and may be configured to prevent leakage of liquefied gas to the outside in conjunction with the flat primary barrier 2a.

The flat secondary barrier 41a is a part of the flat block together with the flat primary insulating wall 3a and the flat secondary insulating wall 5a, and may be connected by a flat connection barrier 42a when flat blocks are disposed adjacently.

The flat connection barrier 42a may connect the neighboring flat secondary barriers 41 exposed to the outside when the flat blocks are disposed adjacently, and the flat connection insulating wall 33a may be disposed thereon.

The flat secondary insulating wall 5a, together with the flat primary insulating wall 3a and the flat connection insulating wall 33a, may be designed to withstand an impact from an external shock or liquefied gas sloshing from the inside while blocking heat intrusion from the outside. In addition, the flat secondary insulating wall 5a may be disposed between the flat secondary barrier 4a and the hull 7, and may include a flat secondary insulation material 51a and a flat secondary plywood 52a.

The flat secondary insulating wall 5a may have a structure in which a flat secondary insulation material 51a and a flat secondary plywood 52a are sequentially stacked toward the outside of the flat secondary barrier 41a, and a sum of the thickness of the flat secondary insulation material 51a and the thickness of the flat secondary plywood 52a may be, for example, the same as or similar to the thickness of the flat primary insulating wall 3a such as in the range of 150 mm to 240 mm, but is not limited thereto.

The flat secondary insulation material 51a may be made of a material having excellent thermal insulation performance and excellent mechanical strength so as to withstand an impact from the outside or an impact caused by liquefied gas sloshing from the inside while blocking heat intrusion from the outside.

The flat secondary insulation material 51a may be formed of polyurethane foam between the flat secondary barrier 41a and the flat secondary plywood 52a, and accounts for most of the thickness of the flat secondary insulating wall 5a.

The flat secondary plywood 52a may be disposed between the flat secondary insulation material 51a and the hull 7.

As described above, in the flat block of the liquefied gas storage tank 1 of this embodiment, the flat connection insulating wall 33a encompassed by the flat primary insulating wall 3a may be configured to have the same or similar thickness to the thickness of the flat secondary insulating wall 5a. In connection with such configuration, the flat connection insulation material 332a of the flat connection insulation wall 33a may have a thickness of 90% to 110% of the flat secondary insulation material 51a such that the flat connection insulation material 332a of the flat connection insulation wall 33a has the same or similar thickness to that of the flat secondary insulation material 51a.

In other words, in the present embodiment, the thickness of the flat primary insulating wall 3a and the thickness of the flat secondary insulating wall 5a in the flat block were configured to be the same or similar, compared to the liquefied gas storage tank of the related art where the thickness of the primary insulating wall in the flat block is about ⅓ thinner than the thickness of the secondary insulating wall. This is to prevent damages due to low-temperature stress of the flat secondary heat insulating wall 41a.

In general, the flat secondary barrier 41a and the flat secondary insulating wall 5a have a difference in the amount of self-contraction depending on the temperature to which they are exposed. As such, in the case of the flat secondary barrier 41a and the flat secondary insulating wall 5a, as the thickness of the flat connection insulating wall 33a decreases, it may be significantly affected by the cooling and heating of the cryogenic liquefied gas. Furthermore, in this case, as the self-temperature is lowered, the amount of shrinkage itself may increase, resulting in a problem with the increased risk of damage to the flat secondary barrier 41a because stress at low temperature increases. In particular, this problem may occur frequently in the flat connection barrier 42a that interconnects the flat secondary barrier 41a below the flat connection insulation wall 33a by bonding or the like. In the lower portion of the flat connection insulation wall 33a, the flat connection barrier 42a may be connected to the flat secondary barrier 41a of the plurality of flat blocks having both ends adjacent to each other. This is because both ends of the flat connection barrier 42a may be deformed to move away from or move closer to each other as the flat secondary heat insulating wall 5a of the flat block contracts.

As the thickness of the flat primary insulating wall 3a encompassing the flat connection insulating wall 33a becomes relatively thicker compared to the related art, the present embodiment reduces the cryogenic burden on the flat secondary barrier 41a as well as the flat connection barrier 42a in particular by configuring the same or similar thicknesses for the flat primary insulating wall 3a and the flat secondary insulating wall 5a encompassing the flat connection insulating wall 33a. In addition, as the thickness of the flat secondary insulating wall 5a becomes relatively thin compared to the conventional one, the amount of shrinkage itself may decrease, thereby reducing stress at the low temperature. As the thickness of the insulating wall 5a becomes relatively thin compared to the conventional one, the amount of shrinkage itself is reduced, and thus the stress at low temperature is reduced. As a result, the risk of damages to the secondary barrier 4 in the portion where the plurality of flat blocks are disposed adjacent to each other may become relatively lower than that of the related art.

Referring to FIG. 2, the corner portion of the liquefied gas storage tank 1 according to the first embodiment of the present disclosure will be described below. The corner portion of the liquefied gas storage tank 1 may be formed of a combination of a plurality of corner blocks. The corner portion of the liquefied gas storage tank 1 is described below with an example of an obtuse-angled corner structure forming an angle of 135 degrees, but is not limited to such degree.

As shown in FIG. 2, the corner block of the liquefied gas storage tank 1 may be disposed at a corner portion where the first and second surfaces at different angles form a storage space for accommodating the liquefied gas, and may include a corner primary insulating wall 3b securing the corner primary barrier 2b made of metal and disposed on the outside of the corner primary barrier 2b, a corner secondary barrier 41b disposed on the outside of the corner primary insulating wall 3b, and a corner secondary insulating wall 5b disposed on the outside of the corner secondary barrier 41b. Here, the corner primary insulating wall 3b may further include an inner bent portion 3b3.

The corner primary barrier 2b may be disposed at a corner portion where the first surface or the second surface at different angles meet to form an accommodating space for accommodating liquefied gas, which is a cryogenic material, and may be made of a metal material. The corner primary barrier 2b may prevent leakage of liquefied gas to the outside in conjunction with the corner secondary barrier 41b.

Although not shown in FIG. 2, the corner primary barrier 2b may be fixedly coupled to the corner primary insulating wall 3b by a barrier fixing member installed in various ways such as bonding or bolting to an upper end of the corner primary insulating wall 3b so as to be disposed in direct contact with liquefied gas, which is a cryogenic material stored in the liquefied gas storage tank 1. As such, the corner primary barrier 2b described below may be used in a sense including a barrier fixing member or the like.

This corner primary barrier 2b may seal the corner primary insulating wall 3b and the flat primary barrier 2a as shown in FIG. 1 when the corner block and the flat block as shown in FIG. 1 are adjacently connected to each other, and the corner primary barrier 2b may be secured to an inner primary plywood 31b of an inner first fixing portion 3b1 and the inner primary plywood 31b of an inner second fixing portion 3b2, and may be provided to be bend at a predetermined angle, for example, 135 degrees from an inner surface of an insulation material 3b31 of the inner bent portion 3b3.

The corner primary insulating wall 3b may be designed to withstand an impact from the outside or an impact caused by liquefied gas sloshing from the inside while blocking heat intrusion from the outside, and may be disposed between the corner primary barrier 2b and the corner secondary barrier 41b.

The corner primary insulating walls 3b may be disposed on the inside of the first and second surfaces, respectively, and may include the inner first fixing portion 3b1 and the inner second fixing portion 3b2 including the inner primary plywood 31b, corner primary insulation material 32b, and outer primary plywood 33b sequentially stacked toward the outside of the corner primary barrier 2b.

Here, the inner first fixing portion 3b1 may be secured to an outer first fixing portion 5b1 and disposed on the inside of the first surface, and the inner second fixing portion 3b2 may be secured to an outer second fixing portion 5b2 and provided on the inside of the second surface.

In addition, the corner primary insulating walls 3b may include an inner bent portion 3b3 configured by filling an insulation material 3b31 between the inner first fixing portion 3b1 and the inner second fixing portion 3b2.

In this corner primary insulating walls 3b, a sum of the thickness of the inner primary plywood 31b, the thickness of the corner primary insulation material 32b, and the thickness of the outer primary plywood 33b may be the same as the thickness of the flat primary insulating walls 3a (e.g. a thickness of 160 mm to 250 mm) as described above.

The inner primary plywood 31b may be disposed between the corner primary barrier 2b and the corner primary insulation material 32b.

In this embodiment, as the primary insulating walls 3 in the flat block and the corner block may be formed to be thicker than the thickness of the primary insulating walls of the related art, it may be possible to reduce the thickness of the inner primary plywood 31b constituting the corner primary insulating walls 3b of the corner block, and a remaining portion of the thickness may be replaced with the corner primary insulation material 32b made of polyurethane foam.

The inner primary plywood 31b of this embodiment may have a thickness of 20 mm to 80 mm.

As such, in this embodiment, by forming the inner first and second fixing portions 3b1, 3b2 for holding the barrier fixing member to which the corner primary barrier 2b is secured in the corner block from a combination with the corner primary insulation material 32b of polyurethane foam in place of only plywood having a thickness of about 92 mm as in the related art, insulation performance may be improved, and related weights and costs may be reduced compared to the related art consisting only of plywood.

The corner primary insulation material 32b may be disposed between the inner primary plywood 31b and the outer primary plywood 33b, and may be formed of high-density polyurethane foam, which is a material having excellent insulation performance and excellent mechanical strength so as to withstand an impact from the outside or an impact caused by liquefied gas sloshing from the inside while blocking heat intrusion from the outside.

The outer primary plywood 33b may be disposed between the corner primary insulation material 32b and the corner secondary barrier 41b, and may be secured to the corner secondary barrier 41b.

The outer primary plywood 33b may be formed to have a thickness of 6.5 mm to 15 mm.

As described above, the corner primary insulating wall 3b of this embodiment may be configured to have a structure in which the inner primary plywood 31b, the corner primary insulation material 32b, and the outer primary plywood 33b are sequentially stacked. Therefore, the high strength inner primary plywood 31b and the outer primary plywood 33b may hold thermal contraction of the corner primary insulation material 32b such that the thermal contraction of the corner primary insulation material 32b is not directly applied to the secondary barriers 4, 41b, and 42b between the outer first and second fixing portions 5b1, 5b2, and it may be also possible to easily control the tolerance of the inner primary plywood 31b and the outer primary plywood 33b sensitive to humidity by providing the corner primary insulation material 32b as an intermediate layer.

Each of the inner first and second fixing portions 3b1 and 3b2 consisting of the corner primary insulating walls 3b is secured to each of the outer first and second fixing portions 5b1, 5b2 consisting of the corner secondary barrier 41b and the corner secondary insulating walls 5b, and each of these inner first and second fixing portions 3b1 and 3b2 may have a width smaller than that of each of the outer first and second fixing portions 5b1 and 5b2. As a result, when a plurality of corner blocks are disposed adjacently along the sides of the corner portion where the first surface and the second surface at different angles meet, the inner bent portion 3b3 may be formed in a space portion between the adjacent inner first and second fixing portions 3b1 and 3b2, that is, in the space portion where the corner secondary barrier 41b is exposed.

The inner bent portion 3b3 may be configured by filling it with the insulation material 3b31.

The insulation material 3b31 of the inner bent portion 3b3 may be a low-density polyurethane foam, and the secondary barrier 4 in which the corner secondary barrier 41b and the corner connection barrier 42b are stacked may be disposed on the outer surface bent at a predetermined angle, for example, an angle of 135 degrees.

The insulation material 3b31 of the inner bent portion 3b3 may serve to block the heat intrusion from the outside by sealing the space portion formed between the adjacently disposed outer first and second fixing portions 5b1 and 5b2 in conjunction with the corner connection barrier 42b when the plurality of corner blocks are disposed adjacently.

The corner secondary barrier 41b may be disposed on the outside of the corner primary insulating walls 3b. The corner secondary barrier 41b may be disposed between the corner primary insulating walls 3b and the corner secondary insulating walls 5b, and may be configured to prevent leakage of liquefied gas to the outside in conjunction with the corner primary barrier 2b.

The corner secondary barrier 41b is a part of the configuration of the corner block together with the corner primary insulating walls 3b and the corner secondary insulating walls 5b, and the neighboring corner secondary barrier 41b between the outer first and second fixing portions 5b1 and 5b2 may be connected by a corner connecting barrier 42b when corner blocks are disposed adjacently.

The corner connection barrier 42b may connect the neighboring corner secondary barriers 41b exposed to the outside when the corner blocks are disposed adjacently, and the insulation material 3b31 of the inner bent portion 3b3 may be disposed thereon so as to seal the space formed between the insulation material 3b31 of the inner bent part 3b3 and the outer first and second fixing portions 5b1 and 5b2 disposed adjacent to each other, thereby serving to block heat intrusion from the outside. In this embodiment, the corner connecting barrier 42b may be formed to extend not only between the inner first and second fixing portions 3b1 and 3b2, but also extend to a length overlapping with at least the inner first and second fixing portions 3b1 and 3b2.

At a point where the outer first and second fixing portions 5b1 and 5b2 meet, the secondary barrier 4 in which the corner secondary barrier 41b and the corner connecting barrier 42b are stacked may be disposed to be bent.

The corner secondary insulating walls 5b may be disposed on the outside of the corner secondary barrier 41b. The corner secondary insulating wall 5b may be designed to withstand an impact from the outside or an impact caused by liquefied gas sloshing from the inside while blocking heat intrusion from the outside in conjunction with the insulation material 3b31 of the inner bent portion 3b3 and the corner primary insulating walls 3b. In addition, the corner secondary insulation wall 5b may be disposed between the corner secondary barrier 4b and the hull 7, and may be configured to include the inner secondary plywood 51b, the corner secondary insulation material 52b, and the outer secondary plywood 53b.

The corner secondary insulating walls 5b may be secured to the inside of the first and second surfaces, respectively, and may include the outer first fixing portion 5b1 and the outer second fixing portion 5b2 including the inner secondary plywood 51b, the corner secondary insulation material 52b, the outer secondary plywood 53b sequentially stacked toward the outside of the corner secondary barrier 2b.

Here, the outer first fixing portion 5b1 may be secured to the inside of the first surface, and the outer second fixing portion 5b2 may be secured to the inside of the second surface.

The side on which the outer first fixing portion 5b1 secured to the first surface and the outer second fixing portion 5b2 secured to the second surface face each other may be disposed to be inclined in the direction ED of evenly dividing the corner portion. In the present embodiment, the corner portion is described to be equally divided, but it is not limited thereto, and as the division may not be equal depending on the position of the corner, the side may also be disposed to be inclined in the direction ED of unevenly dividing the corner portion.

The thickness of this corner secondary insulating walls 5b may have a thickness that is a sum of the thickness of the inner secondary plywood 51b, the thickness of the corner secondary insulation material 52b, and the thickness of the outer secondary plywood 53b, which is the same as that of the flat secondary insulating walls 5a (e.g., 150 mm to 240 mm) as described above.

The inner secondary plywood 51b may be disposed between the corner secondary barrier 2b and the corner secondary insulation material 51b, and may secure the corner secondary barrier 2b. The inner secondary plywood 51b may be formed to have a thickness of 6.5 mm to 15 mm.

The corner secondary insulation material 52b may be formed of a material having excellent thermal insulation performance and excellent mechanical strength so as to withstand an impact from the outside or an impact caused by liquefied gas sloshing from the inside while blocking heat intrusion from the outside.

The corner secondary insulation material 52b may be formed of polyurethane foam between the inner secondary plywood 51b and the outer secondary plywood 53b, accounting for most of the thickness of the corner secondary insulating walls 5b.

The outer secondary plywood 53b may be disposed between the corner secondary insulation material 52b and the hull 7. The outer secondary plywood 53b may be formed to have a thickness of 6.5 mm to 25 mm.

In the liquefied gas storage tank 1 according to the present embodiment, as the thickness of the primary insulation walls 3 become relatively thicker than that of the related art, the secondary barrier 4 in the flat block as well as the corner block may move toward the hull 7 side, thereby increasing the radius of curvature. In this case, as the radius of curvature of the secondary barrier 4 increases at the corner portion, the length of the portion where the secondary barrier 4 is not attached to the secondary insulating walls 5 also increases. This means an increase in the flexibility of the secondary barrier 4 in the obtuse-angled corner structure, whereby the secondary barrier 4 in the obtuse-angled corner structure may absorb peripheral deformations, for example, hull deformation may be facilitated, and the low-temperature stress may also be reduced. In the case of this embodiment, the length of the non-adhesive portion may be, for example, 0 mm to 100 mm, preferably 50 mm to 100 mm.

As described above, the secondary barrier 4 in the obtuse-angled corner structure of the present disclosure may have reduced low-temperature stress applied thereon compared to the obtuse-angled corner structure of the primary insulating walls 3 formed with a relatively thin thickness. In addition, since the non-adhesive portion increases, it is also easy to absorb hull deformations.

This is proven by the structural analysis results for the corner portion of the liquefied gas storage tank 1 according to this embodiment in FIGS. 3 and 4.

As for the conditions for the structural analysis, heat transfer analysis was performed at 20° C. at the hull position and 163° C. at the primary barrier, and structural analysis was carried out using a resulting temperature distribution.

In addition, according to the existing liquefied gas storage tank of the related art for comparing the results obtained from the structural analysis of the liquefied gas storage tank 1 of this embodiment, the thickness of the primary insulating walls is about ⅓ times thinner than that of the secondary insulating walls, the fixing members corresponding to the inner first and second fixing portions 3$b$1 and 3$b$2 consist of only plywood, the length of the non-adhesive portion is 50 mm, and in such existing liquefied gas storage tank, a value of the stress of the bent portion of the secondary barrier in the YY direction was about 66.8984 MPa, and the temperature was about −135.857° C.

The stress value in the YY direction obtained as a result of structural analysis corresponds to a stress value at the corner, and the lower the value is, there is less stress. The temperature corresponds to a temperature at the corner, and the higher the temperature, the less stress (represents a value changed after installation at room temperature of 25° C.).

It should be noted in advance that the aforesaid conditions are not only applied to this embodiment, but also may be equally applied to the structural analysis of the liquefied gas storage tank 1 according to the second to seventh embodiments as described below.

FIG. 3 shows results of structural analysis of the temperature distribution and the stress value in the YY direction of the secondary barriers 4, 41$b$, 42$b$ in the bent portion where the outer first and second fixing portions 5$b$1 and 5$b$2 face each other when the length of the non-adhesive portion in this embodiment is 50 mm. The stress value in the YY direction was 37.155 MPa, and the temperature was −57.940° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41$b$ and 42$b$ of the present embodiment, meaning a decrease in the influence of cold heat from cryogenic materials such as damages due to the low temperature stress in the secondary barriers 4, 41$b$, and 42$b$ of the present embodiment.

FIG. 4 shows results of structural analysis of the temperature distribution and the stress value in the YY direction of the secondary barriers 4, 41$b$, 42$b$ in the bent portion where the outer first and second fixing portions 5$b$1 and 5$b$2 face each other when the length of the non-adhesive portion of this embodiment is 97 mm. The stress value in the YY direction was 12.084 MPa, and the temperature was −59.025° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41$b$ and 42$b$ of the present embodiment, meaning a decrease in the influence of cold heat from cryogenic materials such as damages due to the low temperature stress in the secondary barriers 4, 41$b$, and 42$b$ of the present embodiment.

As such, in this embodiment, by forming the inner first and second fixing portions 3$b$1, 3$b$2 for holding the barrier fixing member to which the corner primary barrier 2$b$ is secured in the corner block from a combination with the insulation material 3$b$31 of polyurethane foam instead of only plywood, insulation performance may be improved, and related weights and costs may be reduced compared to those of the related art which consist only of plywood.

In addition, according to the present embodiment, the corner primary insulating wall 3$b$ of the corner block connected to the flat primary insulating wall 3$a$ of the flat block may be configured to have the same or similar thickness to that of the corner secondary insulating walls 5$b$ of the corner block connected to the flat secondary insulating walls 5$a$ of the flat block, thereby increasing the thickness of the corner primary insulating walls 3$b$ compared to the related art (however, the thickness of the corner secondary insulation wall 5$b$ is sufficient to maintain the mechanical strength at a certain level). Therefore, it is possible to reduce the low-temperature burden and the sloshing burden of the secondary barriers 4, 41$b$, 42$b$ between the outer first and second fixing portions 5$b$1, 5$b$2, and to prevent damages to the secondary barriers 4, 41$b$, 42$b$ as well as to reduce the low-temperature burden of the secondary barriers 4, 41$b$, 42$b$ such that brittle fracture of the hull may be prevented.

In addition, in the present embodiment, the thickness of the corner primary insulating walls 3$b$ may be configured to be relatively thicker than the related art so that the length of the non-adhesive portion of the secondary barriers 4, 41$b$, 42$b$ to the corner secondary insulating wall 5$b$ is increased. As a result, due to the increased flexibility of the secondary barriers 4, 41$b$, 42$b$, it is possible to further lower the probability of damages to the secondary barriers 4, 41$b$, 42$b$, and the secondary barriers 4, 41$b$, 42$b$ may easily absorb hull deformations while further reducing the low-temperature stress.

Figure 5:
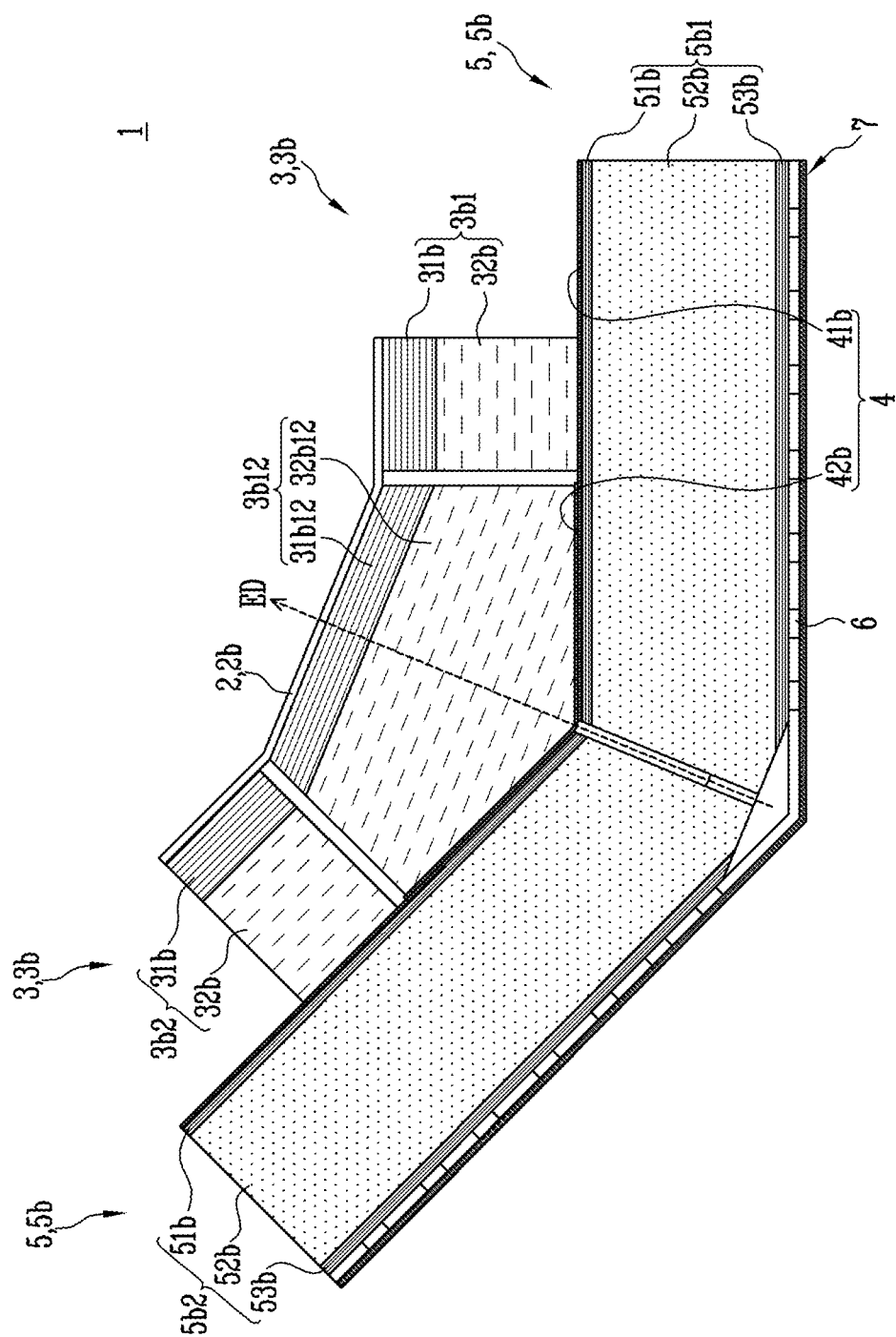
FIG. 5 is a cross-sectional view of the corner portion for describing a liquefied gas storage tank in accordance with a second embodiment of the present disclosure.
Figure 6:
FIG. 6 is a diagram illustrating structural analysis results for a corner portion of the liquefied gas storage tank in accordance with the second embodiment of the present disclosure.

FIG. 5 is a cross-sectional view of the corner portion for describing a liquefied gas storage tank according to a second embodiment of the present disclosure, and FIG. 6 is a diagram illustrating structural analysis results for the corner portion of the liquefied gas storage tank according to the second embodiment of the present disclosure.

The flat structure of the liquefied gas storage tank 1 of this embodiment may consist of a combination of a plurality of flat blocks as shown in FIG. 1, and the corner structure of the liquefied gas storage tank 1 may consist of a combination of a plurality of corner blocks as shown in FIG. 5. The plurality of flat blocks may be connected to the plurality of corner blocks at the corner portion of the liquefied gas storage tank 1.

In the liquefied gas storage tank 1 of this embodiment, the configuration of the flat blocks is the same as or similar to the configuration as described above with reference to FIG. 1. In other words, as shown in FIG. 1, the flat block of the liquefied gas storage tank 1 may be disposed on a flat portion on a first surface or a second surface at different angles forming a storage space for accommodating liquefied gas, and may include the flat primary insulating wall 3$a$ disposed on the outside of the flat primary barrier 2$a$ and securing the flat primary barrier 2$a$ made of a metal material, the flat secondary barrier 41$a$ disposed on the outside of the flat primary insulating wall 3$a$, and a flat secondary insulating wall 5$a$ disposed on the outside of the flat secondary barrier 41$a$.

Accordingly, a detailed description of the configuration of the flat block of the liquefied gas storage tank 1 is omitted here to avoid redundancy. Hereinafter, the configuration of the corner block of the liquefied gas storage tank 1 of this embodiment will be described in detail with reference to FIGS. 1 and 5.

As shown in FIGS. 1 and 5, the liquefied gas storage tank 1 may be configured to include the primary barrier 2 in contact with the liquefied gas, the primary insulating wall 3 disposed on the outside of the primary barrier 2, the secondary barrier 4 disposed on the outside of the primary insulating wall 3, and the secondary insulating wall 5 disposed on the outside of the secondary barrier 4. The liquefied gas storage tank 1 may be supported by the mastic 6 disposed between the secondary insulating wall 5 and the hulls 7.

In the above, the primary barrier 2 may include the flat primary barrier 2a of the flat block and the corner primary barrier 2b of the corner block, the primary insulating wall 3 may include the flat primary insulating wall 3a of the flat block and the corner primary insulating wall 3b of the corner block, the secondary barrier 4 may include the flat secondary barrier 41a of the flat block and the corner secondary barrier 41b of the corner block, and the secondary insulating wall 5 may include the flat secondary insulating wall 5a of the flat block and the corner secondary insulation wall 5b of the corner block. In this embodiment, as in the first embodiment, the thickness of the primary insulating wall 3 and the thickness of the secondary insulating wall 5 in the flat block and the corner block may be configured the same as or similar to each other.

In the above, the secondary barrier 4 of the flat block and the corner block, when arranging a plurality of flat blocks or a plurality of corner blocks adjacently, may further include a flat connection barrier 42a or a corner connection barrier 42b for connecting adjacently disposed flat secondary barriers 41a or adjacently disposed corner secondary barriers 41b.

As shown in FIG. 5, the corner portion of the liquefied gas storage tank 1 according to the second embodiment of the present disclosure may consist of a combination of a plurality of corner blocks. The corner structure of the liquefied gas storage tank 1 as described below may be an obtuse-angled corner structure forming a predetermined angle, for example, 135 degrees.

The corner block of the liquefied gas storage tank 1 may be disposed at the corner portion where the first surface and the second surface at different angles forming a storage space for accommodating liquefied gas meet, and the corner block may include the corner primary insulating wall 3b disposed on the outside of the corner primary barrier 2b and securing the corner primary barrier 2b made of a metal material, the corner secondary barrier 41b disposed on the outside of the corner primary insulating wall 3b, and the corner secondary insulating wall 5b disposed on the outside of the corner secondary barrier 41b.

The corner primary barrier 2b may be disposed at the corner portion where the first surface or the second surface at different angles meet to form an accommodating space for accommodating liquefied gas, which is a cryogenic material, and the corner primary barrier 2b may be made of a metal material. The corner primary barrier 2b may prevent leakage of liquefied gas to the outside in conjunction with the corner secondary barrier 41b.

The corner primary barrier 2b of the present embodiment is basically the same as or similar to the first embodiment as described above, and thus detailed description thereof will be omitted here. However, the corner primary barrier 2b of this embodiment may have a different bending angle as the configuration of the corner primary insulating wall 3b is different from that of the first embodiment, which will be discussed below when describing the corner primary insulating wall 3b.

The corner primary insulating wall 3b may be designed to withstand an impact from the outside or an impact caused by liquefied gas sloshing from the inside while blocking heat intrusion from the outside, and may be disposed between the corner primary barrier 2b and the corner secondary barrier 41b. When compared to the first embodiment as described above, the configuration of the corner primary insulating wall 3b of this embodiment is the same as or similar to that of the first embodiment except that the outer primary plywood 33b is omitted, and the placement of the inner bent portion 3b3 configured by filling the insulation material 3b31. Therefore, the differences therebetween will be mainly discussed below.

The corner primary insulating wall 3b may be provided on the inside of the first surface and the second surface, respectively, and may include the inner first fixing portion 3b1 and the inner second fixing portion 3b2 configured to include the inner first plywood 31b and the corner primary insulation material 32b stacked sequentially toward the outside of the corner primary barrier 2b. Here, the inner primary plywood 31b and the corner primary insulation material 32b of this embodiment may be the same as or similar to those of the first embodiment as described above, and thus detailed descriptions thereof are omitted to avoid redundancy.

The inner first fixing portion 3b1 may be disposed on the inside of the first surface by being secured to the outer first fixing portion 5b1, and the inner second fixing portion 3b2 may be disposed on the inside of the second surface by being secured to the outer second fixing portion 5b2.

In addition, the corner primary insulating wall 3b may include an inner intermediate fixing portion 3b12 provided between the inner first fixing portion 3b1 and the inner second fixing portion 3b2.

The inner intermediate fixing portion 3b12 may include a corner intermediate insulation material 32b12 secured to the corner connecting barrier 42b connecting the neighboring corner secondary barriers 41b, and an inner intermediate plywood 31b12 disposed on the inside of the corner intermediate insulation material 32b12 and to which the corner primary barrier 2b is secured.

The inner middle plywood 31b12 may be formed to have the same or similar configuration to that of the inner first plywood 31b, and the corner primary barrier 2b may be secured thereto in conjunction with the inner primary plywood 31b.

The inner intermediate plywood 31b12 may be parallel to the direction perpendicular to the evenly dividing direction ED when the corner portion is evenly divided. However, of course, the inner intermediate plywood 31b12 may not be parallel to the direction perpendicular to the direction ED for dividing the corner portion when unevenly dividing the corner portion.

The corner intermediate insulation material 32b12 may be formed of the same or similar material to the corner primary insulation material 32b. The corner intermediate insulation material 32b12 may be formed of high-density polyurethane foam.

This corner intermediate heat insulation material 32b12, when arranging a plurality of corner blocks adjacently, may seal the space portion formed between the adjacently disposed outer first and second fixing portions 5b1 and 5b2 in conjunction with the corner connection barrier 42b, serving to block heat intrusion from the outside. In this embodiment, the corner connecting barrier 42b may be formed to extend not only between the inner first and second fixing portions 3*b*1 and 3*b*2, but also extend to a length overlapping with at least the inner first and second fixing portions 3*b*1 and 3*b*2.

The corner primary barrier 2*b* may be secured to the inner primary plywood 31*b* of the inner first fixing portion 3*b*1, the inner intermediate plywood 31*b*12 of the inner intermediate fixing portion 3*b*12, and the inner primary plywood 31*b* of the inner second fixing portion 3*b*2 by disposing the inner intermediate plywood 31*b*12 between the inner first fixing portion 3*b*1 and the inner second fixing portion 3*b*2, and the corner primary barrier 2*b* may be bent in an angle range of 150 degrees to 160 degrees between the inner first fixing portion 3*b*1 and the inner intermediate fixing portion 3*b*12, and between the inner intermediate fixing portion 3*b*12 and the inner second fixing portion 3*b*2.

As such, by spacing apart the inner first fixing portion 3*b*1 and the inner second fixing portion 3*b*2 provided on the inside of the first surface and the second surface by a predetermined distance at different angles, and providing an inner intermediate fixing portion 3*b*12 between the inner first and second fixing portions 3*b*1 and 3*b*2, the present embodiment may reduce the bending angle of the corner primary barrier 2*b* by the inner intermediate fixing portion 3*b*12, thereby reducing the burden of sloshing in the corner primary barrier 2*b* and increasing the mechanical strength of the corner portion.

The corner secondary barrier 41*b* may be disposed between the corner primary insulating wall 3*b* and the corner secondary insulating wall 5*b*, and when the corner blocks are adjacently disposed, the corner secondary barrier 41*b* neighboring between the outer first and second fixing portions 5*b*1 and 5*b*2 may be connected by the corner connection barrier 42*b*, serving to prevent leakage of liquefied gas to the outside in conjunction with the corner primary barrier 2*b*. The corner secondary barrier 41*b* of the present embodiment is the same as or similar to that of the first embodiment as described above, and detailed descriptions thereof are omitted to avoid redundancy.

The corner secondary insulation wall 5*b* may be configured to include the inner secondary plywood 51*b*, corner secondary insulation material 52*b*, and outer secondary plywood 53*b*. The corner secondary insulating wall 5*b* may be secured to the inside of the first side and the second side, respectively, and may include the outer first fixing portion 5*b*1 and the outer second fixing portion 5*b*2 configured to include the inner secondary plywood 51*b*, the corner secondary insulation material 52*b*, and the outer secondary plywood 53*b* stacked sequentially toward the outside of the corner secondary barrier 2*b*.

The corner secondary insulating wall 5*b* of this embodiment is the same as or similar to that of the first embodiment as described above, and detailed descriptions thereof are omitted to avoid redundancy.

FIG. 6 shows results of structural analysis of the temperature distribution and the stress value in the YY direction of the secondary barriers 4, 41*b*, 42*b* in the bent portion where the outer first and second fixing portions 5*b*1 and 5*b*2 face each other. The stress value was 10.982 MPa, and the temperature was −67.914° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41*b* and 42*b* of the present embodiment, meaning a decrease in the influence of cold heat from cryogenic materials such as damages due to the low temperature stress in the secondary barriers 4, 41*b*, and 42*b* of the present embodiment.

Figure 7:
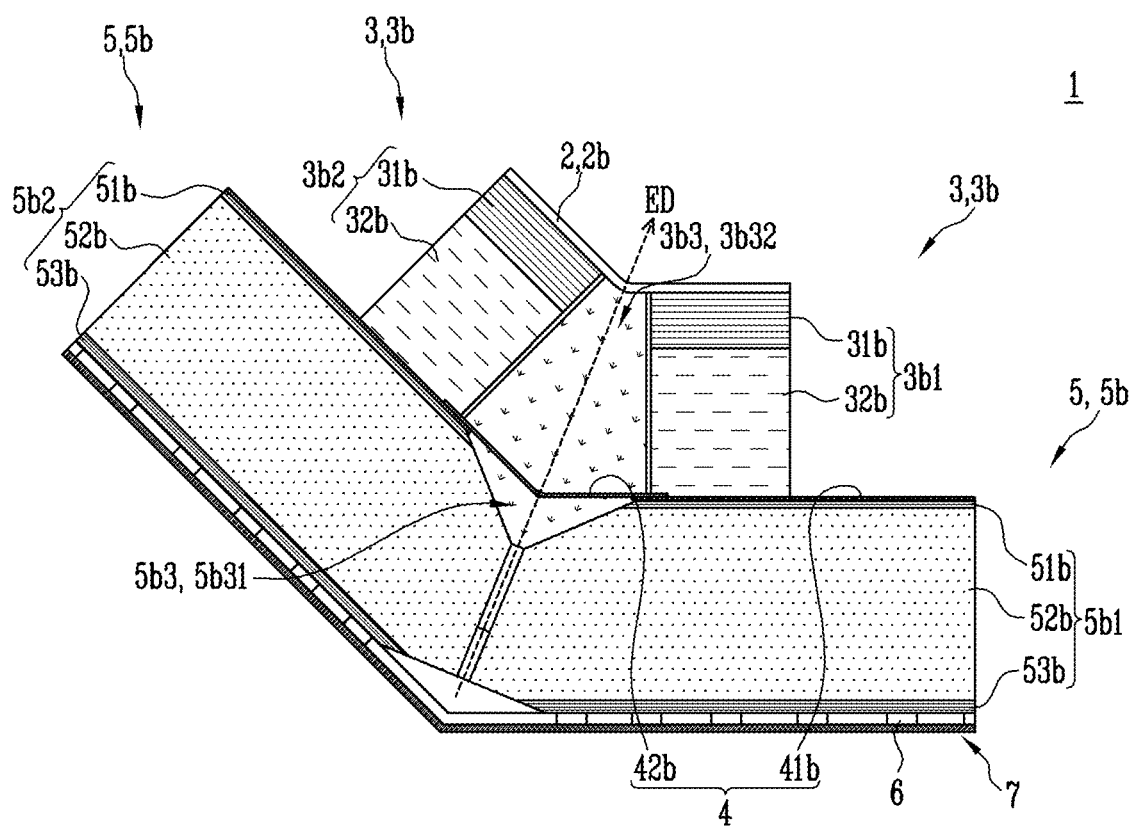
FIG. 7 is a cross-sectional view of a corner portion for describing a liquefied gas storage tank in accordance with a third embodiment of the present disclosure.

FIG. 7 is a cross-sectional view of a corner portion for describing a liquefied gas storage tank according to a third embodiment of the present disclosure, and FIG. 8 is a diagram illustrating structural analysis results for the corner portion of the liquefied gas storage tank according to the third embodiment of the present disclosure.

The flat structure of the liquefied gas storage tank 1 of this embodiment may consist of a combination of a plurality of flat blocks as shown in FIG. 1 described above, and the corner structure of the liquefied gas storage tank 1 may consist of a combination of a plurality of corner blocks as shown in FIG. 7. The flat blocks may be connected to the plurality of corner blocks in the corner portion of the liquefied gas storage tank 1.

In the liquefied gas storage tank 1 of this embodiment, the configuration of the flat block is the same as or similar to the configuration as described above with reference to FIG. 1. In other words, as shown in FIG. 1, the flat block of the liquefied gas storage tank 1 may be disposed on a flat portion on a first surface or a second surface at different angles forming a storage space for storing liquefied gas, and may include the flat primary insulating wall 3*a* disposed on the outside of the flat primary barrier 2*a* and securing the flat primary barrier 2*a* made of a metal material, the flat secondary barrier 41*a* disposed on the outside of the flat primary insulating wall 3*a*, and the flat secondary insulating wall 5*a* disposed on the outside of the flat secondary barrier 41*a*.

Accordingly, detailed descriptions of the flat block configuration of the liquefied gas storage tank 1 are omitted herein to avoid redundancy. Hereinafter, the configuration of the corner block of the liquefied gas storage tank 1 of this embodiment will be described below in detail with reference to FIGS. 1 and 7.

As shown in FIGS. 1 and 7, the liquefied gas storage tank 1 may be configured to include the primary barrier 2 in contact with the liquefied gas, the primary insulating wall 3 disposed on the outside of the primary barrier 2, the secondary barrier 4 disposed on the outside of the primary insulating wall 3, and the secondary insulating wall 5 disposed on the outside of the secondary barrier 4. The liquefied gas storage tank 1 may be supported on the hull 7 by the mastic 6 disposed between the secondary insulating wall 5 and the hull 7.

In the above, the primary barrier 2 may consist of the flat primary barrier 2*a* of the flat block and the corner primary barrier 2*b* of the corner block, the primary insulating wall 3 may consist of the flat primary insulating wall 3*a* of the flat block and the corner primary insulating wall 3*b* of the corner block, the secondary barrier 4 may consist of the flat secondary barrier 41*a* of the flat block and the corner secondary barrier 41*b* of the corner block, and the secondary insulating wall 5 may consist of the flat secondary insulating wall 5*a* of the flat block and the corner secondary insulation wall 5*b* of the corner block. As described in the first embodiment, in this embodiment, the thickness of the primary insulating wall 3 and the thickness of the secondary insulating wall 5 in the flat block and the corner block may be the same as or similar to each other.

In the above, when disposing a plurality of flat blocks or a plurality of corner blocks adjacently, the secondary barrier 4 of the flat block and the corner block may include the flat connection barrier 42*a* or the corner connection barrier 42*b* connecting the adjacently disposed flat secondary barriers 41*a* or the adjacently disposed corner secondary barriers 41*b*.

As shown in FIG. 7, the corner portion of the liquefied gas storage tank 1 according to the third embodiment of the present disclosure may consist of a combination of a plurality of corner blocks. The corner structure of the liquefied gas storage tank 1 as described below may be an obtuse-angled corner structure forming a predetermined angle, for example, 135 degrees.

In this embodiment, unlike the drawing, the corner primary insulating wall 3b may also be positioned to expose the corner secondary barrier 41b constructed on the corner secondary insulating wall 5b at the center of the corner portion. Therefore, it is also possible to finish the exposed corner secondary barrier 41b by interconnecting with the corner connecting barrier 42b, or to stack the corner primary insulating wall 3b on top of the corner secondary barrier 41b/corner connecting barrier 42b after the construction of the corner connection barrier 42b to connect the adjacently disposed neighboring corner secondary barrier 41b. In this embodiment, the corner connecting barrier 42b may be formed to extend not only between the inner first and second fixing portions 3b1 and 3b2, but also extend to a length overlapping with at least the inner first and second fixing portions 3b1 and 3b2.

The corner block of the liquefied gas storage tank 1 may be disposed at the corner portion where the first surface and the second surface at different angles forming a storage space for accommodating liquefied gas meet, and the corner block may include the corner primary insulating wall 3b disposed on the outside of the corner primary barrier 2b and securing the corner primary barrier 2b made of a metal material, the corner secondary barrier 41b disposed on the outside of the corner primary insulating wall 3b, and the corner secondary insulating wall 5b disposed on the outside of the corner secondary barrier 41b.

The corner primary barrier 2b may be disposed at the corner portion where the first surface or the second surface at different angles meet to form an accommodating space for accommodating liquefied gas, which is a cryogenic material, and may be made of a metal material. The corner primary barrier 2b may prevent leakage of liquefied gas to the outside in conjunction with the corner secondary barrier 41b.

The corner primary barrier 2b of this embodiment is basically the same as or similar to that of the first embodiment as described above, and detailed descriptions thereof are omitted herein.

The corner primary insulating wall 3b may be designed to withstand an impact from the outside or an impact caused by liquefied gas sloshing from the inside while blocking heat intrusion from the outside, and may be disposed between the corner primary barrier 2b and the corner secondary barrier 41b. The configuration of the corner primary insulating wall 3b of this embodiment is the same as or similar to that of the first embodiment as described above except that the outer primary plywood 33b is omitted, and thus only differences therebetween are mainly described below.

The corner primary insulating wall 3b may be disposed on the inside of the first and second surfaces, respectively, and may include the inner first fixing portion 3b1 and the inner second fixing portion 3b2 having the inner primary plywood 31b and the corner primary insulation material 32b sequentially stacked toward the outside of the corner primary barrier 2b. Here, the inner primary plywood 31b and the corner primary insulation material 32b of this embodiment may be the same as or similar to those of the first embodiment as described above, and thus detailed descriptions thereof are omitted to avoid redundancy.

The inner first fixing portion 3b1 may be disposed on the inside of the first surface by being secured to the outer first fixing portion 5b1, and the inner second fixing portion 3b2 may be disposed on the inside of the second surface by being secured to the outer second fixing portion 5b2.

In addition, the corner primary heat insulating wall 3b may include the inner bent portion 3b3 configured by filling an insulation material 3b32 between the inner first fixing portion 3b1 and the inner second fixing portion 3b2. The insulation material 3b32 of the inner bent portion 3b3 of the present embodiment may be the same as or similar to that of the first embodiment as described above, and thus, detailed descriptions thereof are omitted to avoid redundancy.

The corner secondary barrier 41b may be disposed between the corner primary insulating wall 3b and the corner secondary insulating wall 5b, and when the corner blocks are adjacently disposed, the corner secondary barrier 41b neighboring between the outer first and second fixing portions 5b1 and 5b2 may be connected by the corner connection barrier 42b, serving to prevent leakage of liquefied gas to the outside in conjunction with the corner primary barrier 2b. The corner secondary barrier 41b of the present embodiment may have basically the same or similar configuration to that of the first embodiment as described above. However, the corner secondary barrier 41b encompassing the corner connection barrier 42b of this embodiment may have a different arrangement from that of the first embodiment as described above in terms of some configuration of the corner secondary insulating wall 5b, which will be discussed below when describing the corner secondary insulating wall 5b.

The corner secondary Insulating wall 5b may be configured to include the inner secondary plywood 51b, the corner secondary insulation material 52b, and the outer secondary plywood 53b. The corner secondary insulating wall 5b may be secured to the inside of the first surface and the second surface, respectively, and may include the outer first fixing portion 5b1 and the outer second fixing portion 5b2 having the inner secondary plywood 51b, the corner secondary insulation material 52b, and the outer secondary plywood 53b stacked sequentially toward the outside of the corner secondary barrier 2b.

The aforesaid outer first fixing portion 5b1 and the outer second fixing portion 5b2 may be disposed such that their side surfaces facing each other are inclined in the direction ED of evenly dividing the corner portion. In the present embodiment, the corner portion is described to be evenly divided, but it is not limited thereto, and they may be inclined in the direction ED of unevenly dividing the center portion.

The outer first fixing portion 5b1 and the outer second fixing portion 5b2 may have a chamfer formed at the corner where they face each other.

In addition, the corner secondary heat insulating wall 5b may include the outer bent portion 5b3 including the insulation material 5b31 filled between the chamfered portions of the outer first fixing portion 5b1 and the outer second fixing portion 5b2. The insulation material 5b31 of the outer bent portion 5b3 may be a low-density polyurethane foam.

By providing the insulation material 5b31 of the outer bent portion 5b3 at the chamfered portion of the outer first fixing portion 5b1 and the outer second fixing portion 5b2, the corner secondary barrier 41b encompassing the corner connection barrier 42b may be secured to the inner secondary plywood 51b of the outer first fixing portion 5b1, the insulation material 5b31 of the outer bent portion 5b3, and the inner secondary plywood 51b of the outer second fixing portion 5b2, and may be provided to bend at a predetermined angle, for example 135 degrees from the inside of the insulation material of the outer bent portion 5b3.

As such, in the present embodiment, chamfers may be formed at the corner where the outer first fixing portion 5b1 and the outer second fixing portion 5b2 respectively secured to the first and second surfaces at different angles face each other, and it is possible to further increase the thermal insulation performance at the corners using the low-density polyurethane foam by providing the insulation material 5b31 of the outer bent portion 5b3 made of low-density polyurethane foam in the chamfers.

FIG. 8 shows results of structural analysis of the temperature distribution and the stress value in the YY direction of the secondary barriers 4, 41b, 42b in the bent portion where the outer first and second fixing portions 5b1 and 5b2 face each other. The stress value was 12.003 MPa, and the temperature was −64.358° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41b and 42b of the present embodiment, meaning a decrease in the influence of cold heat from cryogenic materials such as damages due to the low temperature stress in the secondary barriers 4, 41b, and 42b of the present embodiment.

Figure 9:
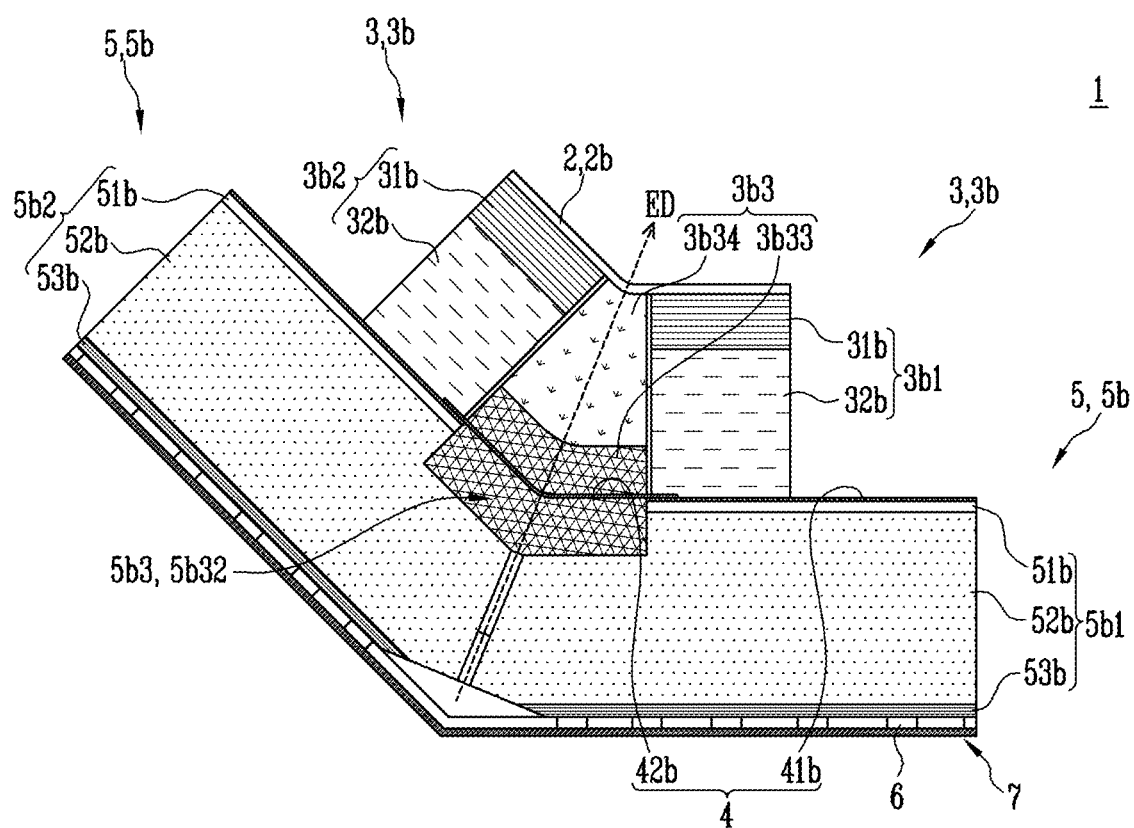
FIG. 9 is a cross-sectional view of a corner portion for describing a liquefied gas storage tank in accordance with a fourth embodiment of the present disclosure.

FIG. 9 is a cross-sectional view of a corner portion for describing a liquefied gas storage tank according to a fourth embodiment of the present disclosure, and FIG. 10 is a diagram illustrating structural analysis results for the corner portion of the liquefied gas storage tank according to the fourth embodiment of the present disclosure.

The flat structure of the liquefied gas storage tank 1 of this embodiment may consist of a combination of a plurality of flat blocks as shown in FIG. 1, and the corner structure of the liquefied gas storage tank 1 may consist of a combination of a plurality of corner blocks as shown in FIG. 9. The flat blocks may be connected to the plurality of corner blocks at the corner portion of the liquefied gas storage tank 1.

In the liquefied gas storage tank 1 of this embodiment, the configuration of the flat block is the same as or similar to the configuration as described above with reference to FIG. 1. In other words, the flat block of the liquefied gas storage tank 1 of this embodiment may be disposed at a flat portion on the first surface or the second surface at different angles forming a storage space for accommodating the liquefied gas, and may include the flat primary insulating wall 3a disposed on the outside of the flat primary barrier 2a and securing the flat primary barrier 2a made of a metal material, the flat secondary barrier 41a disposed on the outside of the flat primary insulating wall 3a, and the flat secondary insulating wall 5a disposed on the outside of the flat secondary barrier 41a.

Accordingly, detailed descriptions of the flat block configuration of the liquefied gas storage tank 1 are omitted herein to avoid redundancy. Hereinafter, the configuration of the corner block of the liquefied gas storage tank 1 of this embodiment will be described in detail with reference to FIGS. 1 and 9.

As shown in FIGS. 1 and 9, the liquefied gas storage tank 1 may be configured to include the primary barrier 2 in contact with the liquefied gas, the primary insulating wall 3 disposed on the outside of the primary barrier 2, the secondary barrier 4 disposed on the outside of the primary insulating wall 3, and the secondary insulating wall 5 disposed on the outside of the secondary barrier 4. The liquefied gas storage tank 1 may be supported by the mastic 6 on the hull 7 disposed between the secondary insulating wall 5 and the hull 7.

In the above, the primary barrier 2 may include the flat primary barrier 2a of the flat block and a corner primary barrier 2b of the corner block, the primary insulating wall 3 may consist of a flat primary insulating wall 3a of the flat block and a corner primary insulating wall 3b of the corner block, the secondary barrier 4 may include the flat secondary barrier 41a of the flat block and the corner secondary barrier 41b of the corner block, and the secondary insulation wall 5 may consist of a flat secondary insulation wall 5a of the flat block and a corner secondary insulation wall 5b of the corner block. In this embodiment, as described in the first embodiment, the thickness of the primary insulating wall 3 and the thickness of the secondary insulating wall 5 in the flat block and the corner block may be the same as or similar to each other.

In the above, the secondary barrier 4 of the flat block and the corner block, when arranging a plurality of flat blocks or a plurality of corner blocks adjacently, may include the flat connecting barrier 42a or the corner connecting barriers 42b connecting the adjacently disposed flat secondary barrier 41a or the adjacently disposed corner secondary barrier 41b.

As shown in FIG. 9, the corner portion of the liquefied gas storage tank 1 according to the fourth embodiment of the present disclosure may consist of a plurality of corner blocks. The corner structure of the liquefied gas storage tank 1 as described below may be an obtuse-angled corner structure forming a predetermined angle, for example, 135 degrees.

In this embodiment, unlike the drawing, the corner primary insulating wall 3b may also be positioned to expose the corner secondary barrier 41b constructed on the corner secondary insulating wall 5b at the center of the corner portion. Therefore, it is also possible to finish the exposed corner secondary barrier 41b by interconnecting with the corner connecting barrier 42b, or to stack the corner primary insulating wall 3b on top of the corner secondary barrier 41b/corner connecting barrier 42b after the construction of the corner connection barrier 42b to connect the adjacently disposed neighboring corner secondary barrier 41b. In this embodiment, the corner connecting barrier 42b may be formed to extend not only between the inner first and second fixing portions 3b1 and 3b2, but also extend to a length overlapping with at least the inner first and second fixing portions 3b1 and 3b2.

The corner block of the liquefied gas storage tank 1 may be disposed at the corner portion where the first and second surfaces at different angles forming a storage space for accommodating the liquefied gas meet, and may include the corner primary insulating wall 3b securing the corner primary barrier 2b made of metal and disposed on the outside of the corner primary barrier 2b, the corner secondary barrier 41b disposed on the outside of the corner primary insulating wall 3b, and the corner secondary insulating wall 5b disposed on the outside of the corner secondary barrier 41b.

The corner primary barrier 2b may be disposed at the corner portion where the first surface or the second surface at different angles meet, forming an accommodating space for accommodating liquefied gas, which is a cryogenic material, and may be made of a metal material. The corner primary barrier 2b may prevent leakage of liquefied gas to the outside in conjunction with the corner secondary barrier 41b.

The corner primary barrier 2b of the present embodiment is basically the same as or similar to that of the first embodiment as described above, and detailed descriptions thereof are omitted herein.

The corner primary insulating wall 3b may be designed to withstand an impact from the outside or an impact caused by liquefied gas sloshing from the inside while blocking heat intrusion from the outside, and may be disposed between the corner primary barrier 2b and the corner secondary barriers 41b. The configuration of the corner primary insulating wall 3b of this embodiment is the same as or similar to that of the first embodiment as described above except that the outer primary plywood 33b is omitted and the inner bent portion 3b3 has a different configuration, and thus only differences therebetween are mainly described below.

The corner primary insulating wall 3b may be disposed on the inside of the first surface and the second surface, respectively, and may include the inner first fixing portion 3b1 and the inner second fixing portion 3b2 having the inner primary plywood 31b and the corner primary insulation material 32b stacked sequentially toward the outside of the corner primary barrier 2b. Here, the inner primary plywood 31b and the corner primary insulation material 32b of this embodiment may be the same as or similar to those of the first embodiment as described above, and thus detailed descriptions thereof are omitted to avoid redundancy.

The inner first fixing portion 3b1 may be disposed on the inside of the first surface by being secured to the outer first fixing portion 5b1, and the inner second fixing portion 3b2 may be disposed on the inside of the second surface by being secured to the outer second fixing portion 5b2.

In addition, the corner primary insulating wall 3b may include an inner bent portion 3b3 including an outer insulation material 3b33 filled between the inner first fixing portion 3b1 and the inner second fixing portion 3b2, and disposed on the corner secondary barrier 41b encompassing the corner connection barrier 42b, and an inner insulation material 3b34 disposed between the outer insulation material 3b33 and the corner primary barrier 2b.

The outer insulation material 3b33 of the inner bent portion 3b3 may be glass wool, and on the outer surface thereof bent at a predetermined angle, for example, 135 degrees, there may be disposed the secondary barrier 4 having the corner secondary barrier 41b and the corner connection barrier 42b stacked together.

The inner insulation material 3b34 of the inner bent portion 3b3 may be a low-density polyurethane foam, and the corner primary barrier 2b may be provided on the inner surface thereof bent at a predetermined angle, for example, 135 degrees.

Each thickness of the outer insulation material 3b33 and the inner insulation material 3b34 of the inner bent portion 3b3 may be selected as needed.

The corner secondary barrier 41b may be disposed between the corner primary insulating wall 3b and the corner secondary insulating wall 5b, the corner secondary barrier 41b neighboring between the outer first and second fixing portions 5b1 and 5b2 may be connected by the corner connecting barrier 42b, serving to prevent leakage of liquefied gas to the outside in conjunction with the corner primary barrier 2b. The corner secondary barrier 41b of the present embodiment may have basically the same or similar configuration to that of the first embodiment as described above. However, in the corner secondary barrier 41b encompassing the corner connection barrier 42b of this embodiment, placements may be different from the first embodiment as some components of the corner primary insulating wall 3b and the corner secondary insulating wall 5b may be different from those of the first embodiment, which will be discussed below when describing the corner secondary insulating wall 5b.

The corner secondary insulating wall 5b may be configured to include the inner secondary plywood 51b, corner secondary insulation material 52b, and outer secondary plywood 53b. The corner secondary insulating wall 5b may be secured to the inside of the first surface and the second surface, respectively, and may include the outer first fixing portion 5b1 and the outer second fixing portion 5b2 having the inner secondary plywood 51b, the corner secondary insulation material 52b, and the outer secondary plywood 53b stacked sequentially toward the outside of the corner secondary barrier 2b.

The aforesaid outer first fixing portion 5b1 and the outer second fixing portion 5b2 may be disposed such that their side surfaces facing each other are inclined in the direction ED of evenly dividing the corner portion. In the present embodiment, the corner portion is described to be evenly divided, but it is not limited thereto, and they may be inclined in the direction ED of unevenly dividing the corner portion.

The outer first fixing portion 5b1 and the outer second fixing portion 5b2 may have a step formed at the corners facing each other.

In addition, the corner secondary insulating wall 5b may include the outer bent portion 5b3 including the insulation material 5b312 filled between the stepped portion of the outer first fixing portion 5b1 and the outer second fixing portion 5b2. The insulation material 5b32 of the outer bent portion 5b3 may be glass wool, which is the same as that of the outer insulation material of the inner bent portion 3b3.

By providing the insulation material 5b32 of the outer bent portion 5b3 at the stepped portion of the outer first fixing portion 5b1 and the outer second fixing portion 5b2, the corner secondary barrier 41b encompassing the corner connection barrier 42b may be secured to the inner secondary plywood 51b of the outer first fixing portion 5b1, the insulation material 5b32 of the outer bent portion 5b3, and the inner secondary plywood 51b of the outer second fixing portion 5b2, and may be provided to bend at a predetermined angle, for example 135 degrees from the inside of the insulation material 5b32 of the outer bent portion 5b3.

As such, this embodiment may form a step at the corner where the outer first fixing portion 5b1 and the outer second fixing portion 5b2 respectively secured to the first and second surfaces at different angles face each other, wherein the insulation material 5b32 of the outer bent portion 5b3 made of glass wool may be provided in the stepped portion, and the outer insulation material 3b33 of the inner bent portion 5b3 made of glass wool may be provided between the corner secondary barrier 41b encompassing the corner connection barrier 42b. Therefore, it is possible to further prevent damages to the corner secondary barrier 41b encompassing the corner connecting barrier 42b by improving flexibility of the corner secondary barrier 41b encompassing the corner connection barrier 42b formed between glass wool.

FIG. 10 shows results of structural analysis of the temperature distribution and the stress value in the YY direction of the secondary barriers 4, 41b, 42b in the bent portion where the outer first and second fixing portions 5b1 and 5b2 face each other. The stress value was 12.003 MPa, and the temperature was −64.358° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41b and 42b of the present embodiment, meaning a decrease in the influence of cold heat from cryogenic materials such as damages due to the low temperature stress in the secondary barriers 4, 41b, and 42b of the present embodiment.

Figure 11:
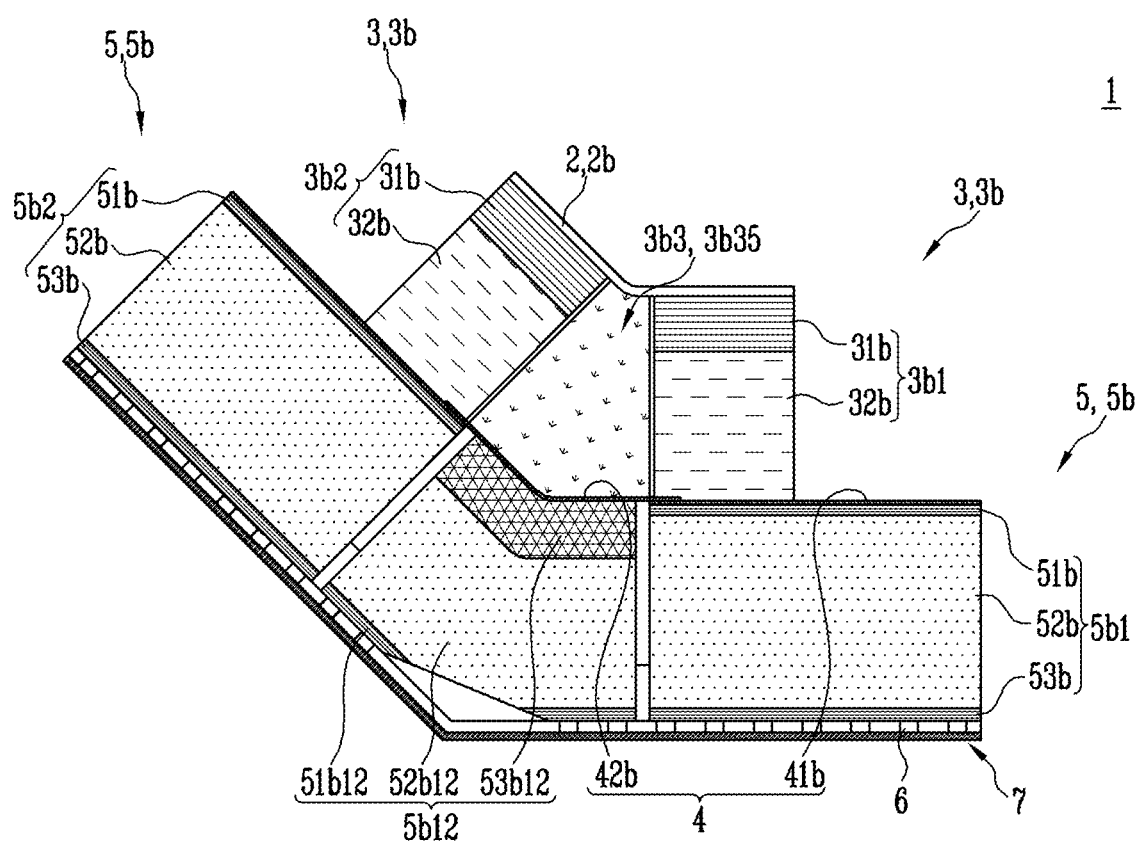
FIG. 11 is a cross-sectional view of a corner portion for describing a liquefied gas storage tank in accordance with a fifth embodiment of the present disclosure.
Figure 12:
FIG. 12 is a diagram illustrating structural analysis results for the corner portion of the liquefied gas storage tank in accordance with the fifth embodiment of the present disclosure.

FIG. 11 is a cross-sectional view of a corner portion for describing a liquefied gas storage tank according to a fifth embodiment of the present disclosure, and FIG. 12 is a diagram illustrating structural analysis results for the corner portion of the liquefied gas storage tank according to the fifth embodiment of the present disclosure.

The flat structure of the liquefied gas storage tank 1 of this embodiment may consist of a combination of a plurality of flat blocks as shown in FIG. 1, and the corner structure of the liquefied gas storage tank 1 may consist of a combination of a plurality of corner blocks as shown in FIG. 11. These plurality of flat blocks may be connected to the plurality of corner blocks at the corner portion of the liquefied gas storage tank 1.

In the liquefied gas storage tank 1 of this embodiment, the configuration of the flat block is the same as or similar to the configuration as described above with reference to FIG. 1. In other words, as shown in FIG. 1, the flat block of the liquefied gas storage tank 1 of this embodiment may be disposed at the flat portion on the first surface or the second surface at different angles forming a storage space for accommodating liquefied gas, and may include the flat primary insulating wall 3a disposed on the outside of the flat primary barrier 2a and securing the flat primary barrier 2a made of a metal material, the flat secondary barrier 41a disposed on the outside of the flat primary insulating wall 3a, and the flat secondary insulating wall 5a disposed on the outside of the flat secondary barrier 41a.

Accordingly, detailed descriptions of the configuration of the flat block of the liquefied gas storage tank 1 are omitted here to avoid redundancy. Hereinafter, the configuration of the corner block of the liquefied gas storage tank 1 of this embodiment will be described in detail with reference to FIGS. 1 and 11.

As shown in FIGS. 1 and 11, the liquefied gas storage tank 1 may be configured to include the primary barrier 2 in contact with the liquefied gas, the primary insulating wall 3 disposed on the outside of the primary barrier 2, the secondary barrier 4 disposed on the outside of the primary insulating wall 3, and the secondary insulating wall 5 disposed on the outside of the secondary barrier 4. The liquefied gas storage tank 1 may be supported on the hull 7 by the mastic 6 disposed between the secondary insulating wall 5 and the hull 7.

In the above, the primary barrier 2 may consist of the flat primary barrier 2a of the flat block and the corner primary barrier 2b of the corner block, the primary insulating wall 3 may consist of the flat primary insulating wall 3a of the flat block and the corner primary insulating wall 3b of the corner block, the secondary barrier 4 may consist of the flat secondary barrier 41a of the flat block and the corner secondary barrier 41b of the corner block, and the secondary insulating wall 5 may consist of the flat secondary insulating wall 5a of the flat block and the corner secondary insulation wall 5b of the corner block. In this embodiment, as described above in the first embodiment, the thickness of the primary insulating wall 3 and the thickness of the secondary insulating wall 5 in the flat block and the corner block may be the same as or similar to each other.

In the above, when arranging a plurality of flat blocks or a plurality of corner blocks adjacently, the secondary barrier 4 of the flat block and the corner block may further include the flat connection barrier 42a or the corner connection barrier 42b for connecting adjacently disposed flat secondary barriers 41a or adjacently disposed corner secondary barriers 41b.

As shown in FIG. 11, the corner portion of the liquefied gas storage tank 1 according to the fifth embodiment of the present disclosure may consist of a combination of a plurality of corner blocks. The corner structure of the liquefied gas storage tank 1 as described below may be an obtuse-angled corner structure forming a predetermined angle, for example, 135 degrees.

In this embodiment, unlike the drawing, the corner primary insulating wall 3b may also be positioned to expose the corner secondary barrier 41b constructed on the corner secondary insulating wall 5b at the center of the corner portion. Therefore, it is also possible to finish the exposed corner secondary barrier 41b by interconnecting it with the corner connecting barrier 42b, or to stack the corner primary insulating wall 3b on top of the corner secondary barrier 41b/corner connecting barrier 42b after the construction of the corner connection barrier 42b to connect the adjacently disposed neighboring corner secondary barrier 41b. In this embodiment, the corner connecting barrier 42b may be formed to extend to not only between the inner first and second fixing portions 3b1 and 3b2, but also extend to a length overlapping with at least the inner first and second fixing portions 3b1 and 3b2.

The corner block of the liquefied gas storage tank 1 may be disposed at the corner portion where the first surface and the second surface at different angles forming a storage space for accommodating liquefied gas meet, and the corner block may include the corner primary insulating wall 3b disposed on the outside of the corner primary barrier 2b and securing the corner primary barrier 2b made of a metal material, the corner secondary barrier 41b disposed on the outside of the corner primary insulating wall 3b, and the corner secondary insulating wall 5b disposed on the outside of the corner secondary barrier 41b.

The corner primary barrier 2b may be disposed at the corner portion where the first surface or the second surface at different angles meet, forming an accommodating space for accommodating liquefied gas, which is a cryogenic material, and may be made of a metal material. The corner primary barrier 2b may prevent leakage of liquefied gas to the outside in conjunction with the corner secondary barrier 41b.

The corner primary barrier 2b of this embodiment is basically the same as or similar to that of the first embodiment as described above, and detailed descriptions thereof are omitted herein.

The corner primary insulating wall 3b may be designed to withstand an impact from the outside or an impact caused by liquefied gas sloshing from the inside while blocking heat intrusion from the outside, and may be disposed between the corner primary barrier 2b and the corner secondary barrier 41b. The configuration of the corner primary insulating wall 3b of this embodiment is the same as or similar to that of the first embodiment as described above except that the outer primary plywood 33b is omitted, and thus only differences therebetween are mainly described below.

The corner primary insulating wall 3b may be disposed on the inside of the first and second surfaces, respectively, and may include the inner first fixing portion 3b1 and the inner second fixing portion 3b2 having the inner primary plywood 31b and the corner primary insulation material 32b sequentially stacked toward the outside of the corner primary barrier 2b. Here, the inner primary plywood 31b and the corner primary insulation material 32b of this embodiment may be the same as or similar to those of the first embodiment as described above, and thus detailed descriptions thereof are omitted to avoid redundancy.

The inner first fixing portion 3b1 may be disposed on the inside of the first surface by being secured to the outer first fixing portion 5b1, and the inner second fixing portion 3b2 may be disposed on the inside of the second surface by being secured to the outer second fixing portion 5b2.

In addition, the corner primary insulating wall 3b may include the inner bent portion 3b3 configured by filling the insulation material 3b35 between the inner first fixing portion 3b1 and the inner second fixing portion 3b2. The insulation material 3b35 of the inner bent portion 3b3 of the present embodiment may be the same as or similar to that of the first embodiment as described above, and thus, detailed descriptions thereof are omitted to avoid redundancy.

The corner secondary barrier 41b may be disposed between the corner primary insulating wall 3b and the corner secondary insulating wall 5b, and when the corner blocks are adjacently disposed, the corner secondary barrier 41b neighboring between the outer first and second fixing portions 5b1 and 5b2 may be connected by the corner connection barrier 42b, serving to prevent leakage of liquefied gas to the outside in conjunction with the corner primary barrier 2b. The corner secondary barrier 41b of the present embodiment may have basically the same or similar configuration to that of the first embodiment as described above. However, the corner secondary barrier 41b encompassing the corner connection barrier 42b of this embodiment may have a different arrangement from that of the first embodiment as some components of the corner secondary insulating wall 5b become different from that of the first embodiment, which will be discussed below when describing the corner secondary insulating wall 5b.

The corner secondary insulating wall 5b may be configured to include the inner secondary plywood 51b, the corner secondary insulation material 52b, and the outer secondary plywood 53b. The corner secondary insulating wall 5b may be secured to the inside of the first surface and the second surface, respectively, and may include the outer first fixing portion 5b1 and the outer second fixing portion 5b2 having the inner secondary plywood 51b, the corner secondary insulation material 52b, and the outer secondary plywood 53b stacked sequentially toward the outside of the corner secondary barrier 2b.

The inner first fixing portion 3b1 may be disposed on the inside of the first surface by being secured to the outer first fixing portion 5b1, and the inner second fixing portion 3b2 may be disposed on the inside of the second surface by being secured to the outer second fixing portion 5b2.

In addition, the corner secondary insulating wall 5b may be disposed between the outer first fixing portion 5b1 and the outer second fixing portion 5b2, and may include the outer intermediate fixing portion 5b12 where the bent portion of the corner secondary barrier 41b encompassing the corner connection barrier 42b is seated.

The outer intermediate fixing portion 5b12 may include the outer intermediate plywood 51b12 respectively secured to the first and second surfaces, the outer intermediate insulation material 52b12 disposed on the inside of the outer intermediate plywood 51b12, and the inner intermediate insulation material 53b12 disposed on the inside of the outer intermediate insulation material 52b12 where the bent portion of the corner secondary barrier 41b encompassing the corner connection barrier 42b is seated.

The outer intermediate plywood 51b12 may be located on the same line and have the same configuration as the inner secondary plywood 51b.

The outer intermediate insulation material 52b12 may be polyurethane foam.

The inner intermediate insulation material 53b12 may be glass wool.

By providing the outer intermediate fixing portion 5b12 having the outer intermediate plywood 51b12, the outer intermediate insulation material 52b12, and the inner intermediate insulation material 53b12 stacked together between the outer first fixing portion 5b1 and the outer second fixing portion 5b2, the corner secondary barrier 41b encompassing the corner connecting barrier 42b may be secured to the inner secondary plywood 51b of the outer first fixing portion 5b1, the inner intermediate insulation material 53b12 of the outer intermediate fixing portion 5b12, and the inner secondary plywood 51b of the outer second fixing portion 5b2, and may be disposed to bend at a predetermined angle, for example, 135 degrees from the inside of the inner intermediate insulation material 53b12 of the outer intermediate fixing portion 5b12.

As such, this embodiment may provide the outer intermediate fixing portion 5b12 between the outer first fixing portion 5b1 and the outer second fixing portion 5b2 respectively secured to the first and second surfaces at different angles, and the flexibility of the corner secondary barrier 41b encompassing the corner connecting barrier 42b formed above the inner intermediate insulation material 53b12 of the outer intermediate fixing portion 5b12 made of glass wool may be improved such that damages to the corner secondary barrier 41b encompassing the corner connecting barrier 42b are prevented further.

In addition, by spacing apart the outer first fixing portion 5b1 and the outer second fixing portion 5b2 respectively secured to the first surface and the second surface at different angles by a predetermined distance, and providing the outer intermediate fixing portion 5b12 between the outer first and second fixing portions 5b1 and 5b2, the present embodiment may prevent damages to the corner secondary barrier 41b encompassing the corner connection barrier 42b secured to the outer fixing portion 5b1, 5b2, and 5b12 as contraction or expansion stress caused by the temperature of the outer fixing portion 5b1, 5b2, and 5b12 having two gaps is alleviated by respective gaps formed between the first outer fixing portion 5b1 and the outer intermediate fixing portion 5b12 and between the outer second fixing portion 5b2 and the outer intermediate fixing portion 5b12 compared to the conventional one gap configuration of the related art.

FIG. 12 shows results of structural analysis of the temperature distribution and the stress value in the YY direction of the secondary barriers 4, 41b, 42b in the bent portion where the outer first and second fixing portions 5b1 and 5b2 face each other. The stress value was 13.101 MPa, and the temperature was −74.480° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41b and 42b of the present embodiment, meaning a decrease in the influence of cold heat from cryogenic materials such as damages due to the low temperature stress in the secondary barriers 4, 41b, and 42b of the present embodiment.

Figure 13:
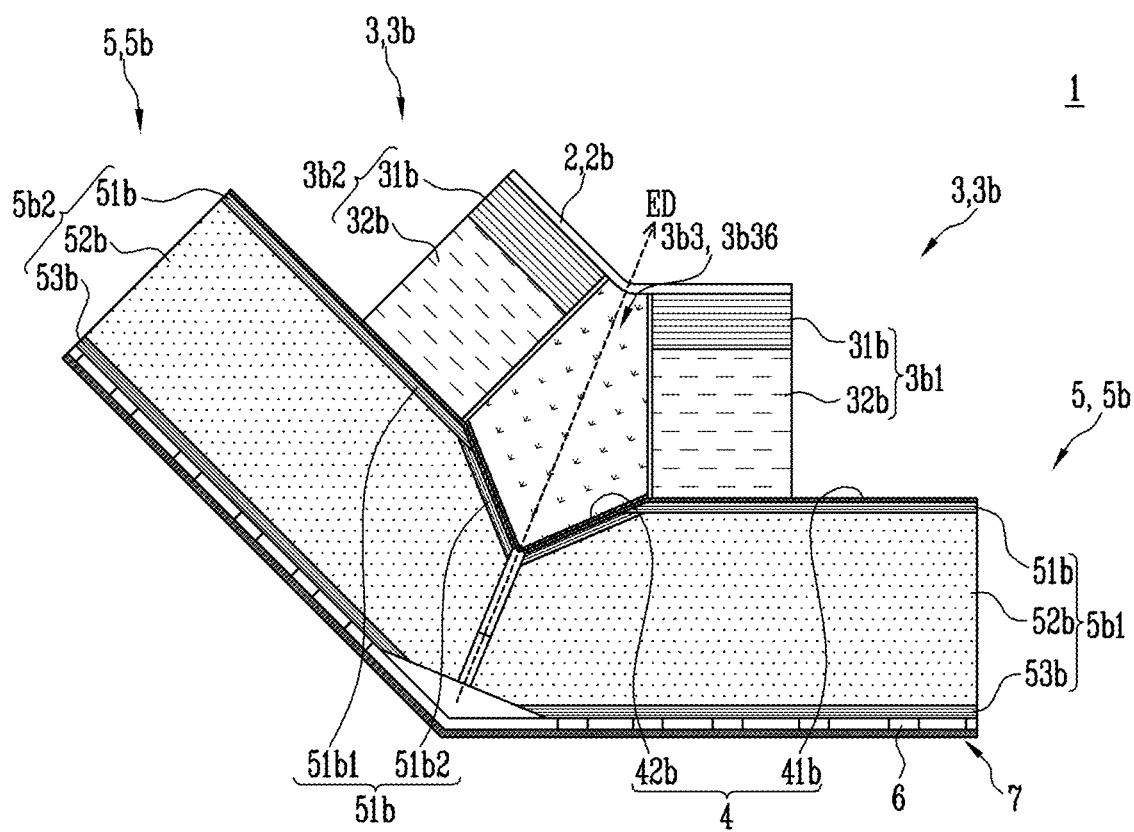
FIG. 13 is a cross-sectional view of a corner portion for describing a liquefied gas storage tank in accordance with a sixth embodiment of the present disclosure.
Figure 14:
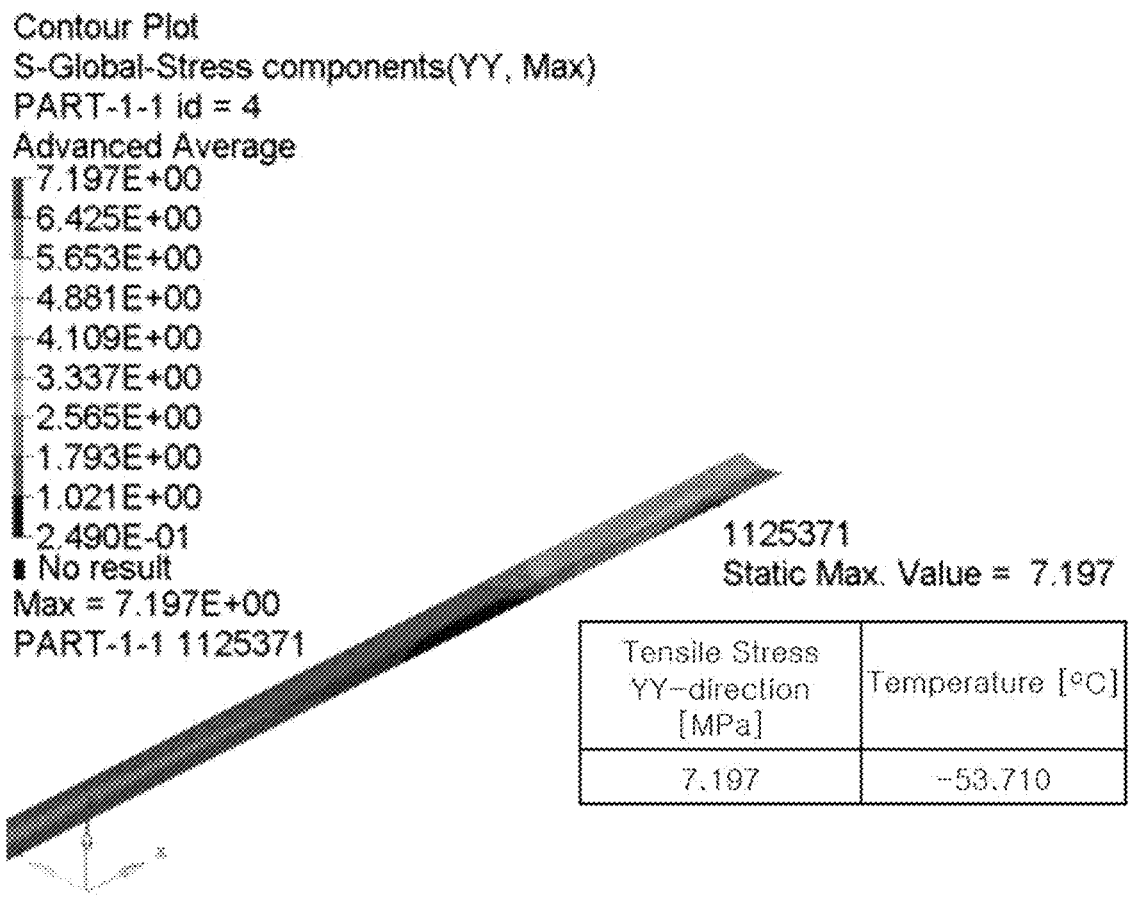
FIG. 14 is a diagram illustrating structural analysis results for the corner portion of the liquefied gas storage tank in accordance with the sixth embodiment of the present disclosure.

FIG. 13 is a cross-sectional view of a corner portion for describing a liquefied gas storage tank according to a sixth embodiment of the present disclosure, and FIG. 14 is a diagram illustrating structural analysis results for the corner portion of the liquefied gas storage tank according to the sixth embodiment of the present disclosure.

The flat structure of the liquefied gas storage tank 1 of this embodiment may consist of a combination of a plurality of flat blocks as shown in FIG. 1, and the corner structure of the liquefied gas storage tank 1 may consist of a combination of a plurality of corner blocks as shown in FIG. 13. The flat blocks may be connected to the plurality of corner blocks in the corner portion of the liquefied gas storage tank 1.

In the liquefied gas storage tank 1 of this embodiment, the configuration of the flat block is the same as or similar to the configuration as described above with reference to FIG. 1. In other words, as shown in FIG. 1, the flat block of the liquefied gas storage tank 1 of this embodiment may be disposed on the flat portion on the first surface or the second surface at different angles forming a storage space for storing liquefied gas, and may include the flat primary insulating wall 3a disposed on the outside of the flat primary barrier 2a and securing the flat primary barrier 2a made of a metal material, the flat secondary barrier 41a provided on the outside of the flat primary insulating wall 3a, and the flat secondary insulating wall 5a disposed on the outside of the flat secondary barrier 41a.

Accordingly, detailed descriptions of the flat block configuration of the liquefied gas storage tank 1 are omitted herein to avoid redundancy. Hereinafter, the configuration of the corner block of the liquefied gas storage tank 1 of this embodiment will be described below in detail with reference to FIGS. 1 and 13.

As shown in FIGS. 1 and 13, the liquefied gas storage tank 1 may be configured to include the primary barrier 2 in contact with the liquefied gas, the primary insulating wall 3 disposed on the outside of the primary barrier 2, the secondary barrier 4 disposed on the outside of the primary insulating wall 3, and the secondary insulating wall 5 disposed on the outside of the secondary barrier 4. The liquefied gas storage tank 1 may be supported on the hull 7 by the mastic 6 disposed between the secondary insulating wall 5 and the hull 7.

In the above, the primary barrier 2 may consist of the flat primary barrier 2a of the flat block and the corner primary barrier 2b of the corner block, the primary insulating wall 3 may consist of the flat primary insulating wall 3a of the flat block and the corner primary insulating wall 3b of the corner block, the secondary barrier 4 may consist of the flat secondary barrier 41a of the flat block and the corner secondary barrier 41b of the corner block, and the secondary insulating wall 5 may consist of the flat secondary insulating wall 5a of the flat block and the corner secondary insulation wall 5b of the corner block. As described in the first embodiment, in this embodiment, the thickness of the primary insulating wall 3 and the thickness of the secondary insulating wall 5 in the flat block and the corner block may be the same as or similar to each other.

In the above, when disposing a plurality of flat blocks or a plurality of corner blocks adjacently, the secondary barrier 4 of the flat block and the corner block may include the flat connection barrier 42a or the corner connection barrier 42b connecting the adjacently disposed flat secondary barriers 41a or the adjacently disposed corner secondary barriers 41b.

As shown in FIG. 13, the corner portion of the liquefied gas storage tank 1 according to the sixth embodiment of the present disclosure may consist of a combination of a plurality of corner blocks. The corner structure of the liquefied gas storage tank 1 as described below may be an obtuse-angled corner structure forming a predetermined angle, for example, 135 degrees.

The corner block of the liquefied gas storage tank 1 may be disposed at the corner portion where the first surface and the second surface at different angles forming a storage space for accommodating liquefied gas meet, and the corner block may include the corner primary insulating wall 3b disposed on the outside of the corner primary barrier 2b and securing the corner primary barrier 2b made of a metal material, the corner secondary barrier 41b disposed on the outside of the corner primary insulating wall 3b, and the corner secondary insulating wall 5b disposed on the outside of the corner secondary barrier 41b.

The corner primary barrier 2b may be disposed at the corner portion where the first surface or the second surface at different angles meet to form an accommodating space for accommodating liquefied gas, which is a cryogenic material, and may be made of a metal material. The corner primary barrier 2b may prevent leakage of liquefied gas to the outside in conjunction with the corner secondary barrier 41b.

The corner primary barrier 2b of this embodiment is basically the same as or similar to that of the first embodiment as described above, and detailed descriptions thereof are omitted herein.

The corner primary insulating wall 3b may be designed to withstand an impact from the outside or an impact caused by liquefied gas sloshing from the inside while blocking heat intrusion from the outside, and may be disposed between the corner primary barrier 2b and the corner secondary barrier 41b. The configuration of the corner primary insulating wall 3b of this embodiment is the same as or similar to that of the first embodiment as described above except that the outer primary plywood 33b is omitted and an appearance of the outer surface of the insulation material 3b311 of the inner bent portion 3b3 becomes different, and thus only differences therebetween are mainly described below.

The corner primary insulating wall 3b may be disposed on the inside of the first and second surfaces, respectively, and may include the inner first fixing portion 3b1 and the inner second fixing portion 3b2 having the inner primary plywood 31b and the corner primary insulation material 32b sequentially stacked toward the outside of the corner primary barrier 2b. Here, the inner primary plywood 31b and the corner primary insulation material 32b of this embodiment may be the same as or similar to those of the first embodiment as described above, and thus detailed descriptions thereof are omitted to avoid redundancy.

The inner first fixing portion 3b1 may be disposed on the inside of the first surface by being secured to the outer first fixing part 5b1, and the inner second fixing portion 3b2 may be provided on the inside of the second surface by being secured to the outer second fixing portion 5b2.

In addition, the corner primary insulating wall 3b may include the inner bent portion 3b3 configured by filling an insulation material 3b36 between the inner first fixing portion 3b1 and the inner second fixing portion 3b2. The insulation material 3b36 of the inner bent portion 3b3 of the present embodiment may be the same as or similar to that of the first embodiment as described above. However, in this embodiment, appearance of an outer surface of the insulation material 3b36 of the inner bent portion 3b3 may change as the configuration of the outer first and second fixing portions 5b1 and 5b2 changes.

In other words, the insulation material 3b36 of the inner bent portion 3b3 of the present embodiment has an outer surface with a shape protruding outward compared to that of the inner first fixing portion 3b1 or the inner second fixing portion 3b2 because a chamfer is formed at the corner where the outer first fixing portion 5b1 and the outer second fixing portion 5b2 face each other.

The corner secondary barrier 41b may be disposed between the corner primary insulating wall 3b and the corner secondary insulating wall 5b, and when the corner blocks are adjacently disposed, the corner secondary barrier 41b neighboring between the outer first and second fixing portions 5b1 and 5b2 may be connected by the corner connection barrier 42b, serving to prevent leakage of liquefied gas to the outside in conjunction with the corner primary barrier 2b. In this embodiment, the corner connecting barrier 42b may be formed to extend not only between the inner first and second fixing portions 3b1 and 3b2, but also extend to a length overlapping with at least the inner first and second fixing portions 3b1 and 3b2.

The corner secondary barrier 41b of the present embodiment may have basically the same or similar configuration to that of the first embodiment as described above. However, the corner secondary barrier 41b encompassing the corner connection barrier 42b of this embodiment may have a different arrangement from that of the first embodiment as described above in terms of some different configuration of the corner secondary insulating wall 5b, which will be discussed below when describing the corner secondary insulating wall 5b.

The corner secondary insulating wall 5b may be configured to include the inner secondary plywood 51b, the corner secondary insulation material 52b, and the outer secondary plywood 53b. The corner secondary insulating wall 5b may be secured to the inside of the first surface and the second surface, respectively, and may include the outer first fixing portion 5b1 and the outer second fixing portion 5b2 having the inner secondary plywood 51b, the corner secondary insulation material 52b, and the outer secondary plywood 53b stacked sequentially toward the outside of the corner secondary barrier 2b.

The outer first fixing portion 5b1 and the outer second fixing portion 5b2 may be disposed such that their side surfaces facing each other are inclined in the direction ED of evenly dividing the corner portion. In the present embodiment, the corner portion is described to be evenly divided, but it is not limited thereto, and they may be inclined in the direction ED of unevenly dividing the corner portion.

The outer first fixing part 5b1 and the outer second fixing part 5b2 may have a chamfer formed at the corner where they face each other.

In this embodiment, the inner secondary plywood 51b may consist of peripheral plywood 51b1 parallel to the outer secondary plywood 53b and secured on the corner secondary insulation material 52b, and inclined plywood 51b2 connected to the peripheral plywood 51b1 and secured on the corner secondary insulation material 52b of the chamfered portion. Accordingly, unlike the first embodiment described above, the corner primary insulation material 32b may be provided on the peripheral plywood 51b1, and the insulation material 3b36 of the inner bent portion 3b3 may be provided on the inclined plywood 51b2.

By providing the insulation material 3b36 of the inner bent portion 3b3 and the inclined plywood 51b2 at the chamfered portion of the outer first fixing portion 5b1 and the outer second fixing portion 5b2, the corner secondary barrier 41b encompassing the corner connection barrier 42b may be secured to the peripheral plywood of the outer first fixing portion 5b1, the inclined plywood of the outer first fixing portion 5b1, the inclined plywood 5b2 of the outer second fixing portion, and the peripheral plywood 51b1 of the outer second fixing portion 5b2.

In addition, the corner secondary barrier 41b encompassing the corner connection barrier 42b may be bent to protrude outward so as to be seated on the chamfered portion of the outer first fixing portion 5b1 and the outer second fixing portion 5b2.

In other words, the corner secondary barrier 41b encompassing the corner connection barrier 42b may be bent outward between the peripheral plywood 51b1 of the outer first fixing portion 5b1 and the inclined plywood 51b2 of the outer first fixing portion 5b1, bent inward between the inclined plywood 51b2 of the outer first fixing portion 5b1 and the inclined plywood 51b2 of the outer second fixing portion 5b2, and bent outward between the inclined plywood 51b2 of the outer second fixing portion 5b2 and the peripheral plywood 51b1 of the outer second fixing portion 5b2.

As such, in the present embodiment, the chamfer may be formed at the corner where the outer first fixing portion 5b1 and the outer second fixing portion 5b2 respectively secured to the first and second surfaces at different angles face each other, and the corner secondary barrier 41b encompassing the corner connecting barrier 42b may be disposed along the surface of the outer first and second fixing portions 5b1, 5b2 including chamfered portion. As a result, the length of the portion not adhered to the corner secondary insulating wall 5b may be increased as the corner secondary barrier 41b encompassing the corner connection barrier 42b may be bent to protrude outward, which in turn decreases the probability of damages to the corner secondary barrier 41b encompassing the corner connection barrier 42b due to the increased flexibility of the corner secondary barrier 41b encompassing the corner connection barrier 42b, facilitates absorption of hull deformation in the corner secondary barrier 41b encompassing the corner connection barrier 42b, and reduces the low-temperature stress.

FIG. 14 shows results of structural analysis of the temperature distribution and the stress value in the YY direction of the secondary barriers 4, 41b, 42b in the bent portion where the outer first and second fixing portions 5b1 and 5b2 face each other. The stress value was 7.197 MPa, and the temperature was −53.710° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41b and 42b of the present embodiment, meaning a decrease in the influence of cold heat from cryogenic materials such as damages due to the low temperature stress in the secondary barriers 4, 41b, and 42b of the present embodiment.

Figure 15:
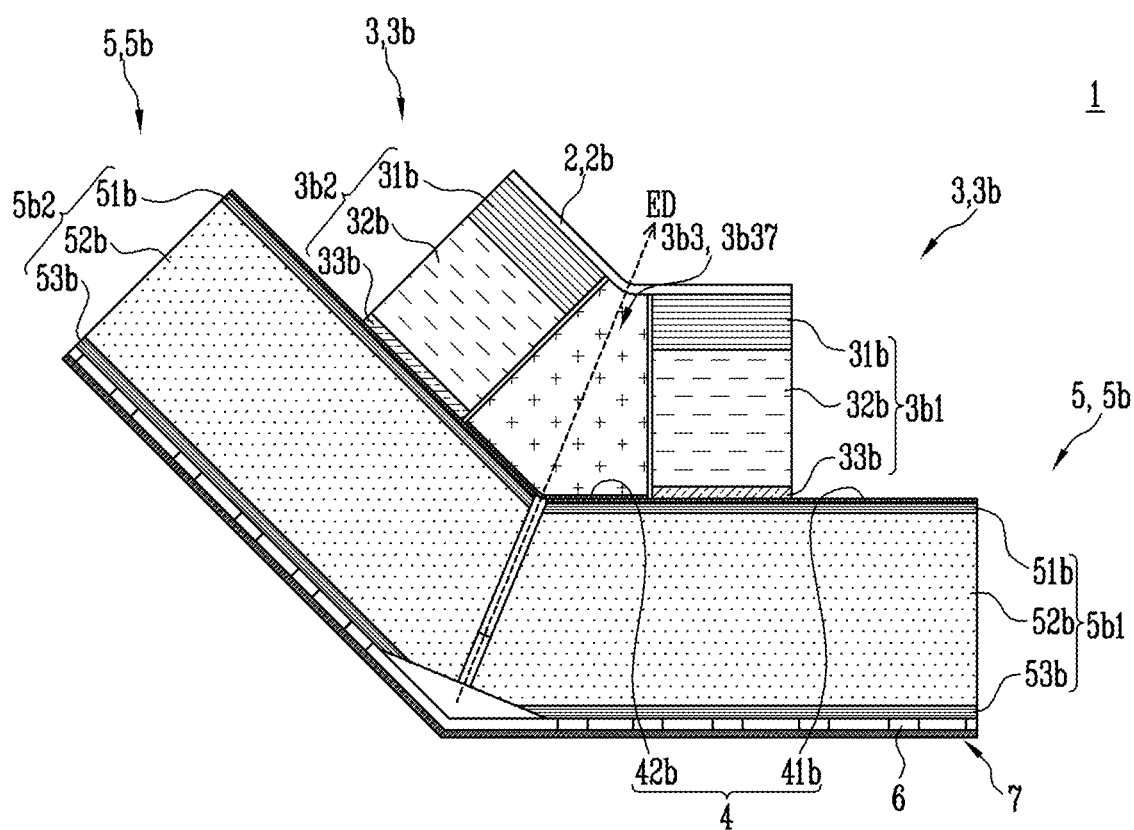
FIG. 15 is a cross-sectional view of a corner portion for describing a liquefied gas storage tank in accordance with a seventh embodiment of the present disclosure.
Figure 16:
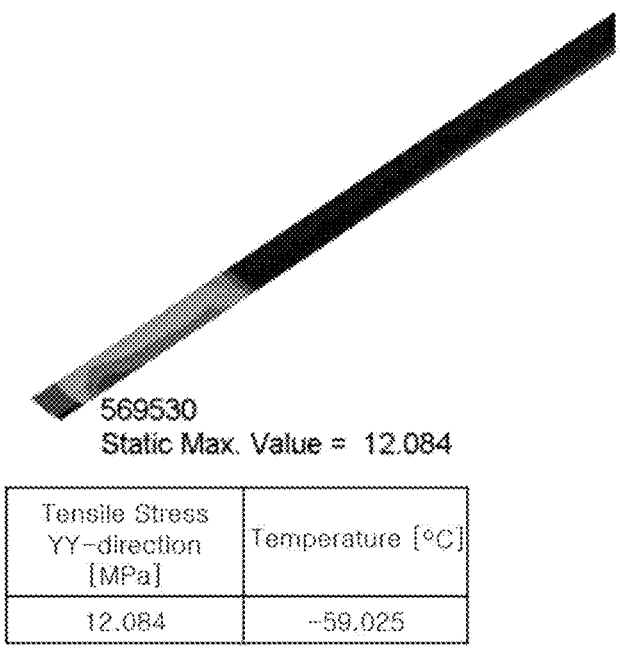
FIG. 16 is a diagram illustrating structural analysis results for the corner portion of the liquefied gas storage tank in accordance with the seventh embodiment of the present disclosure.

FIG. 15 is a cross-sectional view of a corner portion for describing a liquefied gas storage tank according to a seventh embodiment of the present disclosure, and FIG. 16 is a diagram illustrating structural analysis results for the corner portion of the liquefied gas storage tank according to the seventh embodiment of the present disclosure.

As shown in FIG. 15, the liquefied gas storage tank 1 of this embodiment is the same as or similar to the liquefied gas storage tank 1 of the first embodiment as described above except for the configuration of the inner bent portion 3b3, thus the descriptions thereof are omitted to avoid redundancy, and only differences therebetween are mainly described below.

The configuration of the corner primary insulating wall 3b of this embodiment is the same as or similar to that of the first embodiment, except for having a different configuration of the portion for disposing the inner bent portion 3b3 configured by filling the insulation material 3b31 as compared with the first embodiment as described above, and thus only differences therebetween are mainly described below.

The corner primary insulating wall 3b of this embodiment may include a vacuum insulating panel 3b37 filled in the inner bent portion 3b3 between the inner first fixing portion 3b1 and the inner second fixing portion 3b2.

In the present embodiment, since the inner first fixing portion 3b1 and the inner second fixing portion 3b2 are non-structural members, it may be easier to construct the vacuum insulation panel 3b37, which is a structural member, between the inner first fixing portion 3b1 and the inner second fixing portion 3b2. The vacuum insulating panel 3b37 has excellent insulation performance among various insulation materials such as polyurethane foam, and thus may improve insulation performance in the corner portion.

FIG. 16 is a result of structural analysis of the temperature distribution and the stress value in the YY direction of the secondary barriers 4, 41b and 42b in the bent portion where the outer first and second fixing portions 5b1 and 5b2 face each other. The stress value was 12.084 MPa, and the temperature was −59.025° C. When compared to the stress value of about 66.8984 MPa in the YY direction and the temperature of about −135.857° C. of the secondary barrier in the bent portion of the existing liquefied gas storage tank of the related art, these figures indicate significantly less stress at the secondary barriers 4, 41b and 42b of the present embodiment, meaning a decrease in the influence of cold heat from cryogenic materials such as damages due to the low temperature stress in the secondary barriers 4, 41b, and 42b of the present embodiment.

Figure 17:
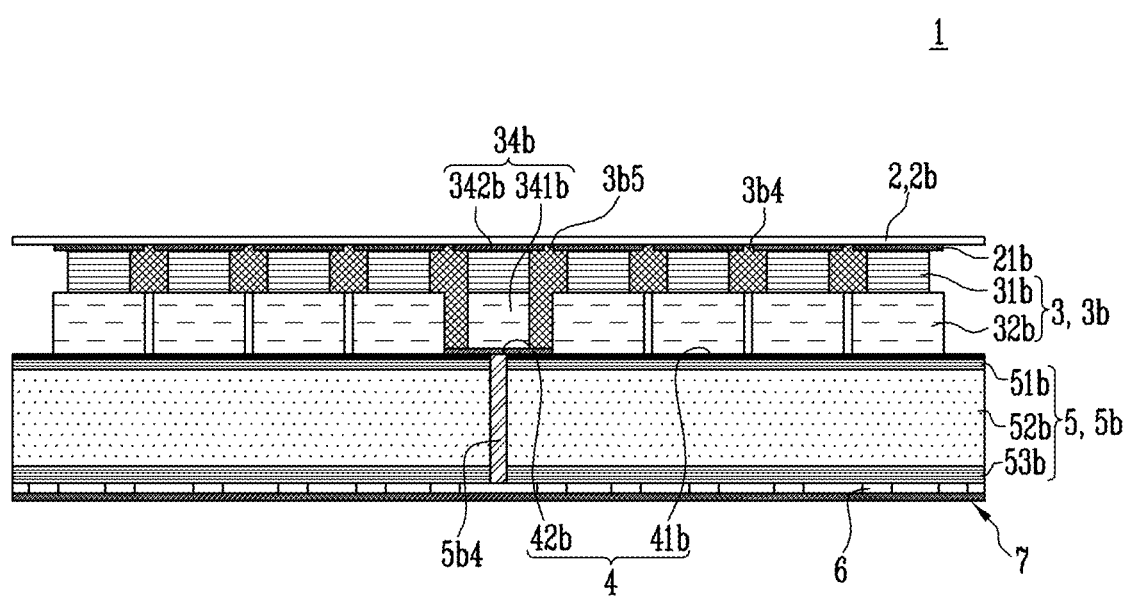
FIG. 17 is a partial front view of a corner portion for describing a liquefied gas storage tank in accordance with an eighth embodiment of the present disclosure.

FIG. 17 is a partial front view of a corner portion for describing a liquefied gas storage tank according to an eighth embodiment of the present disclosure.

The flat structure of the liquefied gas storage tank 1 of this embodiment may consist of a combination of a plurality of flat blocks as shown in FIG. 1 described above, and the corner structure of the liquefied gas storage tank 1 may consist of a combination of a plurality of corner blocks as shown in FIG. 17. These flat blocks may be connected to the plurality of corner blocks in the corner portion of the liquefied gas storage tank 1.

In the liquefied gas storage tank 1 of this embodiment, the configuration of the flat block is the same as or similar to the configuration as described above with reference to FIG. 1. In other words, as shown in FIG. 1, the flat block of the liquefied gas storage tank 1 may be disposed on the flat portion on the first surface or the second surface at different angles forming a storage space for storing liquefied gas, and may include the flat primary insulating wall 3a disposed on the outside of the flat primary barrier 2a and securing the flat primary barrier 2a made of a metal material, the flat secondary barrier 41a provided on the outside of the flat primary insulating wall 3a, and the flat secondary insulating wall 5a disposed on the outside of the flat secondary barrier 41a.

Accordingly, detailed descriptions of the flat block configuration of the liquefied gas storage tank 1 are omitted herein to avoid redundancy. Hereinafter, the configuration of the corner block of the liquefied gas storage tank 1 of this embodiment will be described below in detail with reference to FIGS. 1 and 17.

As shown in FIGS. 1 and 17, the liquefied gas storage tank 1 may be configured to include the primary barrier 2 in contact with the liquefied gas, the primary insulating wall 3 disposed on the outside of the primary barrier 2, the secondary barrier 4 disposed on the outside of the primary insulating wall 3, and the secondary insulating wall 5 disposed on the outside of the secondary barrier 4. The liquefied gas storage tank 1 may be supported on the hull 7 by the mastic 6 disposed between the secondary insulating wall 5 and the hull 7.

In the above, the primary barrier 2 may consist of the flat primary barrier 2a of the flat block and the corner primary barrier 2b of the corner block, the primary insulating wall 3 may consist of the flat primary insulating wall 3a of the flat block and the corner primary insulating wall 3b of the corner block, the secondary barrier 4 may consist of the flat secondary barrier 41a of the flat block and the corner secondary barrier 41b of the corner block, and the secondary insulating wall 5 may consist of the flat secondary insulating wall 5a of the flat block and the corner secondary insulation wall 5b of the corner block. As described in the first embodiment, in this embodiment, the thickness of the primary insulating wall 3 and the thickness of the secondary insulating wall 5 in the flat block and the corner block may be the same or similar to each other.

In the above, when disposing a plurality of flat blocks or a plurality of corner blocks adjacently, the secondary barrier 4 of the flat block and the corner block may include the flat connection barrier 42a or the corner connection barrier 42b connecting the adjacently disposed flat secondary barriers 41a or the adjacently disposed corner secondary barriers 41b.

As shown in FIG. 17, the corner portion of the liquefied gas storage tank 1 according to the eighth embodiment of the present disclosure may consist of a combination of a plurality of corner blocks.

The corner block of the liquefied gas storage tank 1 may be disposed at the corner portion where the first surface and the second surface at different angles forming a storage space for accommodating liquefied gas meet, and the corner block may include the corner primary insulating wall 3b disposed on the outside of the corner primary barrier 2b and securing the corner primary barrier 2b made of a metal material, the corner secondary barrier 41b disposed on the outside of the corner primary insulating wall 3b, and the corner secondary insulating wall 5b disposed on the outside of the corner secondary barrier 41b.

The corner primary barrier 2b may be disposed at the corner portion where the first surface or the second surface at different angles meet to form an accommodating space for accommodating liquefied gas, which is a cryogenic material, and may be made of a metal material. The corner primary barrier 2b may prevent leakage of liquefied gas to the outside in conjunction with the corner secondary barrier 41b The corner primary barrier 2b of this embodiment is basically the same as or similar to that of the first embodiment as described above, and detailed descriptions thereof are omitted herein.

The corner primary barrier 2b may be secured to a barrier fixing member 21b.

The barrier fixing member 21b may be made of a metal material and installed on the corner primary insulating wall 3b. In the case of the corner primary insulating wall 3b, a plurality of the corner primary insulating wall 3b may be disposed along the side of the corner portion on the corner secondary insulating wall 5b, and the barrier fixing member 21b may be disposed independently on each of the plurality of the corner primary insulating walls 3b.

The corner primary insulating walls 3b may be designed to withstand an impact from the outside or an impact caused by liquefied gas sloshing from the inside while blocking heat intrusion from the outside, and may be disposed between the corner primary barrier 2b and the corner secondary barriers 41b.

The corner primary insulating walls 3b may be provided on the inside of the first surface and the second surface, respectively, and may include the corner primary insulation material 32b secured to the corner secondary barrier 41b and the inner primary plywood 31b forming a step with the corner primary insulation material 32b disposed on the inside of the corner primary insulation material 32b and secured to the corner primary barrier 2b.

The corner primary insulating wall 3b having the inner primary plywood 31b and the corner primary insulation material 32b stacked sequentially may be arranged in plurality along the side of the corner portion on the corner secondary insulating wall 5b.

While the corner primary insulating wall 3b is described as including the inner primary plywood 31b and the corner primary insulation material 32b in this embodiment, the corner primary insulating wall 3b of this embodiment may also be the same as or similar to the corner primary insulating wall 3b of any one of the first to seventh embodiments.

The plurality of corner primary insulating walls 3b may be disposed adjacent to each other on the corner secondary insulating walls 5b so as to minimize the gap between the plurality of corner primary insulating walls 3b such that filling of a separate insulation material such as glass wool between the plurality of corner primary insulating walls 3b may be omitted.

When a plurality of corner primary insulating walls 3b are arranged in this way, a stepped space is created between the corner primary insulation material 32b and the inner primary plywood 31b that form the step. The corner block of this embodiment may be filled within the stepped space of the corner primary insulating walls 3b disposed adjacent to each other, and may include an inner first packing material 3b4 on which the corner primary barriers 2b are seated.

The inner first packing material 3b4 may be polyurethane foam or glass wool.

The plurality of corner primary insulating walls 3b may be a part of the corner block structure together with the corner secondary barriers 41b, and a total width of the plurality of corner primary insulating walls 3b constituting the corner block may be smaller than the width of the corner secondary insulating wall 5b, which is another configuration of the corner block. Due to this, a portion of the corner secondary barriers 41b may be exposed to the outermost side of the plurality of corner primary insulating walls 3b. When a plurality of corner blocks are disposed adjacently along the side of the corner portion, the corner connection insulating wall 34b may be disposed in the space portion between the outermost corner primary insulating walls 3b disposed adjacently, that is, the space portion in which the corner secondary barriers 41b are exposed.

The corner connection insulating wall 34b may be disposed between the neighboring outermost corner primary insulating walls 3b when the corner blocks are arranged adjacently, may be provided in a form having the corner connecting insulation material 341b, which is the same as or similar to the corner primary insulating wall 3b, and the corner connecting plywood 342b stacked together, and may have a thickness that is the same as or similar to that of the corner primary insulating wall 3b.

When the plurality of corner blocks are disposed adjacently along the side of the corner portion, this corner connection insulating wall 34b may be disposed to serve to block heat intrusion from the outside by sealing the space portion generated between the corner secondary insulating walls 5b disposed adjacently in conjunction with the corner connection barrier 42b.

As such, when arranging the plurality of corner blocks adjacently along the corner portion, there may be generated a space between the corner connecting insulation material 341b and the corner primary insulation material 32b, and between the corner connecting plywood 342b and the inner primary plywood 31b. Thereby, it is possible to finish the construction of the corner primary insulating wall 3b by filling, in this space, the inner second packing material 3b5 on which the corner primary barrier 2b is seated.

The inner second packing material 3b5 may be polyurethane foam or glass wool.

The corner secondary barrier 41b may be disposed between the corner primary insulating wall 3b and the corner secondary insulating wall 5b, and may serve to prevent leakage of liquefied gas to the outside in conjunction with the corner primary barrier 2b.

The corner secondary barrier 41b together with the corner primary insulating wall 3b and the corner secondary insulating wall 5b may constitute a part of the corner block, and when the corner blocks are disposed adjacently, the neighboring corner secondary barrier 41b may be sealed and connected through the corner connecting barriers 42b.

The corner connecting barrier 42b may connect the neighboring corner secondary barriers 41b exposed to the outside when the corner blocks are disposed adjacently, and the corner connecting insulating wall 34b may be installed thereon.

The corner secondary Insulating wall 5b may be configured to include the inner secondary plywood 51b, the corner secondary insulation material 52b, and the outer secondary plywood 53b. The corner secondary insulating wall 5b may be secured to the inside of the first surface and the second surface, respectively, and may include the outer first fixing portion 5b1 and the outer second fixing portion 5b2 having the inner secondary plywood 51b, the corner secondary insulation material 52b, and the outer secondary plywood 53b stacked sequentially toward the outside of the corner secondary barrier 2b.

When the plurality of corner blocks are adjacently disposed along the side of the corner portion, the space generated between the neighboring corner secondary insulating walls 5b disposed adjacently may be filled with the outer packing material 5b4.

The outer packing material 5b4 may be polyurethane foam or glass wool.

The corner secondary insulating wall 5b of this embodiment may be the same as or similar to the corner secondary insulating wall 5b of at least one of the first to seventh embodiments, and thus descriptions thereof are omitted herein to avoid redundancy.

By providing the corner primary insulating wall 3b including the inner primary plywood 31b forming a step with the corner primary insulation material 32b in plurality on the corner secondary insulating wall 5b and configuring the neighboring corner primary insulation materials 32b to be disposed adjacently, the present embodiment may facilitate the installation handling of the barrier fixing member 21b through the stepped portion between the adjacent inner first plywood 31b, and reduce the consumption of the packing material because the packing material 3b4 only needs to be applied on the stepped portion.

Figure 18:
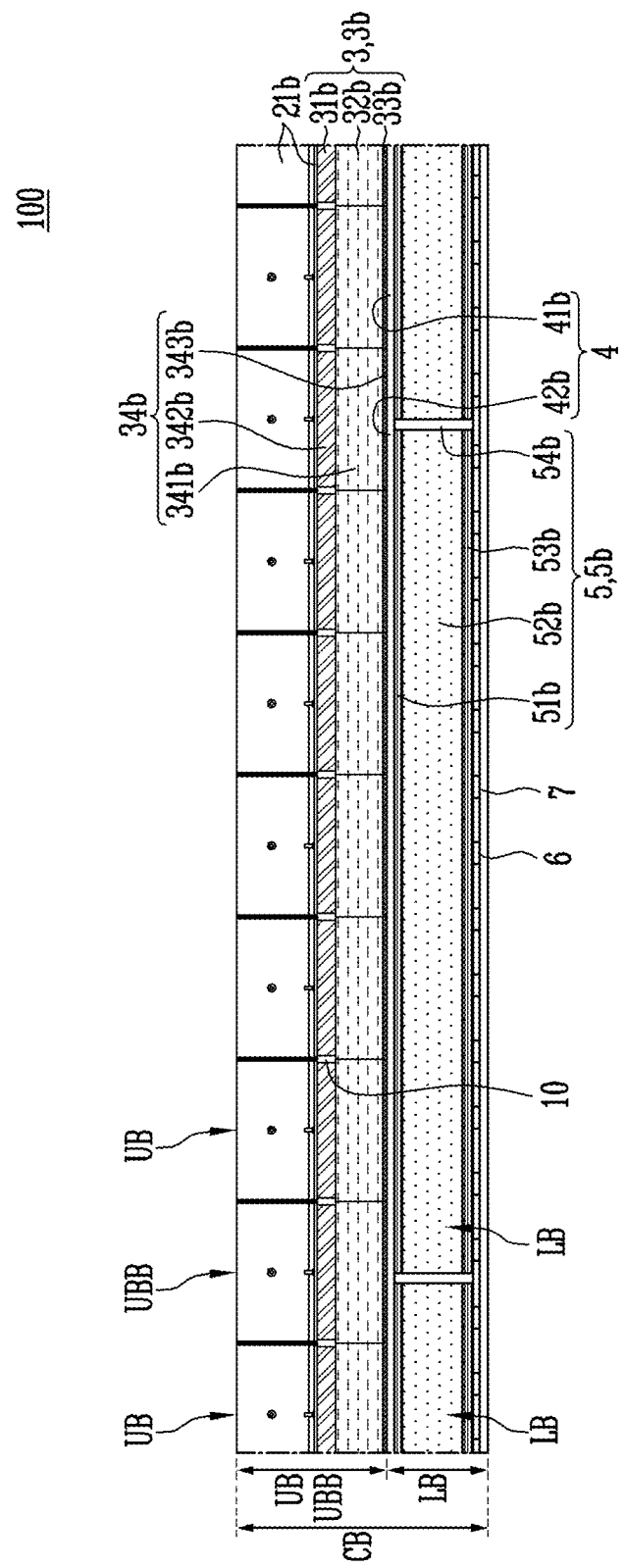
FIG. 18 is a partial front view of a corner portion for describing a liquefied gas storage tank in accordance with a ninth embodiment of the present disclosure.
Figure 19:
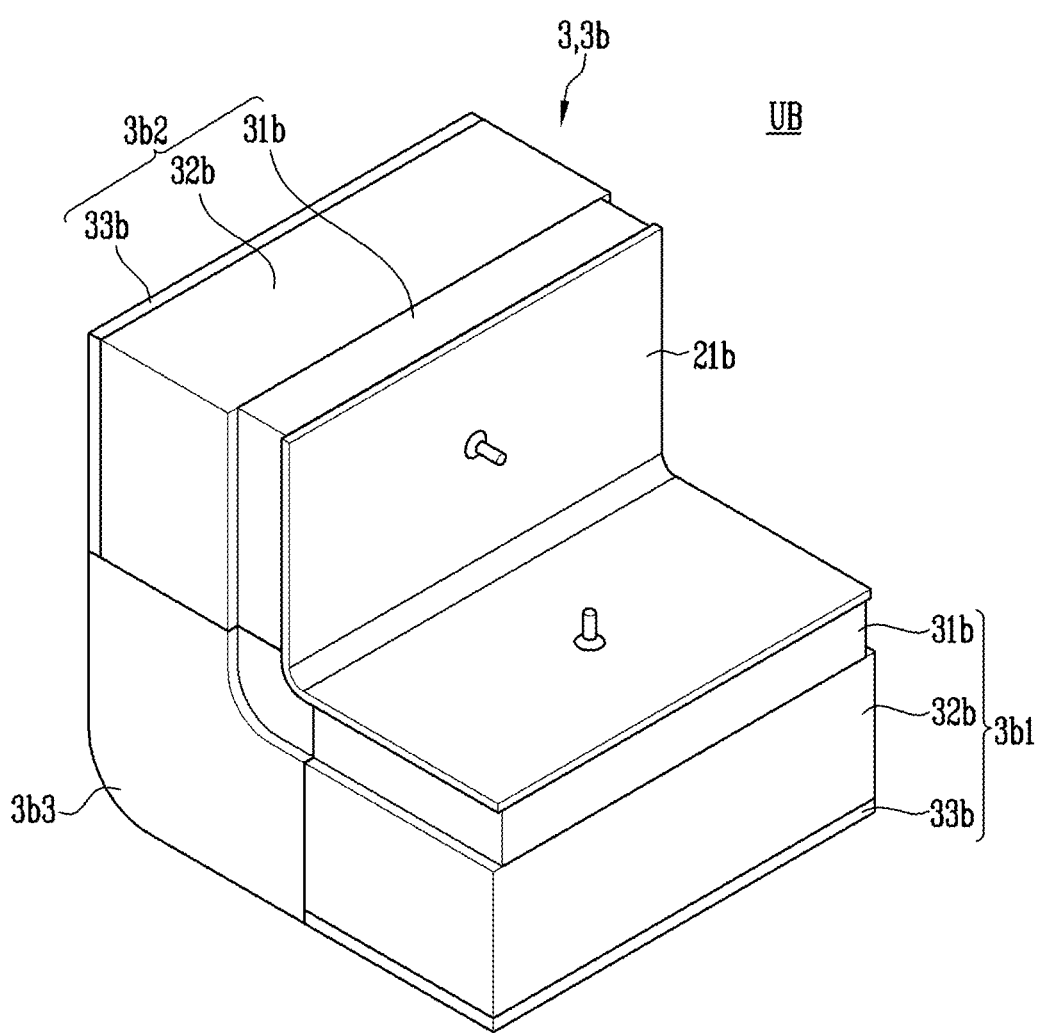
FIG. 19 is a perspective view for describing an upper block of FIG. 18.
Figure 20:
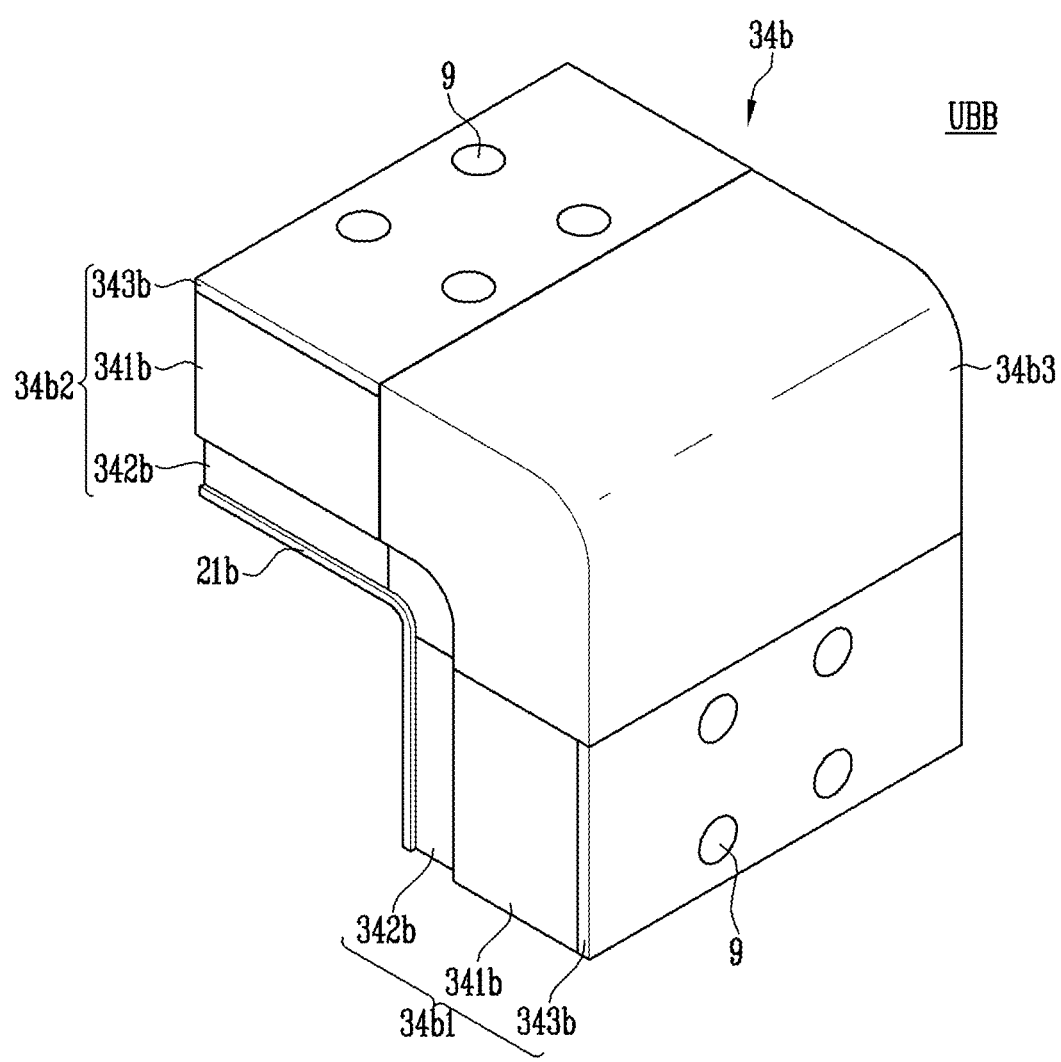
FIG. 20 is a perspective view for describing an upper connection block of FIG. 18.
Figure 21:
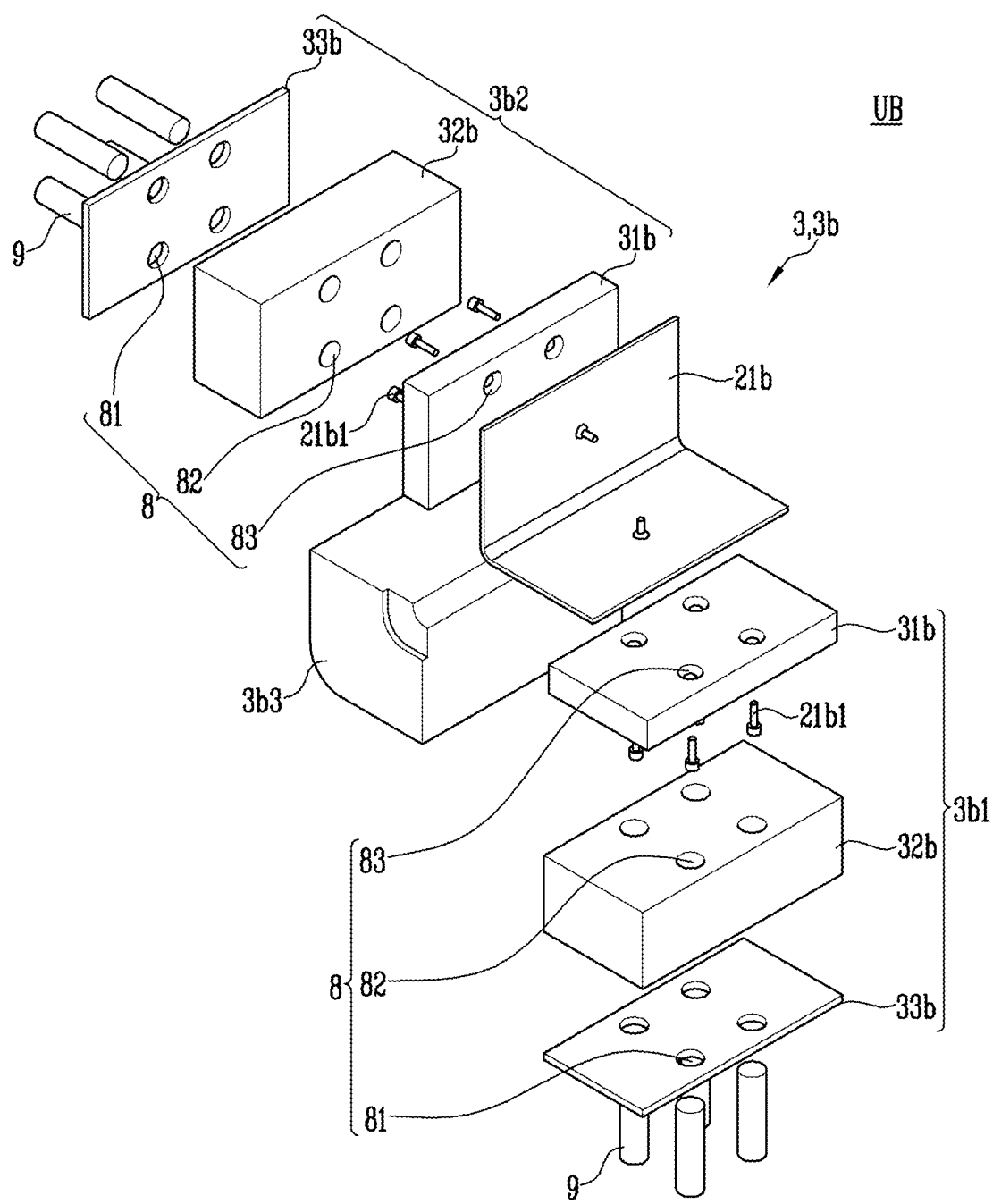
FIG. 21 is an exploded perspective view of the upper block of FIG. 19.
Figure 22:
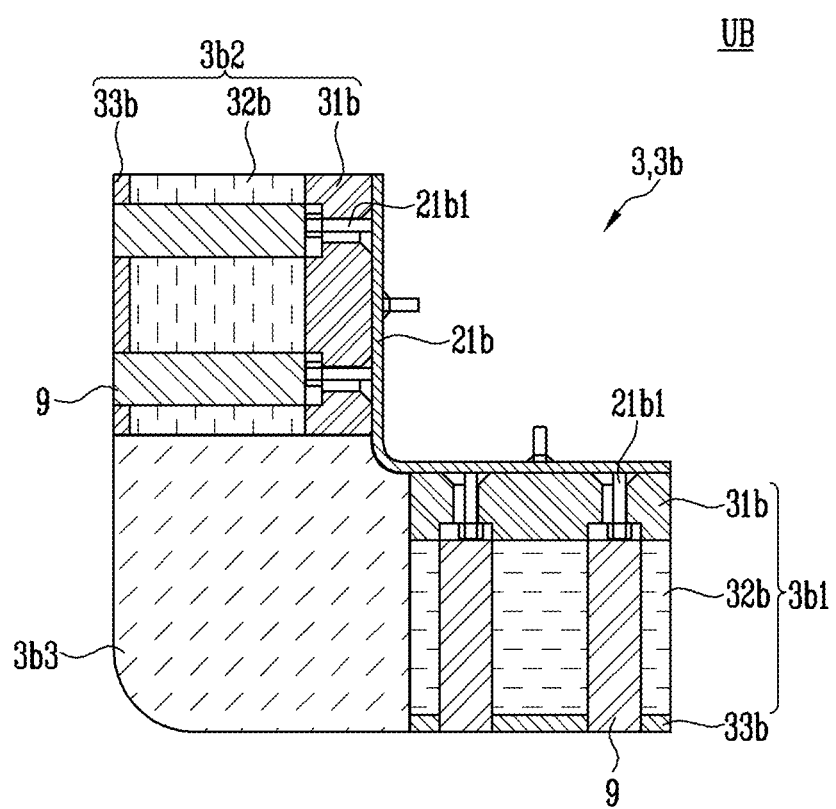
FIG. 22 is a cross-sectional view of the upper block of FIG. 19.
Figure 23:
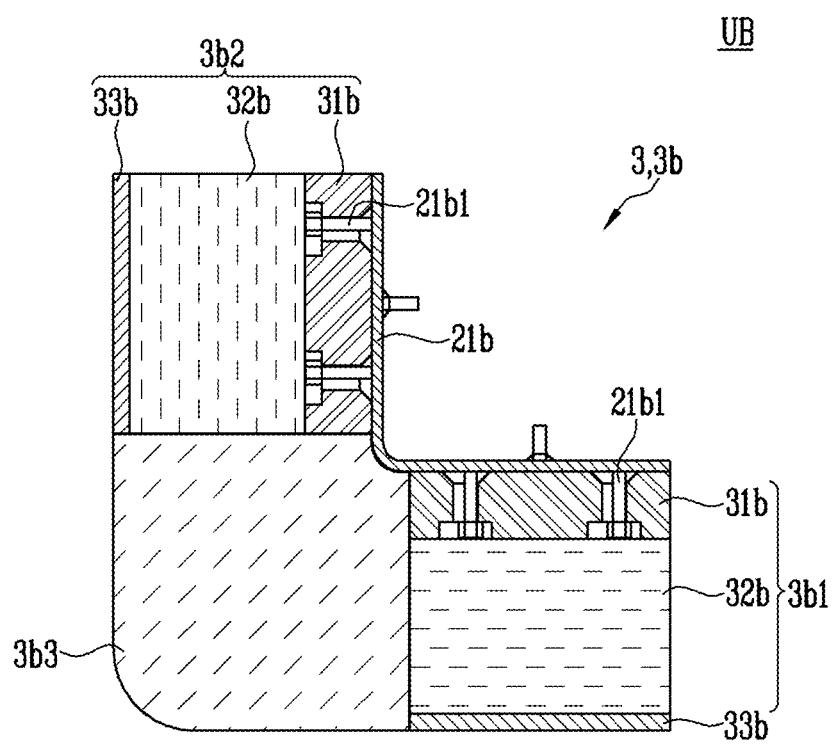
FIG. 23 is a cross-sectional view illustrating another embodiment of the upper block of FIG. 19.
Figure 24:
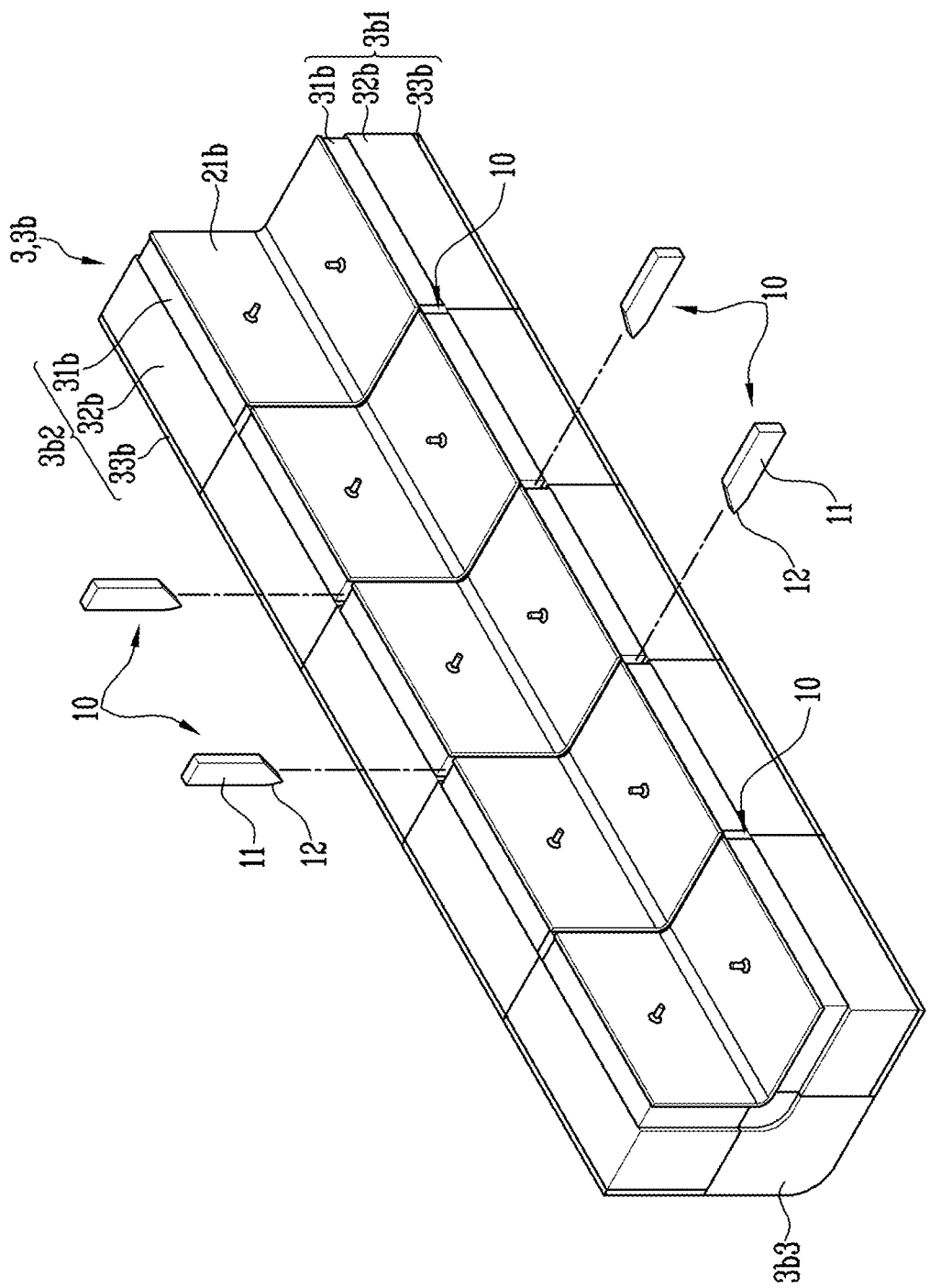
FIG. 24 is a perspective view for describing a stuffing piece of FIG. 18.
Figure 25:
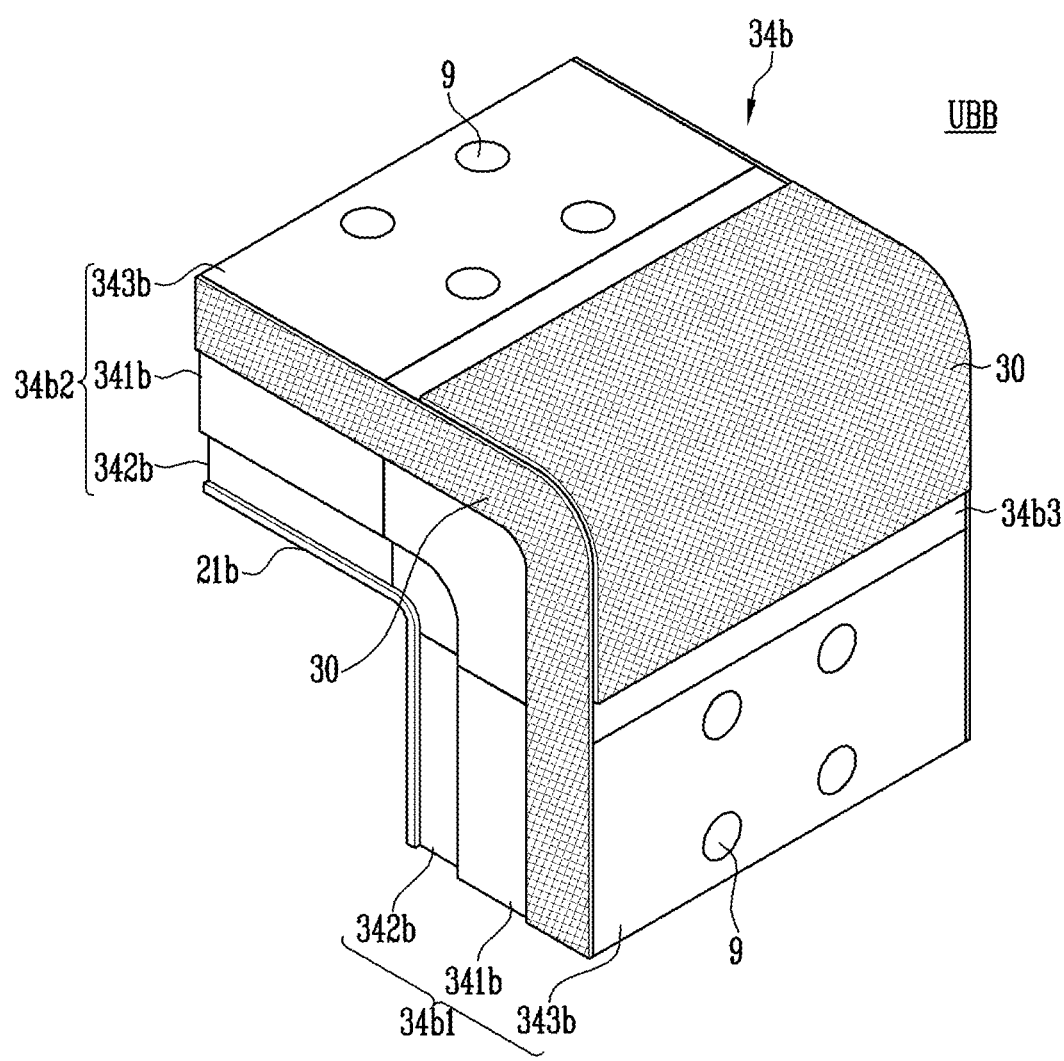
FIG. 25 is a diagram for describing an anti-bonding member applied to the upper connection block of FIG. 18.
Figure 26:
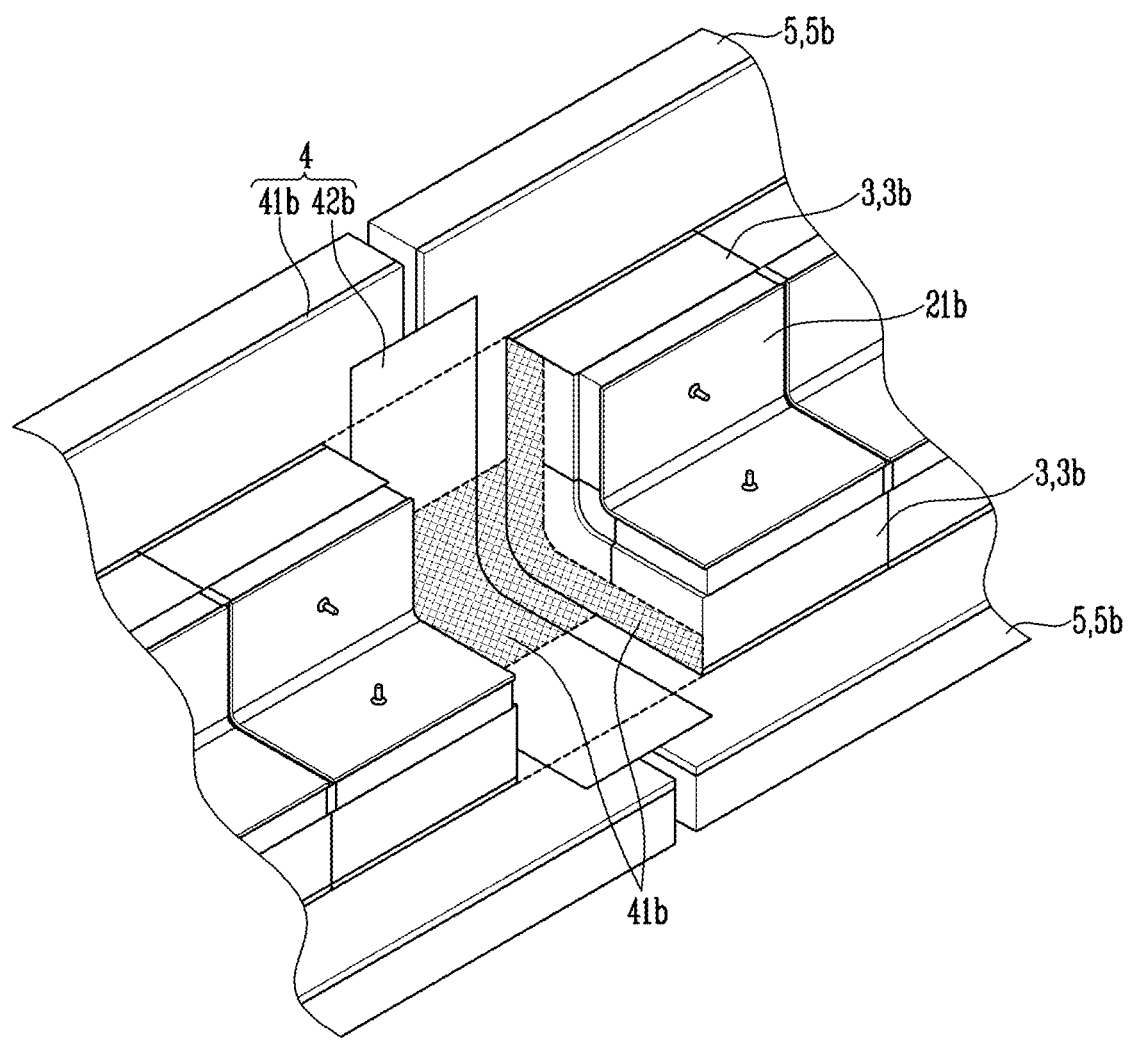
FIG. 26 is a diagram for describing another embodiment of the anti-bonding member applied to the upper connection block of FIG. 18.

FIG. 18 is a partial front view of a corner portion for describing a liquefied gas storage tank according to an ninth embodiment of the present disclosure, FIG. 19 is a perspective view for describing the upper block of FIG. 18, FIG. 20 is a perspective view for describing the upper connection block of FIG. 18, FIG. 21 is an exploded perspective view of the upper block of FIG. 19, FIG. 22 is a cross-sectional view of the upper block of FIG. 19, FIG. 23 is a cross-sectional view illustrating another embodiment of the upper block of FIG. 19, FIG. 24 is a perspective view for describing the stuffing piece of FIG. 18, FIG. 25 is a diagram for describing an anti-bonding member applied to the upper connection block of FIG. 18, and FIG. 26 is a diagram for describing another embodiment of the anti-bonding member applied to the upper connection block of FIG. 18.

Figure 27A:
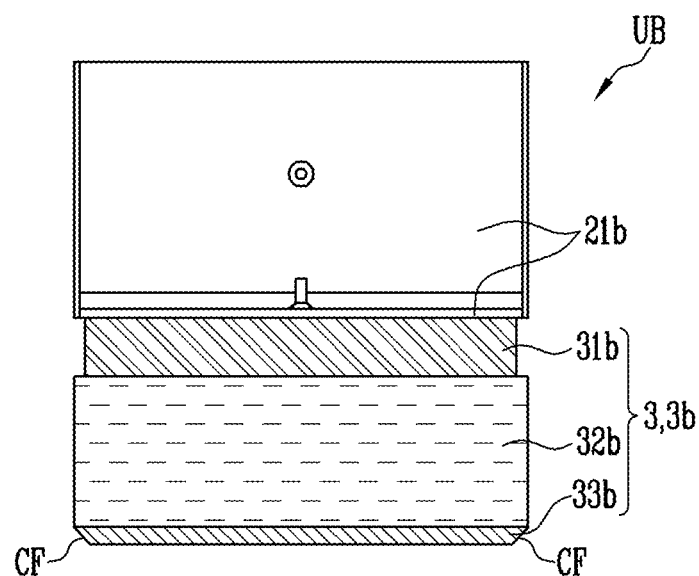
FIGS. 27A and 27B are diagrams for describing another embodiment of the upper block and the upper connection block of FIG. 18.
Figure 27B:
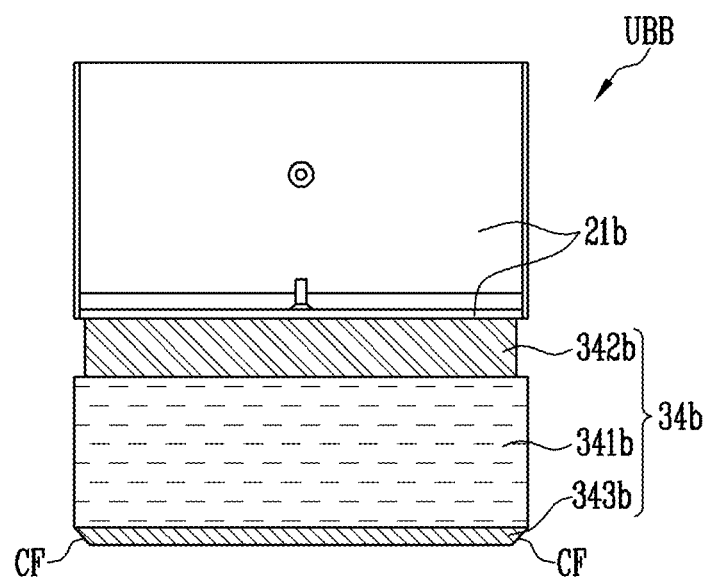
Figure 29A:
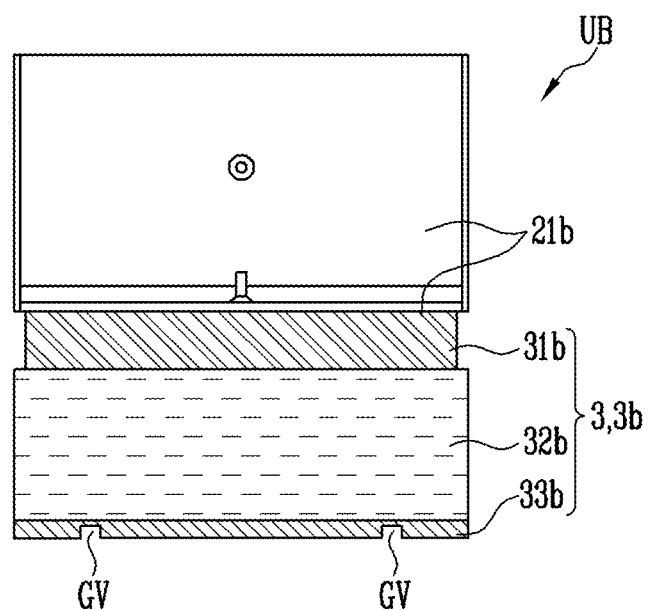
FIGS. 29A and 29B are diagrams for describing another embodiment of the upper block and the upper connection block of FIG. 18.
Figure 29B:
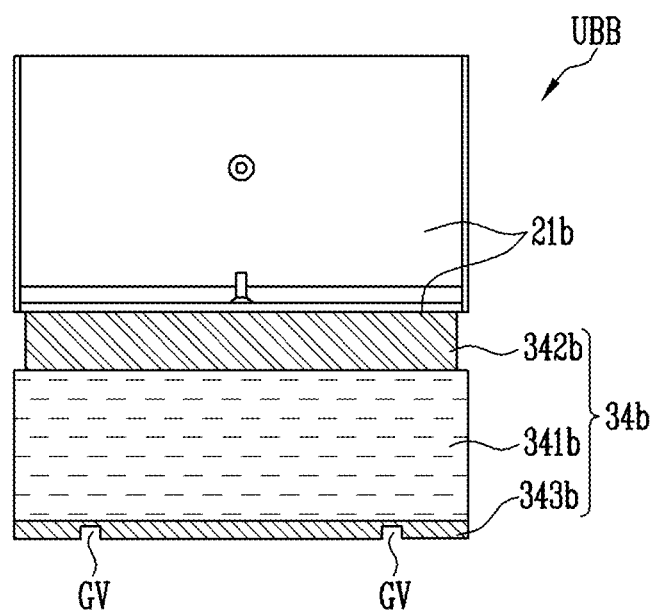

In addition, FIGS. 27A and 27B are diagrams for describing another embodiment of the upper block and the upper connection block of FIG. 18, FIG. 28 is a partially enlarged front view of the corner portion to which the upper block and the upper connection block of FIG. 27 are applied, FIGS. 29A and 29B are diagrams for describing another embodiment of the upper block and the upper connection block of FIG. 18, and FIG. 30 is a partially enlarged front view of the corner portion to which the upper block and the upper connection block of FIG. 29 are applied.

Figure 31A:
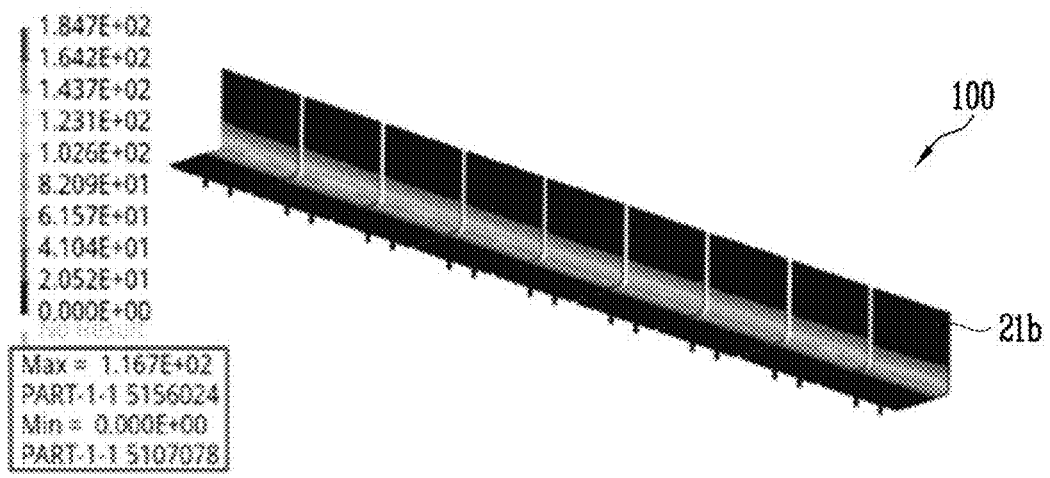
FIGS. 31A and 31B are diagrams illustrating structural analysis results for each of a barrier fixing member with no stiffener of the embodiment of the present disclosure and a barrier fixing member with a stiffener of a comparative example, respectively.
Figure 31B:
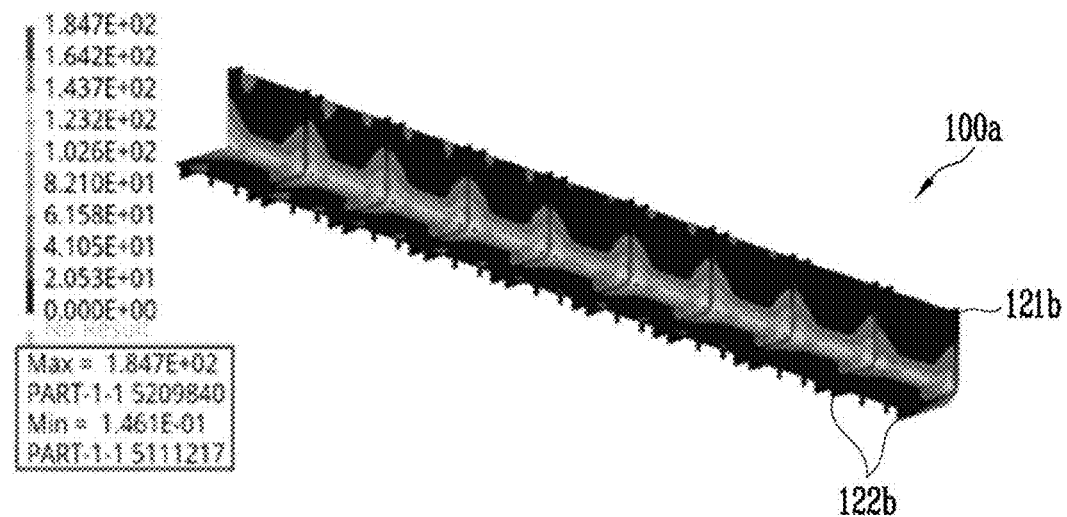
Figure 32A:
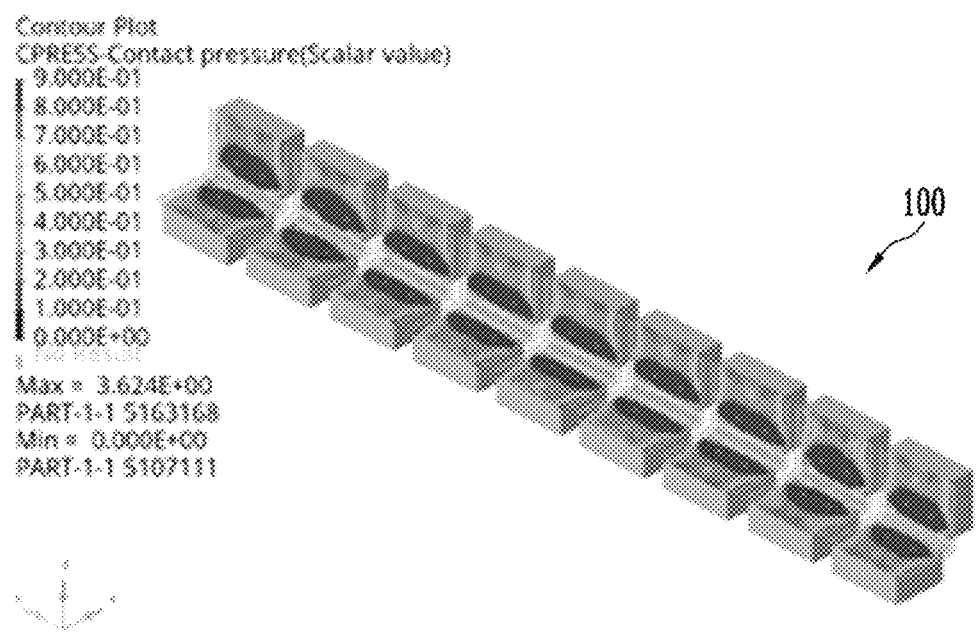
FIGS. 32A and 32B are diagrams illustrating structural analysis results for a component (plywood) provided below each of the barrier fixing member without the stiffener of the present embodiment and the barrier fixing member with the stiffener of the comparative example, respectively.
Figure 32B:
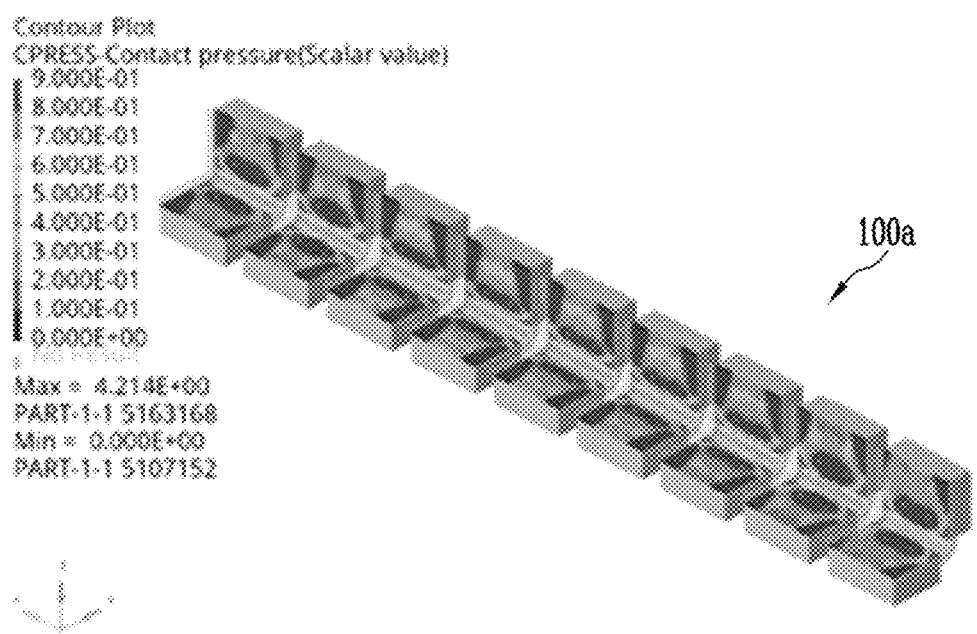

In addition, FIGS. 31A and 31B are diagrams illustrating structural analysis results for each of the barrier fixing member without the stiffener of the embodiment of the present disclosure and the barrier fixing member with the stiffener of the comparative example, and FIGS. 32A and 32B are diagrams illustrating structural analysis results for the component (plywood) provided below each of the barrier fixing member without the stiffener of the embodiment of the present disclosure and the barrier fixing member with the stiffener of the comparative example.

As shown in FIG. 18, the corner of the liquefied gas storage tank 100 according to the ninth embodiment of the present disclosure may consist of a combination of a plurality of corner blocks (CB). The primary structure of the corner block CB may include a lower block LB secured to the hull 7 and made of a single board, a plurality of upper blocks UB bonded on the lower block LB, and upper bonding block UBB connecting the adjacently disposed lower block LB.

The corner block CB of this embodiment may be, as in the first to eighth embodiments as described above, disposed at a corner portion where the first and second surfaces at different angles meet to form a storage space for accommodating liquefied gas. Although not shown, with the corner block CB disposed in place, the corner block CB may complete the corner portion of the liquefied gas storage tank 100 sealing and accommodating the liquefied gas, which is a cryogenic material, by forming the corner primary barrier 2b made of a metal material on the upper block UB and the upper bonding block UBB as described above.

The liquefied gas storage tank 100 of this embodiment may be completed by connecting the corner block CB formed in the corner portion and the flat block formed in the flat portion, where the flat block may be the flat block shown in FIG. 1 of the first embodiment as described above or the flat block FB shown in FIG. 33 of the tenth embodiment as described below, but is not limited thereto.

In addition, the corner block CB of the present embodiment will be described in detail below by dividing the descriptions into those of the lower block LB, the upper block UB, and the upper bonding block UBB, but is not limited thereto, and may also be the same as or similar to the structure of any one of the first to eighth embodiments as described above.

As shown in FIG. 18, the lower block LB may have a plurality of upper blocks UB and upper connection blocks UBB installed on its upper surface, and may include the corner secondary barrier 41b bonded to the lower surface of the upper blocks UB, the corner connecting barrier 42b bonded to a lower surface of the upper bonding block UBB and connecting the neighboring corner secondary barriers 41b, which is exposed to the outside due to not having the upper block UB installed thereon when the lower blocks LB are disposed adjacently, and the corner secondary insulating wall 5b configured to include the inner secondary plywood 51b, the corner secondary insulation material 52b, and the outer secondary plywood 53b.

This lower block LB of this embodiment may have a structure that is the same as or similar to that of at least one of the first to eighth embodiments as described above, and thus descriptions thereof are omitted to avoid redundancy.

The plurality of upper blocks UB may be bonded onto the lower blocks LB.

Each of the plurality of upper blocks UB, as shown in FIGS. 18, 19, and 21, may have a basic structure consisting of the barrier fixing member 21b disposed on the outside of the corner primary barrier 2b and securing the corner primary barrier 2b made of a metal material, and the corner primary insulating wall 3b disposed on the outside of the barrier fixing member 21b. Here, the corner primary insulating wall 3b may further include an inner bent portion 3b3.

The upper blocks UB having the basic structure as described above may be bonded onto the lower block LB by being arranged side by side with a predetermined gap. As shown in FIG. 18, this embodiment may have 5 upper blocks UB arranged side by side with a predetermined gap, but is not limited thereto.

The barrier fixing member 21b may be made of a metal material and disposed on the top of the corner primary insulating wall 3b, and may be bent at a predetermined angle with the inside of the first and second surfaces, for example, bent at the same angle as that generated by the first and second surfaces of different angles, which form the storage space for accommodating liquefied gas. The corner primary insulating wall 3b may be arranged in plurality along the side of the corner portion forming a right angle or an obtuse angle on the corner secondary insulating wall 5b constituting the lower block LB, and thus the barrier fixing member 21b may be bent at a right angle or an obtuse angle so as to be independently disposed on each of the plurality of corner primary insulating walls 3b.

The barrier fixing member 21b may be disposed on the top of the corner primary insulating walls 3b by using a plurality of coupling members 21b1 provided on its rear surface. The coupling member 21b1 may include a stud bolt and a nut.

The barrier fixing member 21b of this embodiment, as shown in FIG. 21, is not provided with a reinforcing member holding the upper portion of the corner primary insulating wall 3b on the rear surface.

In general, as a reinforcing member for holding the upper portion of the corner primary insulating wall 3b, there is a stiffener 122b as shown in FIG. 31 (b). In other words, the general barrier fixing member 121b is provided with the stiffener 122b along the edge of the rear surface as a reinforcing member. The stiffener 122b corresponds to the concept of firmly securing the upper block UB.

Meanwhile, a general barrier fixing member 121*b* provided with the stiffener 122*b* has the problem of vulnerability to stress when an external force such as the behavior of the hull or a thermal load is applied on a portion bent at a right angle or an obtuse angle.

Accordingly, in order to solve this problem, the barrier fixing member 21*b* of this embodiment is coupled to the upper surface of the corner primary insulating wall 3*b* in a plane-to-plane basis without a reinforcement member such as the stiffener 122*b* on the rear surface, and the solution is confirmed by the results of structural analysis.

FIG. 31A is a diagram illustrating the structural analysis results for the barrier fixing member 21*b* not provided with the stiffener 122*b* when an external force such as hull behavior or a thermal load is applied in the liquefied gas storage tank 100 of this embodiment, and FIG. 31B is a diagram illustrating the structural analysis results for the barrier fixing member 21*b* provided with the stiffener 122*b* when an external force such as hull behavior or a thermal load is applied in the liquefied gas storage tank 100 of the comparative example. It may be appreciated from the structural analysis results that the stress is more evenly distributed in the portion bent at a right angle or an obtuse angle flexibly in response to the external force when the stiffener 122*b* is absent (present embodiment) than when the stiffener 122*b* is absent (comparative example).

FIG. 32A is a diagram illustrating the structural analysis results for the component (plywood) provided on the lower side of the barrier fixing member 21*b* that is not provided with the stiffener 122*b* when an external force such as hull behavior or a thermal load is applied in the liquefied gas storage tank 100 of the present embodiment, and FIG. 32B is a diagram illustrating the structural analysis results for the component (plywood) provided on the lower side of the barrier fixing member 21*b* that is provided with the stiffener 122*b* when an external force such as hull behavior or a thermal load is applied in the liquefied gas storage tank 100 of the comparative example. It may be appreciated from the structural analysis results that due to the stress evenly distributed in the bent portion at a right angle or an obtuse angles, the bending of the bending portion may also reduced such that the pressure acting on the component connected to the lower side is also evenly distributed with a lower value.

In this embodiment, by not having a reinforcement member such as the stiffener 122*b* on the rear surface of the barrier fixing member 21*b*, the weight of the barrier fixing member 21*b* itself may be reduced. Furthermore, as welding may not be performed to attach the reinforcement member, it is possible to reduce the welding man-hour and increase the precision during manufacturing, and thus it is possible to increase the stability of the system such as reducing the frequency of occurrence of damages in the bent portion and minimizing repair by evenly distributing the stress generated in the portion bent in a right angle or an obtuse angle compared to the existing barrier fixing member 121*b* provided with the stiffener 122*b* of the related art.

The corner primary insulating wall 3*b* may be designed to withstand an impact from the outside or an impact caused by liquefied gas sloshing from the inside while blocking heat intrusion from the outside, and may be disposed between the barrier fixing member 21*b* and the lower block LB of the corner secondary barriers 41*b*.

The corner primary insulating wall 3*b* may be provided on the inside of the first surface and the second surface, respectively, and may include the inner first fixing portion 3*b*1 and the inner second fixing portion 3*b*2 configured to include the inner first plywood 31*b*, the corner primary insulation material 32*b*, and the outer primary plywood 33*b* stacked sequentially toward the outside of the barrier fixing member 21*b*.

In addition, the corner primary insulating wall 3*b* may include the inner bent portion 3*b*3 made of an insulation material in a space portion between the inner first fixing portion 3*b*1 and the inner second fixing portion 3*b*2.

The corner primary insulating wall 3*b* of this embodiment may be the same as or similar to the corner primary insulating wall 3*b* of the first embodiment described above, and detailed descriptions thereof are omitted here to avoid redundancy.

In the upper block UB configured as described above, the inner primary plywood 31*b* may be installed on an inner upper surface of the corner primary insulation material 32*b*, and may form a step with the corner primary insulation material 32*b*. Therefore, when the upper blocks UB having the basic structure is arranged side by side with a predetermined gap, the neighboring corner primary insulation materials 32*b* are arranged adjacently, and a stepped space is formed between the neighboring inner primary plywoods 31*b*. Filling of a separate insulation material may be omitted between the corner primary insulation materials 32*b* disposed adjacent to each other. In this embodiment, although it was described that filling of the insulation material between the corner primary insulation materials 32*b* may be omitted, it is also possible to construct an insulation material between the corner primary insulation materials 32*b*.

A stuffing piece 10 may be inserted into the stepped space generated between the neighboring inner primary plywoods 31*b* as shown in FIG. 24, and the stuffing piece 10 will be described in detail later.

The upper bonding block UBB may be bonded to the upper surface of the adjacent lower blocks LB for connection with the lower blocks LB.

As shown in FIGS. 18 and 20, the upper connection block UBB may include the barrier fixing member 21*b* disposed on the outside of the corner primary and securing the corner primary barrier 2*b* made of a metal material, and the corner connecting insulating wall 34*b* disposed on the outside of the barrier fixing member 21*b*. Here, the corner connecting insulating wall 34*b* may further include the corner connecting bent portion 34*b*3.

The barrier fixing member 21*b* of the upper bonding block UBB may be the same as or similar to the barrier fixing member 21*b* of the upper block UB as described above, and thus descriptions thereof are omitted here to avoid redundancy.

The corner connection insulating wall 34*b* of the upper bonding block UBB may be designed to withstand an impact from the outside or an impact caused by liquefied gas sloshing from the inside while blocking heat intrusion from the outside in conjunction with the insulating wall 3*b*, and may be disposed between the barrier fixing member 21*b* and the corner connection barrier 42*b* of the lower block LB.

These corner connection insulating walls 34*b* may be provided on the inside of the first surface and the second surface, respectively, and may include the corner first connecting fixing portion 34*b*1 and the second connecting fixing portion 34*b*2 having the corner first connecting plywood 342*b*, the corner connecting insulation material 341*b*, and the corner second connecting plywood 343*b* stacked sequentially toward the outside of the barrier fixing member 21*b*.

In addition, the corner connection insulating walls 34*b* may include the corner connecting bent portion 34*b*3 consisting of an insulation material between the corner first connecting fixing portion 34*b*1 and the corner second connecting fixing portion 34*b*2. The corner connecting bent portion 34*b*3 may be made of the same or similar material to that of the inner bent portion 3*b*3, for example, low-density polyurethane foam or glass wool.

In the present embodiment, the corner connection insulating wall 34*b* may have a structure that is the same as or similar to that of the above-described corner primary insulating wall 3*b* except for the only difference in the reference numerals, and thus descriptions thereof are omitted to avoid redundancy.

In the upper connection block (UBB) configured as described above, the corner first connection plywood 342*b* may be disposed on an inner upper surface of the corner connecting insulation material 34*b*, and form a step with the corner connecting insulation material 34*b*. Therefore, when the upper bonding block UBB is disposed at the connection site of the lower blocks LB for connecting the neighboring lower blocks LB, the corner connecting insulation material 341*b* of the upper connection block UBB and the corner primary insulation material 32*b* of the upper block UB may be disposed adjacently, and a stepped space may be formed between the corner first connection plywood 342*b* of the upper connection block UBB and the inner primary plywood 31*b* of the upper block UB. Filling of a separate insulation material may be omitted between the corner primary insulation material 32*b* of the upper block UB and the corner connecting insulation material 341*b* of the upper bonding block UBB, which are disposed adjacent to each other. In the present embodiment, although it has been described that filling of an insulation material is omitted between the corner primary insulation material 32*b* of the upper block UB and the corner connecting insulation material 341*b* of the upper bonding block UBB, it is also possible to construct an insulation material between the corner primary insulation material 32*b* of the upper block UB and the corner connecting insulation material 341*b* of the upper bonding block UBB.

The stuffing piece 10 may be inserted into the stepped space formed between the corner first connecting plywood 342*b* and the inner primary plywood 31*b* as shown in FIG. 24.

As shown in FIGS. 18 and 24, the stuffing piece 10 may be inserted into the first stepped space formed between the inner primary plywoods 31*b* of the neighboring upper block UB and the second step space formed between the inner primary plywood 31*b* of the upper block UB and the corner first connection plywood 342*b* of the upper bonding block UBB. As a result, it is possible to constantly maintain the gap between the neighboring upper blocks UB and the gap between the upper block UB and the upper connection block UBB, secure the inner bent portion 3*b*3 of the upper block UB and the corner connecting bent portion 34*b*3 of the upper connecting block UBB, and facilitates handling when working with the upper block UB.

When the inner bent portion 3*b*3 or the corner connecting bent portion 34*b*3 is not secured, a constant gap between the neighboring upper blocks UB or between the upper block UB and the upper bonding block UBB may not be maintained, resulting in a sloshing event.

Accordingly, when the stiffener 122*b* is provided along the edge of the rear surface with the barrier fixing member 121*b* of the related art as described above, the stiffener 122*b* may secure the inner bent portion 3*b*3 or the corner connecting bent portion 34*b*3. However, in the case of the barrier fixing member 21*b* without the stiffener 122*b* of the present embodiment, a separate fixing member for securing the inner bent portion 3*b*3 or the corner connecting bent portion 34*b*3 is needed, and the stuffing piece 10 may serve as the fixing member in this embodiment.

This stuffing piece 10 may be formed of the same or similar material to the inner bent portion 3*b*3 or the corner connecting bent portion 34*b*3, for example, low-density polyurethane foam, and may consist of a body 11 having a shape corresponding to the first and second stepped spaces, and an end 12 inserted into the inner bent portion 3*b*3 or the corner connection bent portion 34*b*3 after the body 11 is inserted into the first and second step spaces.

In the above, the end 12 may be formed in a wedge shape so as to be easily embedded in the inner bent portion 3*b*3 or the corner connecting bent portion 34*b*3.

In addition, an adhesive (not shown) may be applied to stably secure the inner bent portion 3*b*3 or the corner connecting bent portion 34*b*3 on the end 12.

An assembly processes of the upper block UB configured as described above will be described below with reference to FIGS. 21 and 22.

In the first assembly process, the outer primary plywood 33*b* having a plurality of first holes 81 is bonded to an outer surface of the corner primary insulation material 32*b* having a plurality of second holes 82, and the inner primary plywood 31*b* having a plurality of third holes 83 is bonded to an inner surface of the corner primary insulation material 32*b* having the plurality of second holes 82.

Here, the first, second, and third holes 81, 82, and 83 may be formed on an extension line of positions corresponding to each of the plurality of coupling members 21*b*1 provided in the barrier fixing member 21*b*. The first and second holes 81 and 82 may have the same size, may have a hole form in which the outer primary plywood 33*b* and the corner primary insulation material 32*b* are bonded to be in communication, may be sealed by inserting a foam plug in the communicating hole, wherein the third holes 83 may be sized to insert the coupling members 21*b*1 therein.

In the second assembly process, when the outer primary plywood 33*b*, the corner primary insulation material 32*b*, and the inner primary plywood 31*b* are bonded together, the barrier fixing member 21*b* is brought into close contact with the upper surface of the inner primary plywood 31*b* so that the plurality of coupling members 21*b*1 are inserted into the plurality of third holes 83 formed in the inner primary plywood 31*b*.

In the third assembly process, the barrier fixing member 21*b* is secured to the upper surface of the inner primary plywood 31*b* by bolting the coupling members 21*b*1 through the communication hole formed by the plurality of first and second holes 81, 82.

In the fourth assembly process, with the barrier fixing member 21*b* secured to the inner primary plywood 31*b*, the foam plug 9 is inserted into the communication hole formed by the plurality of first and second holes 81 and 82. Here, the foam plug 9 has a size corresponding to the communication hole, and may be the same or similar material to the corner primary insulation material 32*b*.

Thereafter, the assembly processes of the upper block UB is completed by inserting the inner bent portion 3*b*3 in the space portion between the inner first fixing portion 3*b*1 and the inner second fixing portion 3*b*2 formed by the bonded structure of the outer primary plywood 33*b*, the corner primary insulation material 32*b*, and the inner primary plywood 31*b*.

As described above, the upper block UB of this embodiment has a structure wherein the outer primary plywood 33*b* having a plurality of first holes 81, the corner primary insulation material 32*b* having a plurality of second holes 82, and the inner primary plywood 31*b* having a plurality of third holes 83 may be first bonded, and then the barrier fixing member 21*b* may be bolted.

Although the assembly process of the upper block UB has been described above, the upper bonding block UBB, which is structurally the same as or similar to the upper block UB, may be assembled in the same or similar process. Accordingly, in the present embodiment, the configuration of the upper block UB may be used to include the configuration of the upper bonding block UBB.

The upper block UB of this embodiment is a structure in which a plurality of first holes 81 are formed in the outer primary plywood 33*b*, and a plurality of second holes 82 are formed in the corner primary insulation material 32*b*, but the first and second holes 81 and 82 formed in each of the outer primary plywood 33*b* and the corner primary insulation material 32*b* may be removed, which will be described with reference to FIG. 23.

As shown in FIG. 23, the upper block UB of another embodiment may have a structure in which the above-mentioned first and second holes 81, 82 may be omitted in each of the outer primary plywood 33*b* and the corner primary insulation material 32*b*

In this case, the assembly process of the upper block UB of another embodiment may be different, which will be described below.

In the first assembly process, the barrier fixing member 21*b* is in close contact with the upper surface of the inner primary plywood 31*b* so that the plurality of coupling members 21*b*1 are inserted into the plurality of third holes 83 formed in the inner primary plywood 31*b*, and by bolting the coupling member 21*b*1, the barrier fixing member 21*b* is secured to the upper surface of the inner primary plywood 31*b*.

In the second assembly process, the corner primary insulation material 32*b* is bonded to the outer surface of the inner primary plywood 31*b*, and the outer primary plywood 33*b* is bonded to the outer surface of the corner primary insulation material 32*b*.

After that, the assembly process of the upper block may be completed by inserting the inner bending portion 3*b*3 in the space portion formed between the inner first fixing portion 3*b*1 and the second fixing portion 3*b*2 formed by the bonding structure of the outer primary plywood 33*b*, the corner primary insulation material 32*b*, and the inner primary plywood 31*b*.

The upper block UB of another embodiment assembled in this way is such that in each of the outer primary plywood 33*b* and the corner primary insulation 32*b*, separate first and second holes 81, 82 processing and the additional insertion process of the foam plug 9 may also be omitted and the first and second holes 81, 82 may be deleted. Therefore, not only is it advantageous to maintaining thermal insulation, but also the strength is stronger. In addition, in the process of gluing the upper block UB of another embodiment to the lower portion of the upper block UB of another embodiment when bonding the lower block LB of another embodiment, the first and second holes 81, 82 may fill the lost gluing, resulting advantageous in the adhesive strength.

In the above, the upper bonding block UBB may be bonded to overlap the upper surface of each of the neighboring lower blocks with disposing adjacently lower blocks on top of which the plurality of upper blocks are bonded.

Since the upper connecting block UBB is coupled with the lower block (LB) by bonding the corner second connecting plywood 343*b* to the lower block LB as shown in FIG. 28 or 30, the adhesive 20 is applied to the upper surface of the corner connection barrier 42*b* of a portion corresponding to the corner second connection plywood 343*b*, and the adhesive 20 is pressed and bonded.

At this time, in order to increase the bonding force between the upper connection block UBB and the lower block LB, the adhesive 20 is pressed to squeeze out to a certain extent, and the corner second connection plywood 343*b* of the bonding area is pressed such that the entire contact surface is bonded to the corner connecting barrier 42*b*.

However, if the amount of the adhesive 20 is excessive, the adhesive 20 may reach the exposed surfaces of the corner connecting bent portion 34*b*3 and the corner connecting insulation material 341*b*, which are non-bonding areas where the adhesive 20 coming out should not be bonded, thereby bonding the corner connecting bent portion 34*b*3 and the corner connecting barrier 42*b* or the corner connecting insulation material 341*b* and the corner primary insulation material 32*b* of the neighboring upper block UB. Therefore, additional work such as scraping off the adhesive 20 that has escaped from the site of occurrence to the non-bonding area must be performed.

In the case of this embodiment, as shown in FIG. 18, the gap between the corner connecting insulation material 341*b* of the upper connecting block UBB and the corner primary insulation material 32*b* of the upper block UB is very narrow such that any released adhesive 20 may not be identified, and thus it may be difficult to scrape off the adhesive 20 that has escaped through the gap.

Accordingly, this embodiment, as shown in FIGS. 25 and 26, may further include an anti-bonding member 30 for preventing the adhesive 20 from escaping to the exposed surface of each of the non-bonding area, the corner connection bent portion 34*b*3 and the corner connecting insulation material 341*b* when bonding the upper connection block UBB, or to prevent bonding the corner connecting bent portion 34*b*3 and the corner connecting barrier 42*b* or the corner connecting insulation material 341*b* and the corner primary insulation material 32*b* of the neighboring upper block UB even if the adhesive 20 comes out. The anti-bonding member 30 may be formed of a film of a sponge material.

The anti-bonding member 30, as shown in FIG. 25, may be installed on each exposed surface of the corner connection bent portion 34*b*3 and the corner connecting insulation material 341*b*, which are non-bonding areas in the upper bonding block UBB.

In addition, as shown in FIG. 26, the bonding preventing member 30 may be disposed on the exposed surface of the corner connection barrier 42*b* of the lower block LB to which the corner connection bent portion 34*b*3, which is a non-bonding area of the upper connection block UBB, is in contact with, and each exposed surface of the inner bent part 3*b*3 and the corner primary insulation material 32*b* of the upper block UB adjacent to the corner connecting insulation material 341*b* which is the non-bonding area of the upper connection block UBB.

As shown in FIGS. 18, 28 and 30, the upper blocks UBs of this embodiment are arranged in parallel with a predetermined gap and bonded to the upper surface of the lower block LB. Since the outer primary plywood 33*b* is combined with the lower block LB, this upper block UB may be bonded by pressing and applying the adhesive 20 on the upper surface of the corner secondary barrier 41*b* of the portion corresponding to the outer primary plywood 33*b*.

At this time, in order to increase the bonding force between the upper block UB and the lower block LB, the adhesive 20 is pressed to squeeze out to a certain extent, and the entire contact surface of the outer primary plywood 33b, which is the bonding area, is bonded the corner secondary barrier 41b.

In addition, as shown in FIGS. 18, 28 and 30, when the upper bonding block UBB of this embodiment is disposed adjacent to the lower block LB in which a plurality of upper blocks UB are bonded to the upper surface, the lower blocks LB may be connected to each other by bonding to overlap the upper surfaces of each of the neighboring lower blocks LB. Since the corner second connection plywood 343b is bonded to the lower block LB by bonding to the lower block LB, the upper connection block UBB is bonded by pressing the adhesive 20 in a state in which the adhesive 20 is applied to the upper surface of the corner connection barrier 42b of the portion corresponding to the corner second connection plywood 343b.

At this time, in order to increase the bonding force between the upper connecting block UBB and the lower block LB, the adhesive 20 is pressed to squeeze out to a certain extent so that the entire contact surface of the corner second connecting plywood 343b which is the bonding area is bonded to the corner connection barrier 42b.

However, in the present embodiment, the gap between the corner primary insulation material 32b of the upper block UB and the corner primary insulation material 32b of the neighboring upper block UB, and the gap between the corner connecting insulation material 341b of the upper connection block UBB and the corner primary insulation material 32b of the upper block UB is too narrow for identifying that the adhesive 20 has come out with the naked eye, so that it is impossible to check the squeeze out. In other words, when the upper block UB and the upper bonding block UBB are bonded to the lower block LB, it is not possible to confirm sufficient application of the adhesive 20, and thus the bonding strength between the upper block UB and the lower block LB or between the upper connection block UBB and the lower block LB decreases due to insufficient bonding area, or bonding defects may occur such as the bonding of the neighboring blocks UB, UBB.

Accordingly, in this embodiment, as shown in FIGS. 27 to 30, when the upper block UB and the upper connection block UBB are bonded to the lower block LB, the squeeze-out of the adhesive 20 may be checked by a possible squeeze-out confirmation means, which is provided to prevent bonding defects.

In the above, the squeeze-out confirmation means may be the chamfer CF provided at both ends of the outer primary plywood 33b of the upper block UB as shown in FIG. 27A, or a chamfer CF provided at both ends of the corner second connection plywood 343b of the upper connection block UBB as shown in FIG. 27B. This chamfer CF as shown in FIG. 28 may make it possible to confirm that the adhesive 20 is squeezed out from the front or the like by forming a space between the upper block UB and the neighboring upper block UB and between the upper block UB and the neighboring upper connection block UBB when the upper block UB and the upper connection block UBB are disposed on the lower block LB.

In addition, the squeeze-out confirmation means may be the groove GV provided adjacent to both edges of the outer primary plywood 33b of the upper block UB as shown in FIG. 29A, and grooves GV provided adjacent to both edges of the corner second connection plywood 343b of the upper connection block UBB as shown in FIG. 29B. As shown in FIG. 30, the groove GV may make it possible to confirm that the adhesive 20 is squeezed out from the upper block UB and the upper connection block UBB from the front and the like when the plurality of upper blocks UB and the upper connection blocks UBB are disposed on the lower block LB.

As such, by applying a chamfer CF or groove GV shape as a squeeze-out confirmation means in each of the outer primary plywood 33b and the corner second connection plywood 343b, which are the lower layers of the upper block UB and the upper connection block UBB, it may become possible to reduce the weight of each of the upper block UB and the upper connecting block UBB, and after applying the adhesive 20 in each of the upper block UB and the upper connecting block UBB, the adhesive 20 may be directly checked with the naked eye, so the stability of the system may be improved. Upon comparing the chamfer CF with the groove GV as the squeeze-out confirmation means, when the chamfer CF shape is applied, the amount of the applied adhesive 20 may be increased as opposed to the case where the groove GV shape is applied, thereby increasing the adhesive force.

Figure 33:
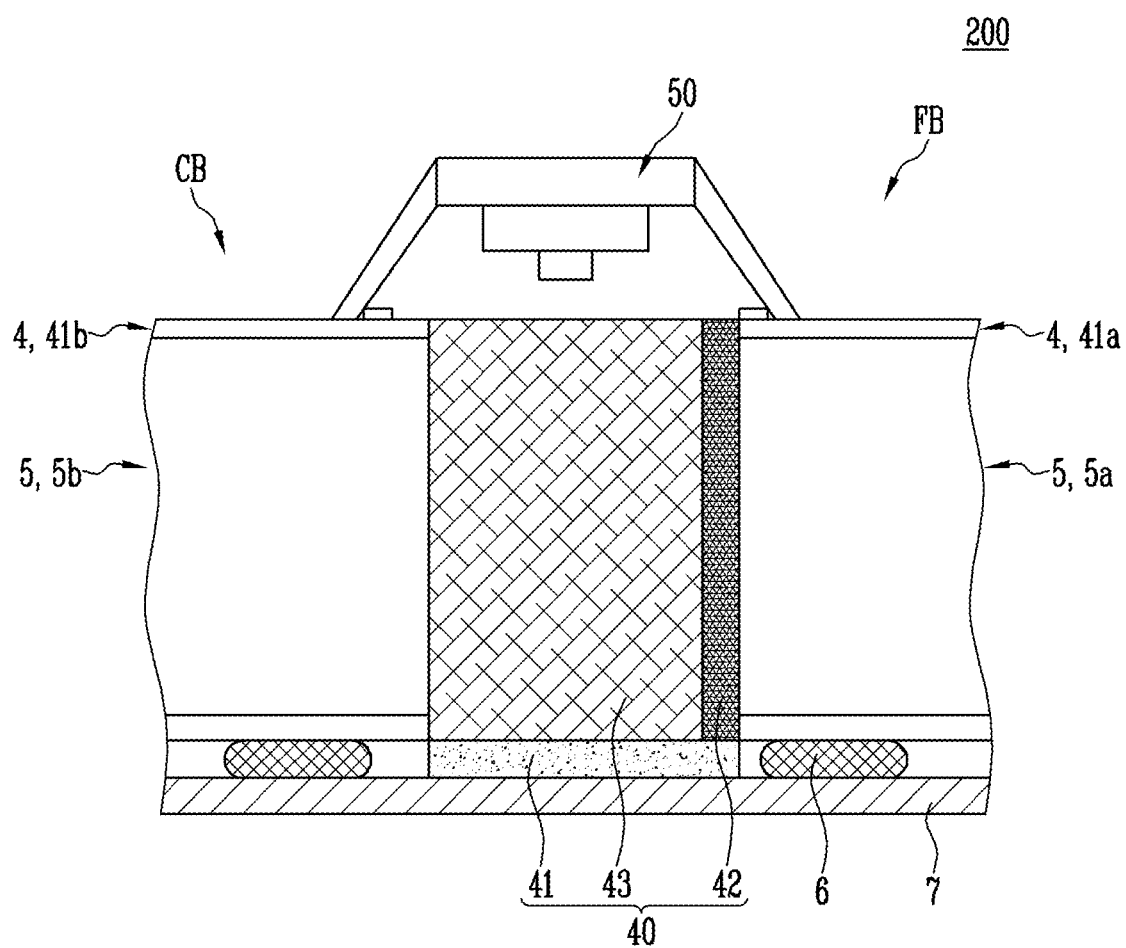
FIG. 33 is a diagram for describing a liquefied gas storage tank in accordance with a tenth embodiment of the present disclosure.

FIG. 33 is a view for describing a liquefied gas storage tank according to a tenth embodiment of the present disclosure.

As shown in FIG. 33, in the liquefied gas storage tank 200 according to the tenth embodiment of the present invention, after installing the corner block CB on the corner portion and the flat block FB on the flat portion, the operation of filling was performed in the gap created by the contact point between the corner block CB and the flat block FB with an insulation material due to tank hull and block installation tolerances.

In general, the operation (block connection system) to fill the gap generated at the contact point between the corner block CB and the flat block FB with an insulation material is known to be a complicated process requiring a lot of time and input, because the size of the gap is not constant.

Accordingly, in the present embodiment, it is possible to simplify the operation of filling the gap generated in the contact portion between the corner block CB and the flat block FB with an insulation material, which will be described in detail below.

The liquefied gas storage tank 100 includes a flat block FB installed at the corner, a flat block FB installed on a flat portion, and the block connection system 40 installed in the gap generated at the contact point between the corner block CB and the flat block FB due to the tank hull and block installation tolerance.

The flat block FB may include the flat primary insulating wall 3a secured to the flat primary barrier 2a made of a metal material and disposed on the outside of the flat primary barrier 2a, the flat secondary barrier 41a provided on the outside of the flat primary heat insulating wall 3a, and the flat secondary heat insulating wall 5a disposed on the outside of the flat secondary barrier 41a and installed in the hull 7, and may be disposed on the flat portion on the first or second surface at different angles to form a storage space for accommodating the liquefied gas in conjunction with the corner block CB.

In the present embodiment, the flat block FB may have the same or similar structure to the flat block of the above-described first embodiment, but is not limited thereto, and may have a structure of another known flat block.

The corner block may include the corner primary insulating wall 3b disposed on the outside of the corner primary barrier 2b and securing the corner primary barrier 2b made of a metal material, the corner secondary barrier 41b disposed on the outside of the corner primary insulating wall 3b, and the corner secondary insulating wall 5b disposed on the outside of the corner secondary barrier 41b and installed in the hull 7, and may be disposed in the corner portion to form a storage space for accommodating the liquefied gas in conjunction with the flat block FB.

In this embodiment, the corner block CB may have the same or similar structure to the corner block of the first to ninth embodiments as described above, but is not limited thereto, and may have a structure of another previously known corner block.

The block connecting system 40 may be installed in the gap between the flat secondary thermal insulating wall 5a of the flat block FB and the corner secondary thermal insulating wall 5b of the corner block CB, so that the flat block FB and the corner block CB may be connected, and may include a flow path member 41, a block buffer member 42, and a block connection member 43.

The flow path member 41 may be installed at the bottom of the gap so that the first space between the flat block FB and the hull 7 and the second space between the corner block CB and the hull 7 communicate with each other, and may provide a liquid flow path such as condensate or a N2 Gas Circulation path.

In other words, the block connection member 43 of this embodiment, as will be described later, is formed by an automatic spray method using the spray device 50. Therefore, in the absence of the flow path member 41, the block connecting member 43 may block the first space under the flat block FB and the second space under the corner block CB, which causes a problem in that the flow path of the liquid or nitrogen gas such as condensate flowing under each of the flat block FB and the corner block CB is blocked.

The flow path member 41 of this embodiment may be formed of a mesh-type melamine foam, but is not limited thereto, and may also include those formed of other members through which gases or liquids may pass.

The block buffer member 42 may be installed on the side surface of the flat block FB constituting one side of the gap by line construction.

The block buffer member 42 may be made of a soft insulation material thin in order to relieve the stress generated between the flat block FB and the corner block CB or the stress caused by thermal relaxation/contraction by external force caused by the hull behavior. The soft insulation material forming the block buffer member 42 may be, for example, low-density polyurethane foam or glass wool. In other words, while the block buffer member 42 formed of a soft heat insulation material may not serve as a strength member like the block connection member 43 to be described later, it may be processed to a minimum thickness to relieve external stress.

The block connection member 43 may be installed through post-construction by spraying a hard heat insulation material using a spray device 50 into the gap with the flow path member 41 and the block buffer member 42 pre-constructed.

The block connecting member 43 may be formed of a material having the same or similar thermal insulation properties as the flat block FB and the corner block CB. In other words, the block connection member 43 may be formed of various hard insulation materials having a strength sufficient to withstand the load of the liquefied gas filled in the liquefied gas storage tank 200. The rigid heat insulation material forming the block connecting member 43 may be, for example, high-density polyurethane foam, but is not limited thereto.

The block connection member 43 has a top surface level similar to or equal to the top surface level of the flat block FB and the corner block CB.

Accordingly, if the gap between each section is large due to the tolerance of the tank hull, the amount of the sprayed insulation material may be adjusted by inputting the corresponding information into the spray device 50 after measuring the gap value between the flat block FB and the corner block CB at a specific interval.

At this time, the spray device 50 may be manufactured to be installed on a rail similar to or the same as the rail for installing the corner connection barrier 42b, and may control the amount of the injected insulation so that the amount of the sprayed insulation does not protrude as much as possible to the upper surface of the flat block FB and the corner block CB.

In addition, for the installation of the corner connection barrier (42b) as a subsequent process, when the upper surface level of the block connecting member 43 should exactly match the upper surface level of each of the flat block FB and the corner block CB, the levels may be matched by grinding the protruding area using a grinding machine after the first construction so that the amount of the insulation material rises finely than the upper surface level of each of the flat block FB and the corner block CB.

The present disclosure is not limited to the embodiments as described above, and a combination of the embodiments or a combination of at least one of the embodiments and a known technology may be included as another embodiment.

Although the present invention has been described in detail through specific embodiments, it is intended to describe the present disclosure in detail, the present disclosure is not limited thereto, and it will be apparent that modifications or improvements are possible by those of ordinary skill in the art within the technical spirit of the present disclosure.

All simple modifications or changes of the present disclosure fall within the scope of the present disclosure, and the specific scope of protection of the present disclosure will be clarified by the appended claims.

<Explanation of Symbols>

| | |
|---|---|
| 1, 100, 100a, 200: Liquefied gas storage tank | 2: Primary barrier |
| 2a: Flat primary barrier | 2b: Corner primary barrier |
| 21b, 121b: Barrier fixing member | 21b1: Coupling member |
| 122b: Stiffener | 3: Primary insulating wall |
| 3a: Flat primary insulating wall | 31a: Flat primary plywood |
| 32a: Flat primary insulation material | 33a: Flat connection insulating wall |
| 331a: Flat connection plywood | 332a: Flat connection insulation material |
| 3b: Corner primary insulating wall | 3b1: Inner first fixing portion |
| 3b2: inner second fixing portion | 31b: Inner primary plywood |

-continued

| <Explanation of Symbols> | |
|---|---|
| 32b: Corner primary insulation material | 33b: Outer primary plywood |
| 3b12: Inner intermediate fixing portion | 31b12: Inner intermediate plywood |
| 32b12: Corner intermediate insulation material | 34b: Corner connection insulating wall |
| 34b1: Corner first connecting fixing portion | 34b2: Corner first connecting fixing portion |
| 341b: Corner connecting insulation material | 342b, 343b: Corner connecting plywood |
| 34b3: Corner connecting bent portion | 3b3: Inner bent portion |
| 3b31: Insulation material | 3b32: Insulation material |
| 3b33: Outer insulation material | 3b34: Inner insulation material |
| 3b35: Insulation material | 3b36: Insulation material |
| 3b37: Vacuum insulation panel | 3b4: Inner first packing material |
| 3b5: Inner second packing material | 4: Secondary barrier |
| 41a: Flat secondary barrier | 42a: Flat connection barrier |
| 41b: Corner secondary barrier | 42b: Corner connecting barrier |
| 5: Secondary insulating wall | 5a: Flat secondary insulating wall |
| 51a: Flat secondary insulation material | 52a: Flat secondary plywood |
| 5b: Corner secondary insulating wall | 5b1: Outer first fixing portion |
| 5b2: Outer second fixing portion | 51b: Inner secondary plywood |
| 51b1: Peripheral plywood | 51b2: Inclined plywood |
| 52b: Corner secondary insulation material | 53b: Outer secondary plywood |
| 5b12: Outer intermediate fixing portion | 51b12: Outer intermediate plywood |
| 52b12: Outer intermediate insulation material | 53b12: Inner intermediate insulation material |
| 5b3: Outer bent portion | 5b31: Insulation material |
| 5b32: Insulation material | 5b4: Outer packing material |
| 6: Mastic | 7: Hull |
| 81: First hole | 82: Second hole |
| 83: Third hole | 9: Foam plug |
| 10: Stuffing piece | 11: Body |
| 12: End | 20: Adhesive |
| 30: Anti-bonding member | 40: Block connection system |
| 41: Flow path member | 42: Block buffer member |
| 43: Block connection member | 50: Spray device |
| ED: Division direction | FB: Flat block |
| CB: Corner block | LB: Lower block |
| UB: Upper block | UBB: Upper bonding block |
| CF: Chamfer | GV: Groove |

The invention claimed is:

1. A liquefied gas storage tank comprising:
a flat block comprising a flat primary insulating wall disposed on a flat portion forming a storage space for accommodating liquefied gas, the flat primary insulating wall securing a flat primary barrier made of metal and being disposed on the outside of the flat primary barrier, a flat secondary barrier disposed on the outside of the flat primary insulating wall, and a flat secondary insulating wall disposed on the outside of the flat secondary barrier; and
a corner block comprising a corner primary insulating wall disposed on each side of a corner of the storage space, the corner primary insulating wall securing a corner primary barrier made of metal and the corner primary insulating wall being disposed on the outside of the corner primary barrier, a corner secondary barrier disposed on the outside of the corner primary insulating wall, and a corner secondary insulating wall disposed on the outside of the corner secondary barrier,
wherein the corner primary insulating wall is formed only of a combination of polyurethane foam insulation and plywood.

2. The liquefied gas storage tank of claim 1, wherein the corner primary insulating wall comprises an outer primary plywood secured to the corner secondary barrier, an inner primary plywood to which the corner primary barrier is secured, and a corner primary insulation material disposed between the inner primary plywood and the outer primary plywood,
wherein the corner primary insulating wall comprises:
an inner first fixing portion and an inner second fixing portion disposed on the inside of the first and second surfaces, respectively, and comprising the outer primary plywood, the corner primary insulation material, and the inner primary plywood; and
an inner bent portion configured by filling an insulation material between the inner first fixing portion and the inner second fixing portion.

3. The liquefied gas storage tank of claim 2, wherein the corner primary insulation material and the insulation material comprise polyurethane foams with the corner primary insulation material having a higher density polyurethane foam than the polyurethane foam of the insulation material.

4. The liquefied gas storage tank of claim 2, wherein the corner primary barrier is secured to the inner primary plywood of the inner first fixing portion and the inner primary plywood of the inner second fixing portion, and provided to be bent on an inner surface of the insulation material of the inner bent portion.

5. The liquefied gas storage tank of claim 1, wherein the corner secondary insulation wall comprises an outer first fixing portion and an outer second fixing portion comprising an inner secondary plywood, a corner secondary insulation material, and an outer secondary plywood sequentially arranged to the outside of the corner secondary barrier, and
wherein side surfaces of the first outer fixing portion and the outer second fixing portion are provided to be inclined in a direction dividing the corner into portions.

6. The liquefied gas storage tank of claim 1, wherein the corner primary insulation wall of the corner block connected to the flat primary insulation wall of the flat block has the same or similar thickness to that of the corner secondary thermal insulation wall of the corner block connected to the flat secondary thermal insulation wall of the flat block.

7. A liquefied gas storage tank comprising:
a corner block disposed at a corner portion forming one part of a storage space for accommodating liquefied gas,
wherein the corner block comprises a lower block provided inside the first and second surfaces and formed of a single board, a plurality of upper blocks disposed adjacently on the lower block and bonded to each other, and an upper connection block that is bonded to upper surfaces of the lower blocks disposed adjacent to each other and connects the lower blocks, and
wherein the upper connection block comprises
a barrier fixing member provided to be bent at a predetermined angle, securing a corner primary barrier made of metal, and disposed on the outside of the corner primary barrier,
an inner primary plywood disposed on the outside of the barrier fixing member,
a corner primary insulation material disposed on the outside of the inner primary plywood, and
an outer primary plywood disposed on the outside of the corner primary insulation material and bonded to the lower block,
wherein
the outer primary plywood having a plurality of first holes is bonded to an outer surface of the corner primary insulation material having a plurality of second holes,
the inner primary plywood having a plurality of third holes is bonded to an inner surface of the corner primary insulation material,
the outer primary plywood, the corner primary insulation material, and the inner primary plywood are bonded,
the barrier fixing member is secured to an upper surface of the inner primary plywood,
the barrier fixing member is secured to the inner primary plywood, and
a foam plug is inserted into each of communication holes formed by the plurality of first and second holes.

8. The liquefied gas storage tank of claim 7, wherein the barrier fixing member is bolted to the inner primary plywood.

9. The liquefied gas storage tank of claim 7, wherein filling of a separate insulation material is carried out or omitted between the corner primary insulation materials of the upper blocks disposed adjacent to each other.

10. The liquefied gas storage tank of claim 7, wherein filling of a separate insulation material is carried out or omitted between the corner primary insulation material of the upper block and the corner connecting insulation material of the upper connecting block disposed adjacent to each other.

* * * * *